US008701977B2

(12) United States Patent
Spaulding

(10) Patent No.: US 8,701,977 B2
(45) Date of Patent: Apr. 22, 2014

(54) CARDS INTEGRATED INTO A ONE-WAY OR TWO-WAY MAILER FOR MULTIPLE USES

(75) Inventor: Lincoln Brooks Spaulding, Weston, MA (US)

(73) Assignee: 7R Communications, LLC, Natick, MA (US)

(*) Notice: Subject to any disclaimer, the term of this patent is extended or adjusted under 35 U.S.C. 154(b) by 398 days.

(21) Appl. No.: 12/552,866

(22) Filed: Sep. 2, 2009

(65) Prior Publication Data

US 2010/0089990 A1 Apr. 15, 2010

Related U.S. Application Data

(60) Continuation-in-part of application No. PCT/US2008/080010, filed on Oct. 15, 2008, and a continuation-in-part of application No. PCT/US2008/055480, filed on Feb. 29, 2008, said application No. PCT/US2008/080010 is a division of application No. PCT/US2008/056265, filed on Mar. 7, 2008.

(60) Provisional application No. 60/980,007, filed on Oct. 15, 2007, provisional application No. 60/893,523, filed on Mar. 7, 2007, provisional application No. 60/892,620, filed on Mar. 2, 2007.

(51) Int. Cl.
*B65D 27/06* (2006.01)
*B65D 27/00* (2006.01)

(52) U.S. Cl.
USPC ............... 229/300; 229/70; 229/75; 229/92.8

(58) Field of Classification Search
USPC ................ 229/300–305, 68.1, 70, 71, 74, 75, 229/92.1, 92.3, 92.8
See application file for complete search history.

(56) References Cited

U.S. PATENT DOCUMENTS 380,616 A 4/1888 Bobrick
1,319,440 A * 10/1919 Veitch .......................... 229/92.1

(Continued)

FOREIGN PATENT DOCUMENTS

CA 2272441 6/2000
GB 1 117 662 6/1968

(Continued)

OTHER PUBLICATIONS

Australian Examiners Report on 2009222565 dated Dec. 16, 2011.

(Continued)

*Primary Examiner* — Jes F Pascua
(74) *Attorney, Agent, or Firm* — Foley & Lardner LLP; John D. Lanza

(57) ABSTRACT

In one aspect, an envelope having an integrated return mailing article is fabricated from a single sheet of material having first and second sections, and a perforated line for separably interconnecting said first and second sections. The first section includes bottom, top and side edges and a non-perforated first fold line, a non-perforated second fold line, and a non-perforated third fold line. The second section defines a return mailing article having bottom, top and side edges, at least one of which is coincident with said first perforated line.

In another aspect, a multimedia remailable envelope includes an outgoing seal flap, face panel which includes an embedded reply envelope seal flap, a back panel, a face panel for the reply envelope, and side seams for the outgoing face panel. Side seams may also be available and located for the reply envelope.

13 Claims, 61 Drawing Sheets

(56) References Cited

U.S. PATENT DOCUMENTS

| | | | | |
|---|---|---|---|---|
| 2,328,380 | A | * | 8/1943 | Feder ............................ 229/300 |
| 2,362,496 | A | * | 11/1944 | Mess ............................ 229/92.8 |
| 2,589,632 | A | * | 3/1952 | Scott ............................ 229/305 |
| 3,181,774 | A | * | 5/1965 | Littman ........................... 229/70 |
| 3,426,961 | A | * | 2/1969 | Allison ........................... 229/70 |
| 3,606,138 | A | * | 9/1971 | Allison ........................... 229/70 |
| 4,288,028 | A | | 9/1981 | Diaz |
| 4,382,539 | A | | 5/1983 | Kronman |
| 4,775,095 | A | | 10/1988 | Emmott |
| 4,801,076 | A | | 1/1989 | Schoenleber et al. |
| 4,899,926 | A | * | 2/1990 | Spaulding ..................... 229/304 |
| 5,224,647 | A | | 7/1993 | Yanow |
| 5,267,687 | A | | 12/1993 | Sherman |
| 5,967,403 | A | | 10/1999 | Kranz |
| 6,053,855 | A | * | 4/2000 | Stenner ......................... 493/216 |
| 6,269,158 | B1 | * | 7/2001 | Kim ........................ 379/144.01 |
| 7,127,844 | B2 | * | 10/2006 | Collins ..................... 40/124.16 |
| 2007/0080196 | A1 | | 4/2007 | Rosenkranz et al. |

FOREIGN PATENT DOCUMENTS

| | | | | |
|---|---|---|---|---|
| JP | 2003-073527 | | 4/1988 | |
| JP | 63-072597 | | 1/1989 | |
| JP | 07-041001 | | 5/1995 | |
| JP | 2001-088840 | | 4/2001 | |
| JP | 2004149162 A | * | 5/2004 | ............. B65D 27/00 |
| WO | WO 2008109428 A1 | * | 9/2008 | ............. B42D 15/08 |

OTHER PUBLICATIONS

International Search Report on PCT/US2008/055480.

International Search Report in PCT/US2008/056265.

International Search Report in PCT/US2008/080010.

Preliminary Report on Patentability from PCT/US2008/055480.

Preliminary Report on Patentability on PCT/US2008/056265.

Preliminary Report on Patentability in PCT/US2008/080010.

Written Opinion on PCT/US2008/055480.

Written Opinion on PCT/US2008/056265.

Written Opinion on PCT/US2008/080010.

European Supplemental Search Report & Opinion on 08731111.4 dated Dec. 9, 2013.

* cited by examiner

FACE VIEW UNFOLDED

REPLY FACE PANEL (5) FOLDS UP

FACE PANEL SIDE SEAM FOLDS IN

BACK PANEL OF OUTGOING ENVELOPE FOLDS UP

SEAL FLAP OF OUTGOING ENVELOPE FOLDS UP

FACE VIEW OF OUTGOING ENVELOPE

FINAL SEPARATION OF REPLY ENVELOPE FROM OUTGOING ENVELOPE

FACE VIEW OF REPLY ENVELOPE

BACK VIEW OF REPLY ENVELOPE

10 OUTBOUND ENVELOPE WITH INTEGRATED #9 REPLY ENVELOPE

FACE VIEW UNFOLDED

BACK VIEW OF OUTBOUND ENVELOPE

FACE VIEW OF OUTBOUND ENVELOPE

LIFT SEAL FLAP AND REMOVE REPLY ENVELOPE

FINAL SEPARATION OF REPLY FROM OUTGOING ENVELOPE

FACE VIEW OF REPLY ENVELOPE

BACK VIEW OF REPLY ENVELOPE

INSIDE VIEW WITH REPLY ENVELOPE HAVING SIDE SEAMS

"POSTAGE METER" OUTBOUND COPY

BACK VIEW OF OUTBOUND ENVELOPE

OUTBOUND FACE VIEW AS RECEIVED BY RECIPIENT

OUTBOUND BACK VIEW

FACE OF REPLY ENVELOPE

FACE VIEW OF OUTBOUND ENVELOPE

NOTE: SEAL FLAP (1) IS AT BOTTOM OF OUTBOUND ENVELOPE

BACK VIEW OF OUTBOUND ENVELOPE

REPLY ENVELOPE & PROMOTIONAL COPY REVEALED

MULTIMEDIA (AND/OR INVOICE, COUPON, SURVEY, ETC.) RETURNED

REPLY SEAL FLAP CLOSED & SEALED

CARDS INTEGRATED INTO A ONE-WAY OR TWO-WAY MAILER FOR MULTIPLE USES

CROSS-REFERENCE TO RELATED APPLICATIONS

This application claims priority to International Patent Application Serial No. PCT/US2008/080010, filed Oct. 15, 2008, titled "Multimedia Remailable Envelope or Mailer for DVDs, CDs, and Other Media, as well as Better Two-Way Envelopes," which itself claims priority to U.S. Provisional Application Ser. No. 60/980,007, titled, "Multimedia Remailable Envelope or Mailer for DVDs, CDs, and Other Media, as well as Better Two-Way Envelopes for Popular Commercial Size Envelope, Like #10 and #9 Envelopes", filed Oct. 15, 2007, and to International Patent Application Serial No. PCT/US2008/56265, titled, "Multimedia Remailable Envelope for DVDs, CDs, and Other Diskettes," filed Mar. 7, 2008, which itself claims priority to U.S. Provisional Application Ser. No. 60/893,523, titled "Multimedia Remailable Envelope for DVDs, CDs, and Other Diskettes", filed Mar. 7, 2007, the contents of each of which are incorporated herein by reference in their entirety. This application also claims priority to International Patent Application Serial No. PCT/US2008/055480, titled, "Integrated Post Card Mailer and Envelope for Multiple Uses," filed Feb. 29, 2008, which itself claims priority to U.S. Provisional Application Ser. No. 60/892,620, titled, "Integrated Post Card Mailer and Envelope", filed Mar. 2, 2007, the contents of each of which are incorporated herein by reference in their entirety.

FIELD OF THE INVENTION

The present disclosure relates to envelopes. In particular, the present disclosure relates to envelopes having an integrated return mailing article.

BACKGROUND OF THE INVENTION

Sustainability is increasingly important to the global economy and geo-politics. As countries issue regulations for carbon "cap and trade" and as consumers reward (or punish) companies for their sustainability practices, it has become more and more important to reduce an enterprise's carbon footprint. The international posts process in excess of 250 billion pieces of mail while commercial enterprises purchase billions of more pieces of hard copy brochures and inserts. Over 211 billion pieces of mail were processed by the United States Postal Service (USPS) in 2007 http://www.usps.com/financials/rpw/welcome.htm Of this volume, the fastest growing sector is the 5.7 billion post card segment (3% of total USPS volume)—post card piece volume grew by 8% despite declines of 2% for First-Class Mail and flat growth of 1% for Standard Mail. Post cards are lighter and easier to process than letters and flats. A lighter mail piece requires less fuel to deliver than a heavier mail piece. Given the international concern about global warming and domestic concern for the sustainability of natural resources, all else being equal it would benefit society to facilitate more mailings of post cards and fewer mailings of letters.

The market for remailable envelopes/forms that allows a sender to send out and get back a DVD, CD or other items such as a survey or a bill has grown dramatically in the last eight years. Companies like NETFLIX mail approximately 1.6 million reuseable envelopes/forms per day from nearly 75,000 different DVD titles. The market demand for remailable envelopes/forms will continue to grow in response to rising material costs and for environmental friendliness concerns (a reuseable envelope can use 25% to 75% less paper than two separate envelopes and is therefore much more environmentally friendly for source reduction advantages and for reducing a mailer's carbon footprint than separate envelopes and inserts so their adoption will potentially help slow the impact of global warming. Typically, however, to facilitate adoption the remailable piece should meet or exceed the United States Postal Service (USPS) and global postal services' automated processing requirements. Failure to meet postal requirements will prevent the adoption of environmentally friendly two-way envelopes. Recent publicity about the USPS having to manually sort the 1.6 million red remailable pieces per day (at a cost of $21 million per year) for a popular DVD/CD mailer in the US is further illustrating the need to develop USPS compliant remailable envelopes that function properly on the USPS automation equipment (otherwise, the environmental benefits are lost to more expensive manual processes).

A number of bill payers (and bill senders) appreciate the "touch points" that come from the company enclosing coupons, vouchers, special offers, surveys, etc. inside the envelope with the invoice which helps build brand identity—consumers and companies benefit from the exchange of relevant information, coupons, surveys, or other offers via the mail stream. However, although electronic processing of bill payments has proven to be dramatically less expensive than the processing of physical checks, not all consumers welcome electronic bill payment either because of the fear of identity theft on the web or because of the fear there would be insufficient funds in their bank account at the time of a scheduled transaction.

Identity theft costs the US economy over $45 billion dollars per year in 2007 and effects approximately 3% of the adult population, or 9 million people, according to a recent Javelin Strategy & Research Paper published Feb. 11, 2008 (which is funded by CheckFree, now part of Fiserv, Inc., Visa Inc, and Wells Fargo). The average cost per consumer for identity theft was $691 in 2007, about 25% higher than 2006, per the same study. Recent advancement in contactless credit cards, gift cards, transit and security systems based on RFID technology, particularly at the 13.56 MHz frequency per ISO Standard 14443, could be a boom to industry for reducing transaction costs and a boom to consumers for its ease of use (no swipe, just proximity activated); however, US consumers are already concerned about identity theft and with RFID technology comes a greater risk of identity theft and security breaches since unauthorized scanners can "read" the card data without physical contact.

BRIEF SUMMARY OF THE INVENTION

In one aspect, an envelope having an integrated return mailing article includes a single sheet of material having a first and second section and a perforated line. The perforated line separably interconnects the first and second sections. The first section includes bottom, top and side edges. The first section includes a non-perforated first fold line, a non-perforated second fold line, and a non-perforated third fold line, said non-perforated first fold line spaced inwardly from and parallel with at least a substantial portion of the bottom edge of said first section and said second and third non-perforated fold line spaced inwardly from and parallel with at least a substantial portion of the side edges. The second section defines a return mailing article having bottom, top and side edges, at least one of which is coincident with said first perforated line.

In another aspect, an envelope having an integrated return mailing article includes a single sheet of material. The single sheet of material defines an outgoing seal flap, a face panel disposed below the outgoing seal flap, a back panel disposed below the face panel, a reply face panel disposed below the reply face panel, and a plurality of side seams disposed on either side of the face panel, the face panel including an embedded reply envelope seal flap.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIGS. 49-53 are block diagrams depicting embodiments of envelopes wherein the delivery address side of the outgoing envelope is located on the back panel and the integrated post card(s), card(s) and coupon(s) are integrated into the face panel;

DETAILED DESCRIPTION OF THE INVENTION

Figure 1:
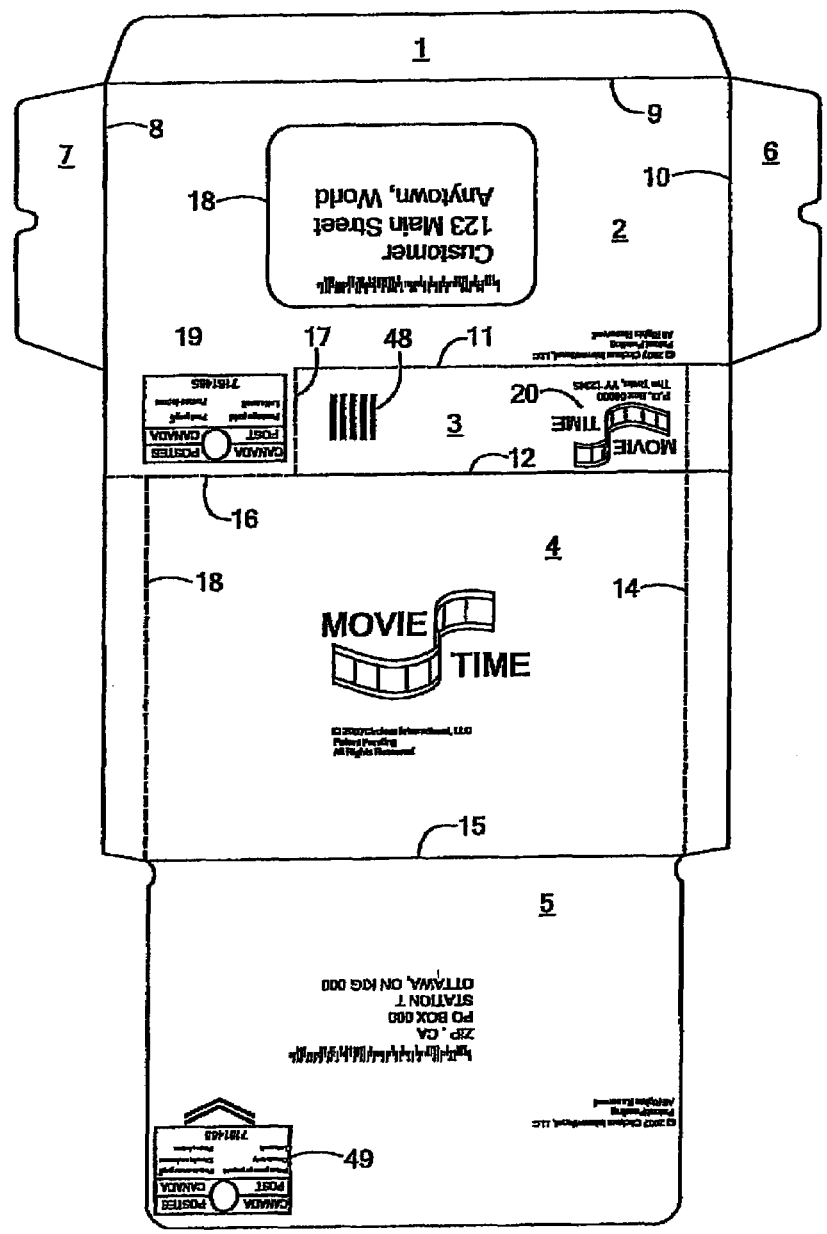
FIG. 1 is a block diagram depicting a face view of an unfolded envelope.

The present disclosure describes envelopes that allow a sending company to meet or exceed more countries' postal automation requirements by providing a stiffer mailer due to a side seam outbound construction and a more efficient height-width aspect ratio. In one aspect, for example, this results in less flimsiness between multimedia and the edge of the envelope, thereby reducing the risk of breakage or the risk of "fold over" which can block critical automatic delivery information (bar codes, facing identification marks, postal indicias, and the like). Use of the disclosed envelopes also eliminates the need for wafer seals that can get caught with other pieces in the mail stream if not properly removed by the recipient. Through end-user opening friendliness and the ability to see and respond to the common face panel (outside for addressing and inside for advertising and call-to-action copy), the disclosed envelopes allow the sender to more readily correspond with the recipient to provide coupons and other personalized or generalized direct mail copy that could also include revenue enhancing co-branded advertising and further reduction of the carbon foot print (i.e. it displaces a separate insert by using the inside of the face panel, which separates in the opening sequence, as the coupon, ad, survey, or other promotional or call-to-action copy). The disclosure below also includes a description for providing the construction necessary to facilitate high speed machine insertion with either inside or outside side seams for such popular envelope inserters as those made by Pitney Bowes, Neopost, Bowe Bell & Howell, Mailcrafters, Buhrs, Kern, and others.

Because postcards require fewer natural resources to create and mail, and because post card compatibility with high speed USPS automation equipment is high, it is desirous to stimulate post card usage when the confidentiality and security of an envelope is not required. The described envelopes include one or more post card(s), note card(s), business card(s), affinity card(s), loyalty card(s), membership card(s), coupon(s), card sleeve(s), buck slip(s), bookmark(s), etc., integrated into an outbound envelope and, therefore, encourage the use of a reply post card versus a heavier envelope or form. Indeed, as today's USPS rates reflect a substantial discount for mailing a post card at only 26 cents each (3×5 minimum size up to 4¼×6 maximum size with a minimum 0.007" thickness) versus 41 cents each for a one ounce letter, the described envelopes offers significant postage savings of up to $150 per 1,000 pieces for a number of mailing applications and therefore further conserve natural resources and reduce the USPS' total delivery costs. The described envelopes also provide the source reduction benefit of using less paper than a separate outgoing envelope, separate reply envelope or separate reply post card, separate coupon(s), and/or separate business/affinity/loyalty/membership card(s), and/or separate card sleeve(s), buck slip(s), or other promotional pieces like a bookmark, ruler, gift card, etc. When made out of 7 point reply post card stock, a #10 outbound envelope will weigh less than 0.25 ounces whereas a separate #10 envelope made of common 24# white wove with a separately stuffed 3¾×5¼ post card, a 2×3½ business card, a 3½×8½ coated coupon or buckslip will often weigh more than 0.35 ounces.

The envelopes described herein, in some embodiments, significantly help reduce an enterprise's carbon footprint by using up to 35% less paper either by embedding commonly stuffed "extras" like coupons, surveys, buck slips, business cards, etc. into the outbound envelope, or by making common use of a significant panel in the sending out and the return of the mail piece. Taken together the envelopes incorporating the features described herein help expose the inside panel of an outbound mail piece for paper reduction (no longer is there a need to stuff an extra insert to accomplish the same purpose as the embodiment); for higher value-added purposes (if previously the inside of the face panel had no print or only a security tint, now there is a coupon or call to action); and for boosted response rates through interactive separating devices like perforations, pull-tabs, and/or strings. In some embodiments, an envelope as described herein incorporates a pull-tab that a recipient utilizes to separate coupons, business cards, etc., from a back panel of an envelope, which then allows the recipient to view the inside of the envelope for additional information that may incentive the recipient to view a web site or other informational source, or to receive another coupon or other promotional offer.

Furthermore, given the popularity of coupons in difficult economic conditions, whether a mailer uses conventional 24-pound white wove envelope paper (approximately 0.005" thick) or even thinner coated or uncoated papers, the described envelopes facilitate the wider distribution of coupons and discounts by reducing their insertion, paper, labor and potentially also their postage costs as a self-mailer or stuffed mailer. The described envelopes could also be distributed with their combination of coupon(s) and post card(s) and other premium(s) outside of the traditional mail stream as an insert, brochure, or hand-out.

Moreover, the described envelopes, together with new USPS technologies including the Intelligent Mail Bar Code (IMBC), would readily allow for expansion of a hybrid bill payment system whereby the responder mails back the integrated post card (paying 26 cents for a post card—not 41 cents for a letter) which, once read at the first authorized USPS mail processing center, then signals the clearing house for the electronic payment. The sender of the bill can still send information, coupons, etc. in the confidentiality and security of an outgoing envelope (just as they do now); the responder can control the "float" by timing when to return the post card authorizing payment; and the USPS can facilitate the electronic transaction between the consumer and the invoicer and then securely shred the post card into one of its secured reclamation facilities for recycling. The described envelopes help complete the entire payment cycle while consuming fewer natural resources. It uses less postage and provides greater consumer control for bill payment timing than traditional e-mail based fixed date payment systems. The USPS completes the electronic transfer of funds when it reads the post card. The described envelopes allow for the continued delivery of integrated coupons, business cards-affinity cards-membership cards-card(s) and other "freemiums" like sleeves or bookmarks or buck slips and, potentially best of all, since the post card has been sent to a secure facility (USPS) it can be reclaimed for recycling. Indeed, this "physical capture and electronic distribute" model can be used by the USPS and the international posts to process other types of data besides bill payment authorizations. Examples include surveys, subscription/renewal, or other special offers in the B2B, B2C, and government to citizen space. By integrating the world posts' advancements in optical character recognition software/hardware with the efficiencies of the internet and the convenience of the described envelope, commerce and data will flow faster with less physical handling and travel of the reply piece. Because the USPS is a secure facility, confidential data can be processed and recycled more readily than is possible with a private company.

The emergence of powerful new digital printing capabilities have enabled companies (as well as governments, institutions, non-profits, and individuals) to more cost effectively purchase four color process printing in small quantities with or without personalization. At the forefront are real estate agents, car dealerships, lawyers, plumbers, electricians, restaurants and a host of small, local businesses and charities. However, even Fortune 1000 companies are also entering the foray of digital personalization as the response rates are proven to be significantly higher (up to 35% according to some RIT and DMA studies) with four color personalization and it helps the larger companies "remain global, while acting local." As digital printing technologies mature, the opportunity for small "local" businesses to appear as though they are "national" businesses becomes compelling (and vice-versa, the national business can now appear more "local"). People appreciate personalized mail; they do not appreciate improperly addressed or obvious saturation "junk" mail. The described envelopes facilitates the trend toward relevant, personalized direct mail because it allows the small "local" business or non-profit to expand their marketing in a cost effective manner by integrating a confidential outgoing envelope, a reply post card, and a business or affinity or loyalty card, plus potential other "freemiums" like credit card sleeves and bookmarks. The described envelopes support variable data personalization via digital press (or ink jet, laser, thermal, etc.) so that recipients can gain access to custom web sites to view their own accounts with a persistent uniform resource locator (PURL) and companies know exactly which offer prompted the recipient response. Direct Marketing Association (DMA) studies show that providing a return vehicle and making a mailer interactive helps boost response rates. the described envelopes does all of the above: it provides an "all-in-one" vehicle to take advantage of the power of digital printing with a paper and postage saving construction that integrates an outgoing envelope, reply post card(s), coupon(s), and or one or more business, affinity, or loyalty card(s) and other "freemiums" like protective card sleeves, bookmarks, buck slips, and other promotional items like lottery or sweepstakes tickets. Additionally, the described envelopes allow for the use of digital printing and conventional printing to create relevant invitations, special occasion gift cards, greeting cards, save the date note cards, or just simple portraits and pictures as an integral part of the described envelopes.

In addition to offering immediate benefits to the digital printer and consumer of digital printing, the described envelopes also offer substantial benefits to high volume commercial print users like magazine publishers, catalogers, governments, and business to business or business to consumer users of commercial print. This is because the described envelopes offer an integrated solution that uses less paper and less total postage (recipient can respond at a post card rate instead of a letter rate and the mailer can often send out the piece at a letter rate instead of at the higher flat rate, but of course the described envelopes could also be used and mailed at the flat rate when the described envelope exceeds 6⅛"×11½" or more than ¼" thick in the US). Less paper, less postage, less inventory space, and no mis-matched inventories translates into significant total cost savings for the large volume users of commercial printing.

Businesses, governments, and non-profits typically seek to optimize floor space usage and seek to avoid the costs of "stock outs" or uneven inventories. One problem with traditional mail-based systems that utilize separate components (i.e. outgoing envelopes, reply envelopes, reply post cards, coupons, business cards, membership cards, affinity cards, loyalty cards, buck slips, protective card sleeves, rulers, bookmarks, etc.) is that, invariably, one runs out of one item faster than another—in other words, mismatched inventories cost extra money, consume extra material, and use up extra space. The described envelopes solve this problem, and the problem of inserting small objects into an outbound envelope, by efficiently integrating a number of the direct mail components into a single, mailable system. It reduces, in one embodiment, the number of SKUs to track, the floor space required per mailing or even as a stand-alone brochure, and, therefore, the amount of natural resources and labor needed to perform the mailing. In some embodiments, an entity may choose to mail coupons or other inserts that allow the use of lighter paper that may be less expensive to mail than post cards.

Further, the described envelopes solve the problem of identity theft due to information leakage in the mailing process or in the recipient's handling of an activated card in several ways. First, it allows the mailer to safely send out a contactless card because the envelope can be made of RFID Blocking Material, such as PaperTyger's DEFENDER™ or other similarly available commercial substrate. Then, with the described Envelopes™, the end-user is encouraged to continue to protect their contactless card with the embedded credit card sleeve or buck slip which the recipient separates from the described envelopes. In other words, the described envelopes incorporate the RFID blocking material and allow the sender/recipient to include as part of the construction a continued methodology to shield the contactless card from unauthorized scanners. Upon receipt, either the embedded credit card sleeve is separated from the outbound envelope and folded by the consumer to continue to protect his/her new contactless card in the purse or wallet, or the coupon/buck slip is similarly separated and then used to protect all the cards in one's purse or wallet. A second, and potentially lower cost method, is to apply the RFID blocking material specifically over the intended "freemium" that, once removed, will continue to protect the recipient's contactless ATM, gift card, membership, medical, temporary ID, security, loyalty or affinity card from unauthorized scanners. This methodology allows more efficient targeted application of the expensive RFID blocking material without sacrificing overall protection within the described envelopes. In some embodiments, the described envelopes also allow for the protection of a conventional magnetic strip card from scratching when one utilizes the embedded card sleeve as described herein.

As the need to be environmentally friendly becomes more obvious to the world in order to reduce the effects of global warming, then there will be a greater need to have more environmentally friendly envelopes to service the transaction and direct mail, and balloting needs of the world's citizens on sizes other than those that carry DVDs/CDs/etc. and can instead efficiently carry paper and other communication like invoices and statements in popular commercial sizes like a #10 outgoing envelope (4⅛×9½) or DL outgoing envelope (110 mm×220 mm) and a #9 reply envelope (3⅞×8⅞) or C7/6 reply envelope (81 mm×162 mm) However, acceptance by the world's posts often requires 2-way envelopes to meet stringent regulations on design that require the removal of the outgoing indicia and other marks from the outbound envelope so that there is no confusion in the processing of the reply envelope. The envelopes described herein allow the introduction of 2-way envelopes into the high volume transaction, vote-by-mail, and direct mail markets (approximately 211 billion pieces of mail in 2007 in the US alone) popularized in the US by the #10 (4⅛×9½ size) since the envelopes described herein remove printed marks that could confuse the postal system while maintaining an extremely end-user friendly reply envelope (i.e. the outbound envelope can be opened with a letter opener on three out of four sides without destroying the integrated reply envelope).

Additionally, unlike other two way or remailable envelopes, the envelopes described herein actively promote the re-use of the outgoing face of the envelope to be used, once separated, for additional revenue-generating activities, information-providing activities, or information-receiving activities. The separated panel can be re-enclosed into the reply envelope or be brought into a retail establishment for coupon redemption. When this dual purpose panel (generally the outgoing address on the face and a coupon or survey or call-to-action copy or ad on the inside) is considered as a displacement of a separate insert, then the environmental utility of the envelopes described below (one piece of paper doing the work of three—outbound envelope, reply envelope, and insert) becomes arguably one of the most efficient 2-way re-mailable vehicles available on the planet.

Furthermore, the envelopes described herein need not contain an embedded reply envelope; rather, these envelopes may contain an embedded survey or ballot that can facilitate confidential vote-by-mail, census and survey applications. As described below, the separating perforations that define the reply envelope may instead be used to define a ballot or survey wherein the recipient would seal all three exposed sides to protect privacy. In some embodiments, such an envelope would include remoistenable gum to seal the ballot. Such an envelope may be stuffed with a second envelope which may be taller and wider than the ballot (but smaller than the outbound envelope) by which the recipient may return the confidential survey or ballot and by which the original address from the face of the original outbound envelope may be similarly returned once removed from the face or back panel thereby providing "proof" of the voter without revealing the voter's confidential intent. Vote-by-mail and survey applications help reduce the carbon footprint by eliminating inefficient travel to the polls and help stimulate voter turnout by eliminating such negative factors as weather, sickness, or personal emergency.

In some embodiments, described in additional detail below, a 7-point post card incorporated into an envelope allows a user to incorporate a note card into the envelope rather than a post card. In one of these embodiments, and by way of example, a user may incorporate a greeting card into the envelope; for example, the note card may be personalized to include a personal message to user family members. In another of these embodiments, and as another example, a user may incorporate a photograph into the envelope; for example, the post card portion of the envelope may incorporate slits that would allow the recipient of the card to put the photograph into a frame formed by the outbound face and the inside panel of the envelope. In still another of these embodiments, the note card may incorporate a fundraising message. With digital printing, one can economically print units of one and still charge a premium with the personalization, which allows for the use of the envelopes described herein in markets such as greeting card, gift card, social media, or photograph markets.

In some embodiments, an envelope as described herein reveals an inside face panel while still allowing a user mailing the envelope to incorporate a reply vehicle or response vehicle into the envelope; reply vehicles, as described above, may include post cards, reply envelopes, coupons, business cards, affinity cards, greeting cards, save-the-date cards, invitations, vote-by-mail ballot or census forms. In other embodiments, larger sizes of envelopes may be used to mail inserts such as booklets.

Figure 2:
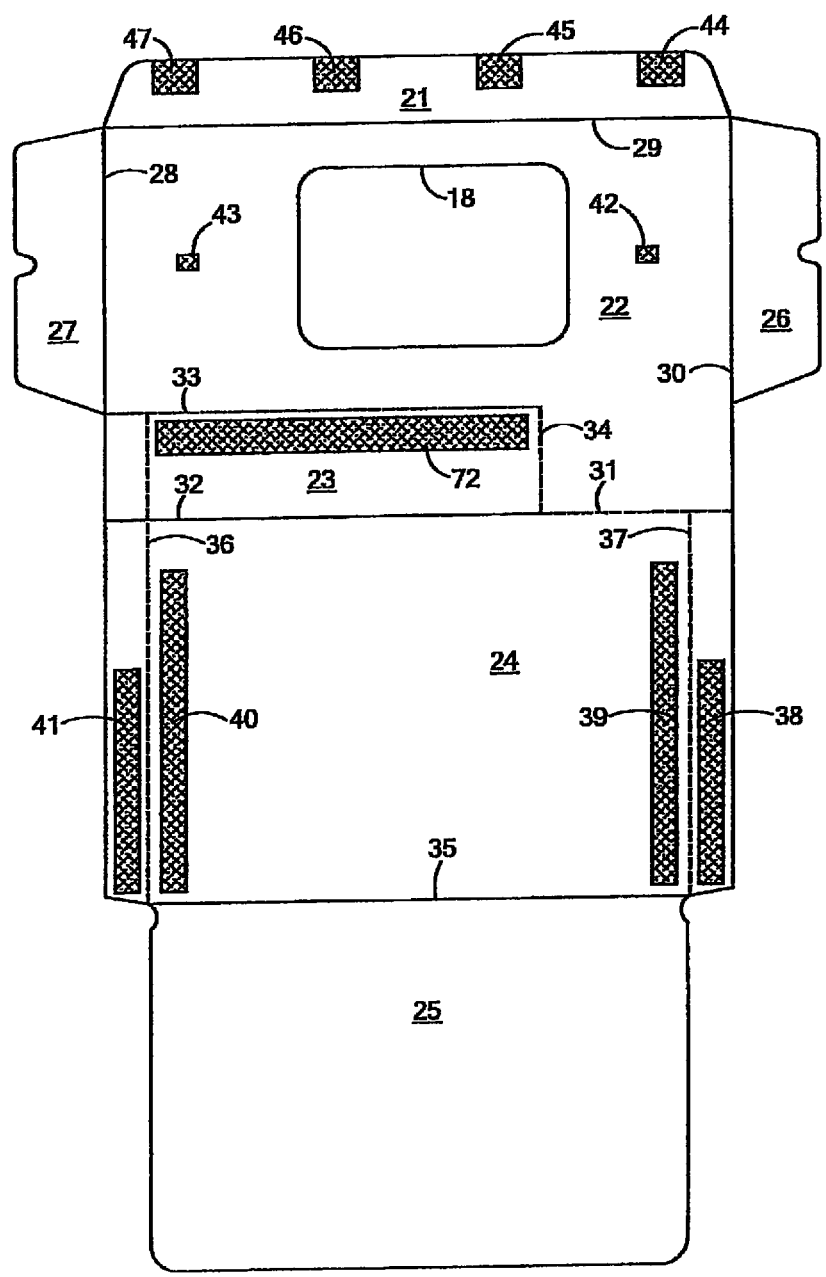
FIG. 2 is a block diagram depicting an inside view of an unfolded envelope.

Referring now to FIG. 1 (Face View Unfolded), and in conjunction with FIG. 2 (Inside View Unfolded), a block diagram depicts a Multimedia Remailable Envelope (which may also be referred to as an MRE) as an envelope made up of an outgoing seal flap (1 Face View and 21 Inside View), face panel (2 Face View and 22 Inside View) which includes an embedded reply envelope seal flap (3 Face View and 23 Inside View), a back panel (4 Face View and 24 Inside View), a face panel for the reply envelope (5 Face View and 25 Inside View), and side seams for the outgoing face panel (6 and 7 on Face View and 26 and 27 Inside View). Side seams may also be available and located for the reply envelope as in FIG. 13. The Face Panel of the outgoing envelope (2) may have no windows, one window (18), or multiple windows and the windows may or may not be covered with window material or paper material or other material. Similarly, the back panel (4) and the reply face panel (5) may have no windows, one window, or multiple windows with or without window covering material. The absence of window covering material allows the sender to spray or otherwise imprint bar codes or other personalized or generalized information through the open window either onto the reply envelope panels or onto any inserts thereby providing value-added services to the mailer and the recipient.

Figure 3:
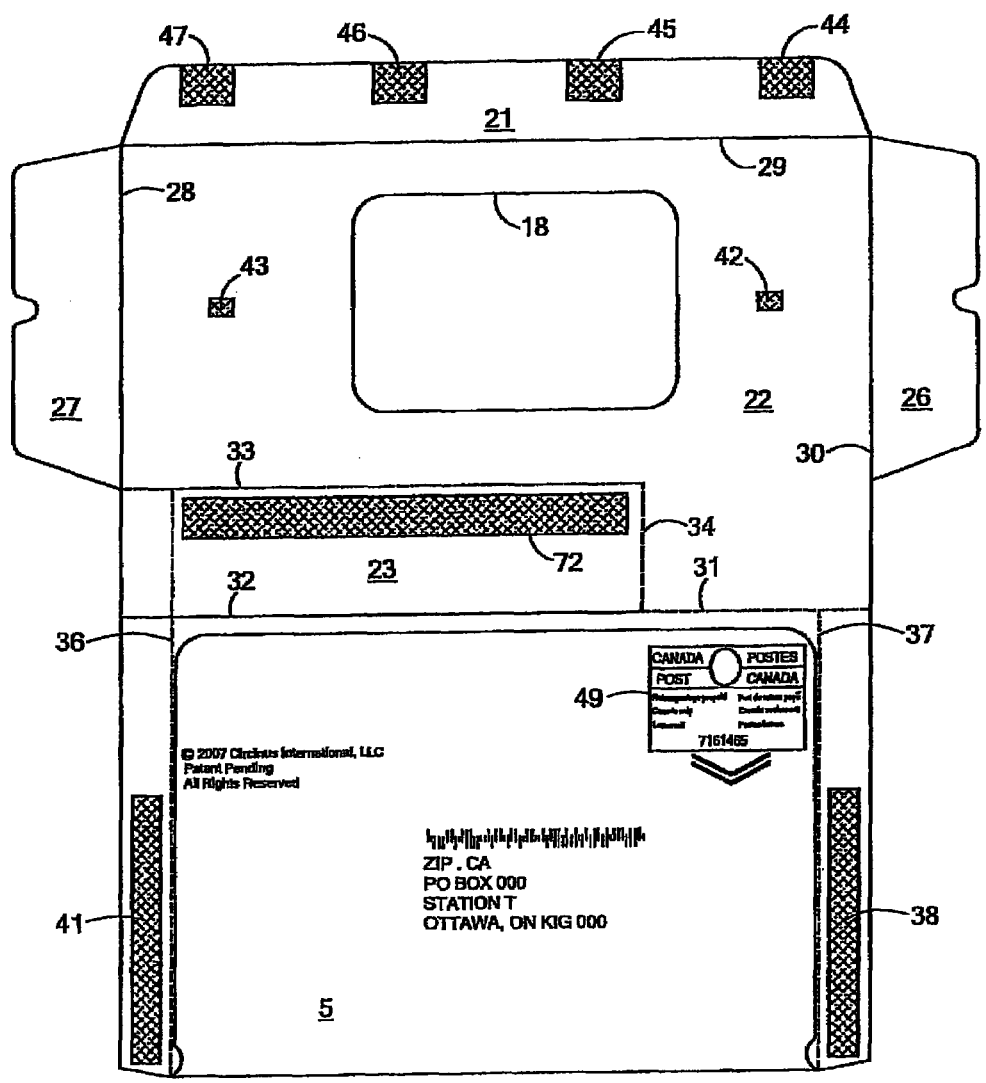
FIG. 3 is a block diagram depicting alternate embodiments of adhesive strip placement on an inside of a face panel of a return envelope.
Figure 13:
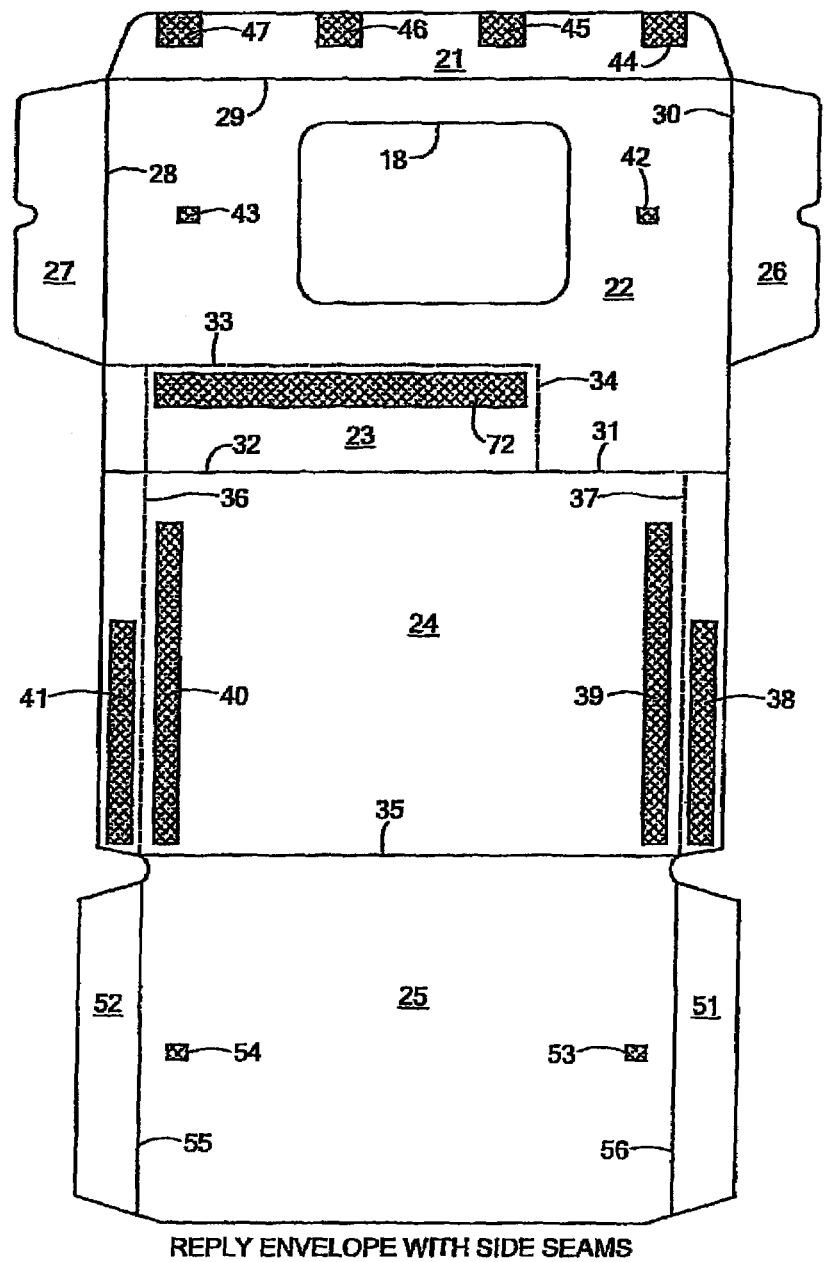
FIG. 13 is a block diagram depicting a side seam construction for a reply envelope.

The MRE is formed by having the face panel of the return envelope (5 Face View and 25 Inside View) fold upwards around score (35) towards the back panel (24). The face panel of the return envelope (5) is affixed to the back panel (24) by means of adhesive strips 39 and 40. Notice that the MRE would still work if the adhesive strips 39 and 40 were alternatively located on the inside of the return envelope's face panel (25) as adhesion is made once the two panels come in contact with each other (25 meets 24) as shown in FIG. 3. Also notice that the MRE could be made using a side seam construction for the reply envelope as shown in FIG. 13 wherein the two side seams (51 and 52) fold inward to panel 25 before folding up around score and fold line 35.

Figure 4:
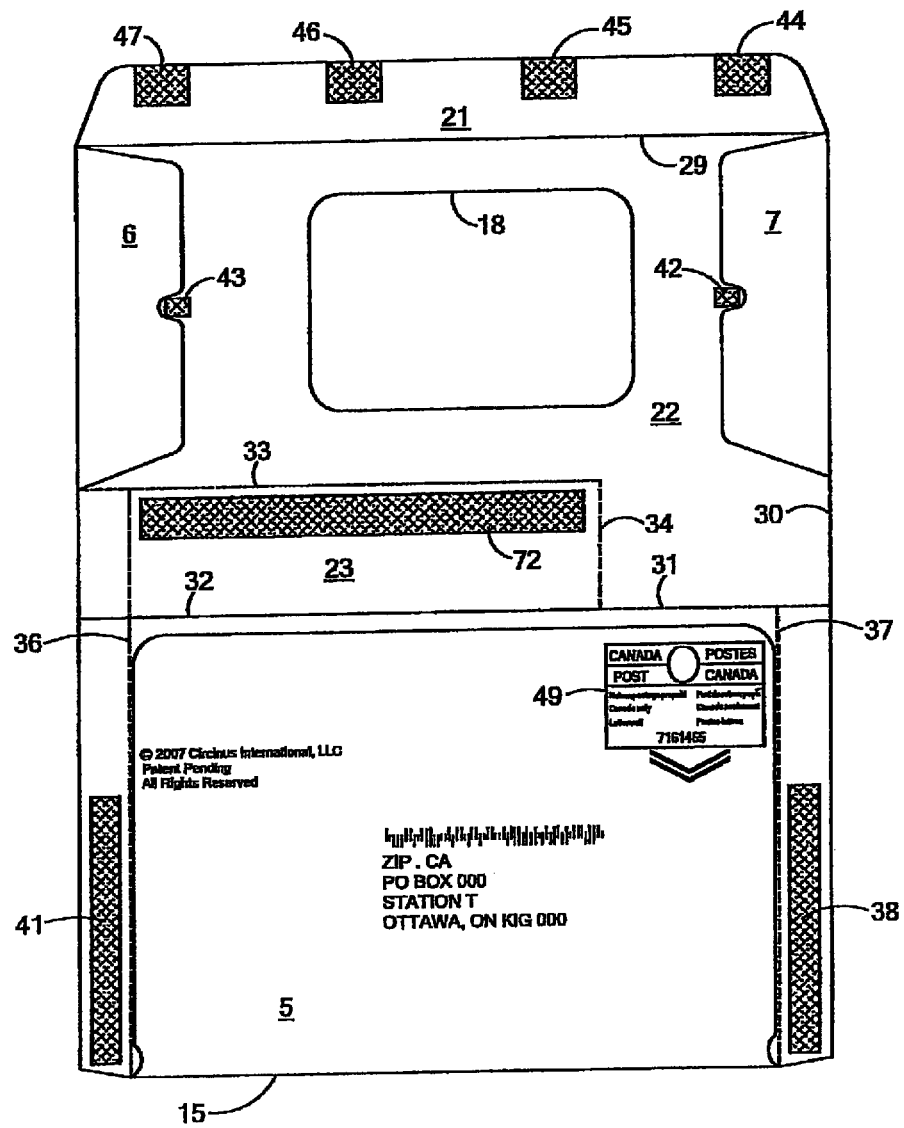
FIG. 4 is a block diagram depicting an embodiment of an envelope constructed with side seams folding inward.

As shown in FIG. 4, the MRE is then further constructed with side seams (26 and 27 Inside View or 6 and 7 Face View) folding inward toward the outgoing envelope's face panel (22). Alternatively, the side seams (26 and 27) could be folded last about scores 28 and 30 and adhere to the outer edges of the back panel (4) outbound of separating perforations 13 and 14 thereby forming an "outside" side seam which improves the total strength of the outbound envelope versus inside side seams; however, in general the postal automation equipment prefers inside side seams to avoid "hooking" other pieces of mail in the mail stream. In any event, the side seams (26 and 27) allow for automatic insertion of the DVD/CD/or other media and inserts more readily than a welded construction—but the MRE could still be made without side seams such that the outside adhesive strips (38 and 41) of the back panel adhere directly to the inside of the face panel (22) thereby obviating the need for side seams (26 and 27) (but again, the welded construction is less machine insertion friendly and may be less postal friendly due to the limpness of the outer edges of the mailer versus the preferred side seam construction).

Notice that the side seams (6 and 7) in FIG. 4 may also be tacked to the inside face panel (22) to form a "lock" with a spot of glue (42 and 43) to keep the multimedia contents from shifting side to side during transit. The location of the glue spots (42 and 43) could also be inward of the side seams (6 and 7) and therefore not visible in FIG. 4 or they could be below the side seams (6 and 7). Alternatively, the "lock" could be located to align the multimedia contents in either a far left edge configuration or a far right edge configuration of the outbound envelope rather than a center location. Similarly, if a "lock" is desirable in the return envelope configuration, then additional gum strips or gum spots may be added inward of the adhesive strips (39 and 40) as shown in FIG. 2 or they may be created with the use of side seams with the reply panel 25 as shown in FIG. 13 with glue spots 53 and 54.

Figure 5:
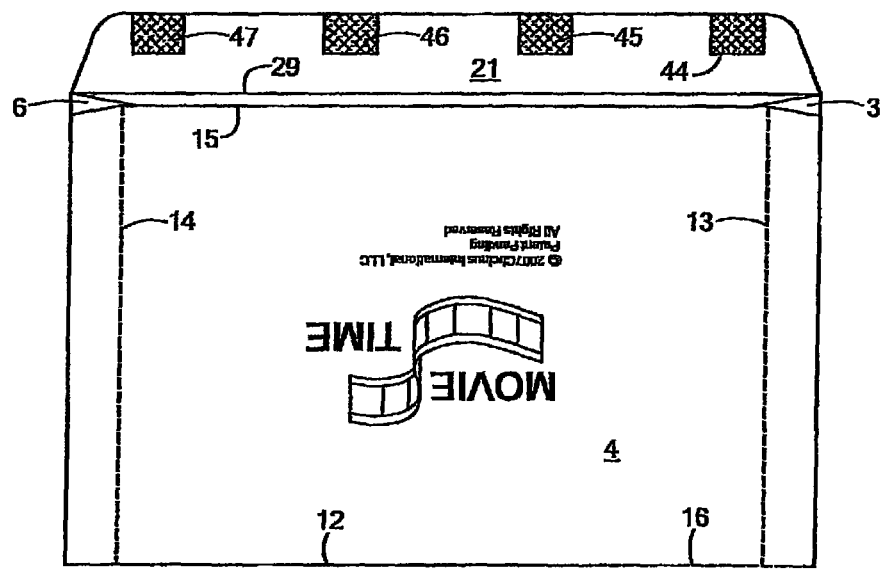
FIG. 5 is a block diagram a back panel of an outgoing envelope.

FIG. 5 of the MRE depicts the back panel of the outgoing envelope (4) folding up and around the score/perf and fold line (12 and 16 Face View or 31 and 32 Inside View). As a result of this fold, the adhesive strips 38 and 41 on the inside of back panel (24) now come in contact with the side seams (6 and 7) of the face panel (2 Face View or 22 Inside View). Alternatively, the side seam adhesive strips could be located on the folded in side seams 6 and 7 and the result would be the same in that the back panel (4) becomes adhered to the sides seams (6 and 7). If there were no side seams, the MRE would be folded as a "welded" construction with adhesive strips 38 and 41 adhering directly to the inside face panel (22). Notice that the outgoing seal flap (21 Inside View) may be left extended as in FIG. 5 or folded down as in FIG. 6. The seal flap of the outgoing envelope (21) may be adhered to the back panel (4) through remoistenable adhesive (44, 45, 46 and 47), fugitive adhesive, pressure sensitive adhesive, hook and loop, clasp, string & button, latex, etc. The MRE as shown in FIG. 5 uses "spot" gum of remoistenable adhesive (the spots can be varied in size and shape and location on the seal flap 21) to accomplish the dual purpose of adhering the seal flap (21

Inside View or 1 Face View) to the outgoing back panel (4) without so much tack as to rip the back panel (4) upon opening by the recipient. With the remoistenable adhesive on the seal flap and the automatic insertion compatibility of the side seam envelope construction (or welded construction) there is no need for a wafer seal to meet automatic postal processing requirements as there would be if the envelope were unsecured along this dimension. Eliminating wafer seals is a significant improvement to postal automation processing speeds and total throughput.

Figure 6:
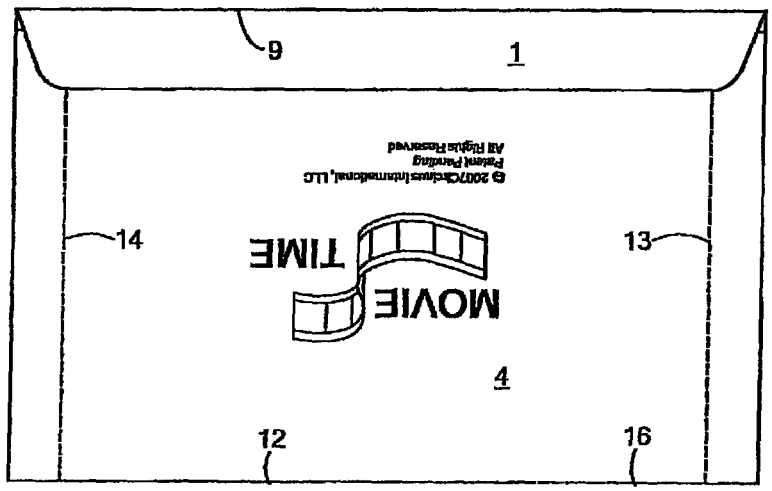
FIG. 6 is a block diagram depicting a seal flap of an envelope.

FIG. 6 of the MRE depicts the seal flap (1) folded down over the top score and fold line (9 Face View or 29 Inside View) to complete the mailer. It should be noted that some users of the MRE may prefer to receive the envelopes with the seal flap (1 Face View or 21 Inside View) extended as shown in FIG. 5 as opposed to folded down as shown in FIG. 6.

Figure 7:
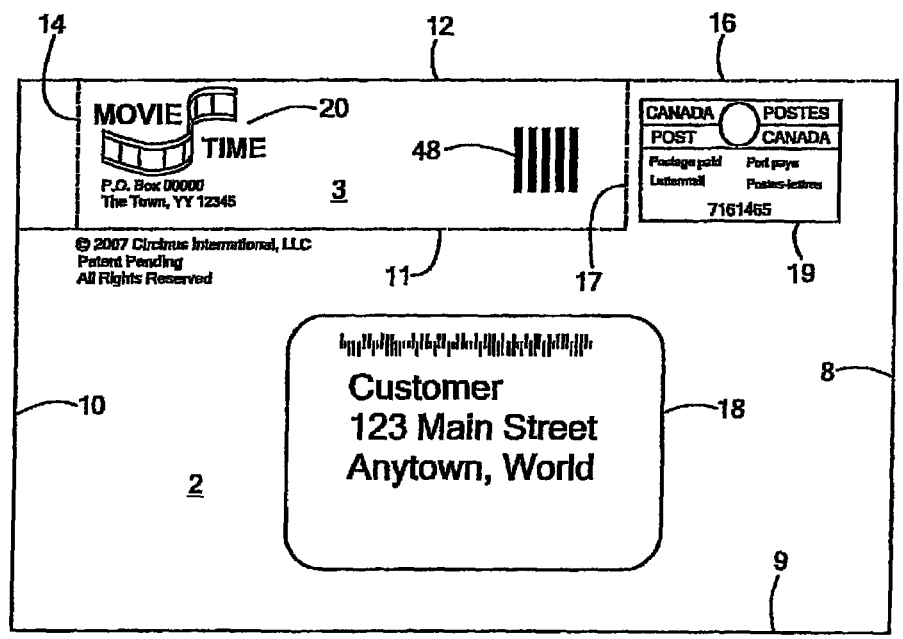
FIG. 7 is a block diagram depicting a face view of an envelope as a customer would likely receive the envelope.

FIG. 7 of the MRE depicts the face view of the envelope as a customer would likely receive the envelope in the mail stream. The address for the customer could be printed directly on the envelope by ink jet, laser, or other print medium or it could be affixed by a preprinted label or it could be part of the insert which would show through a window with or without a clear window film covering (18). Notice how the Facing Identification Mark (FIM) (48) may be printed on the face of the outgoing envelope in a manner that will not confuse the automated postal processing equipment because it is outside the read area due to the separable perforations as defined by 13 (on the outgoing back panel 4) and 14 (on the outgoing back panel 4 and face panel 2). For example, in the United States, the FIM must be between 1⅞" and 2⅛" from the right edge of the mail piece (8), so, by locating the separating perforations (13 and 14), which define the width of the reply envelope (4), inboard from the edge of the outgoing envelope by 5/16" or so, then the FIM (48) is outside the read area for outbound processing on panel 2, but falls into the correct place for the integrated reply envelope processing when it folds over onto the face of the reply panel (5).

Figure 8:
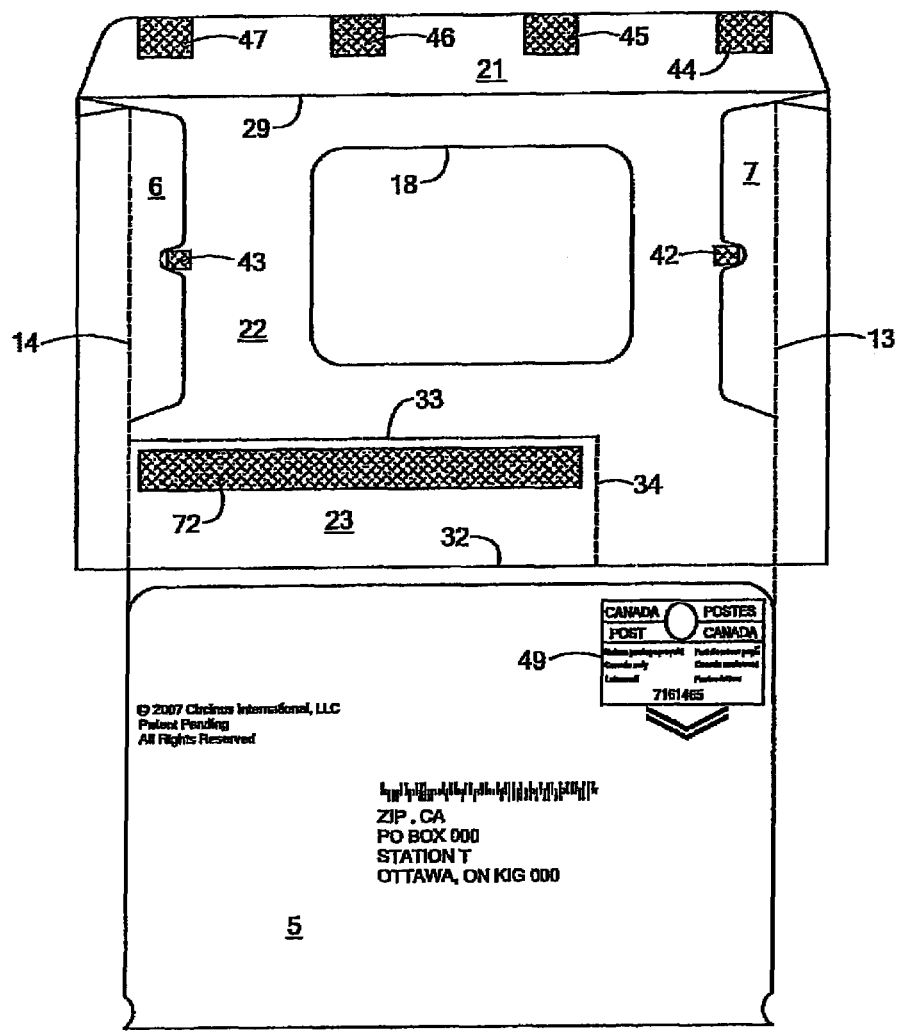
FIG. 8 is a block diagram depicting an envelope having a liftable seal flap used in opening the envelope.

FIG. 8 of the MRE depicts the recipient opening the MRE by lifting the seal flap (1 Face View or 21 Inside View) and by pulling down the reply envelope (5) from the separating perforations (13 and 14). Notice how the MRE would not be destroyed if the recipient used a letter opener to tear along the top score (9 Face View or 29 Inside View) and, in fact, the envelope could be opened with a letter opener along side edges 8 and 10 without destroying the reply envelope. Consequently, the MRE is truly end-user friendly being openable with a letter opener on 3 out of 4 sides without destruction.

Figure 9:
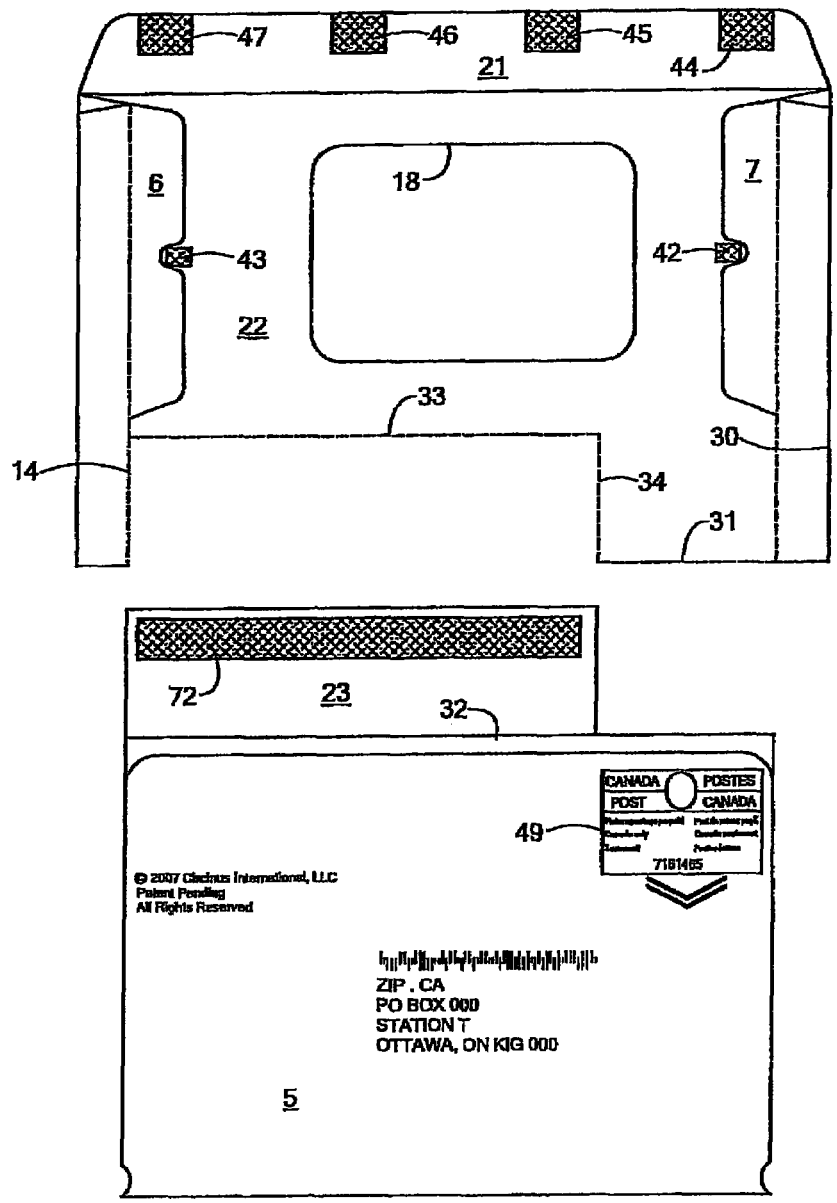
FIG. 9 is a block diagram depicting a reply envelope separated from an inside face panel of an outgoing envelope.
Figure 10:
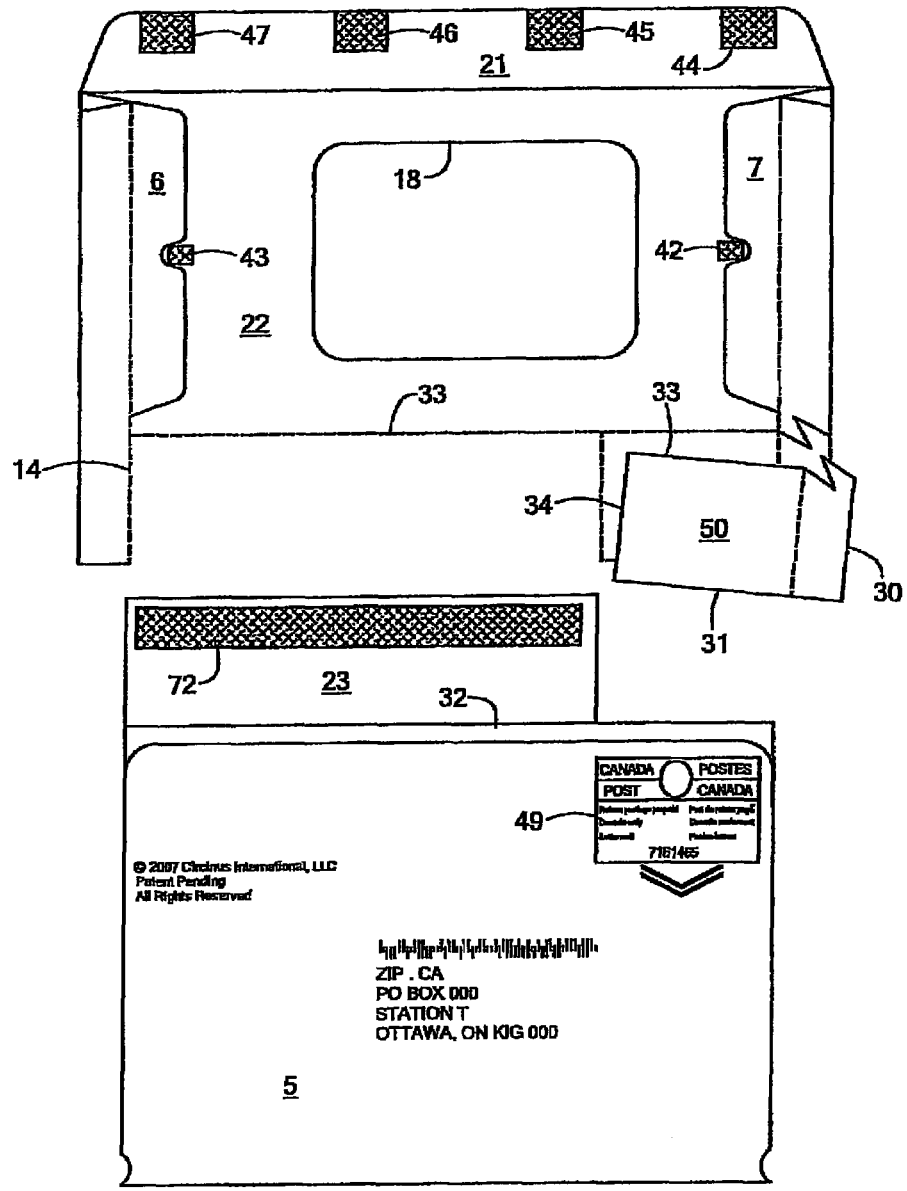
FIG. 10 is a block diagram an envelope including an advertising section.

FIG. 9 of the MRE depicts the final separation of the reply envelope (5) from the outgoing envelope's inside face panel (22) by continuing along the vertical perforation (14) from the back panel (4) onto the face panel (2); by coming across the horizontal separating perforation (33) and vertical perforation (34); and then by completing across horizontal perforation and bottom score (31). Note that the MRE would still separate properly if the horizontal separating perforation were to continue completely across the inside face panel (22) as shown in FIG. 10. One could then separate a small rectangle (50) defined by separating perforations 33, 34, 31 and the edge of the outgoing envelope (30). The purpose of removing a small quadrant of material (50) which abuts the reply seal flap (23) is to promote the easy removal of the outgoing indicia (19) and to reveal the return indicia of the reply envelope (49). As long as the length of the reply seal flap (23) is at least beyond the midpoint of the top score (32), then no wafer seals are necessary to provide additional security to the envelope seal flap (23). Also, if desired, the small rectangle (50) as defined by perforations 31, 34, outbound edge 30, and the extension of horizontal perforation 33 could be used to create a special advertising section or coupon options by the sender as shown in FIG. 10. In fact, one of the significant benefits of the MRE is that the recipient, through the natural opening sequence, has the opportunity to see and respond to advertising copy on the inside face panel (22) which can be readily couponed (to be returned with the reply envelope or to be redeemed at a retail establishment) or which can drive a recipient to his/her own personalized web site ("purl") or general web site ("gurl") for further customer interaction (see FIG. 35 and FIG. 36). Consequently, the MRE offers significant reduction in paper consumption beyond just creating an integrated reply envelope to go with the outgoing envelope because of its couponing/advertising opportunity of the inside face panel (22).

Figure 11:
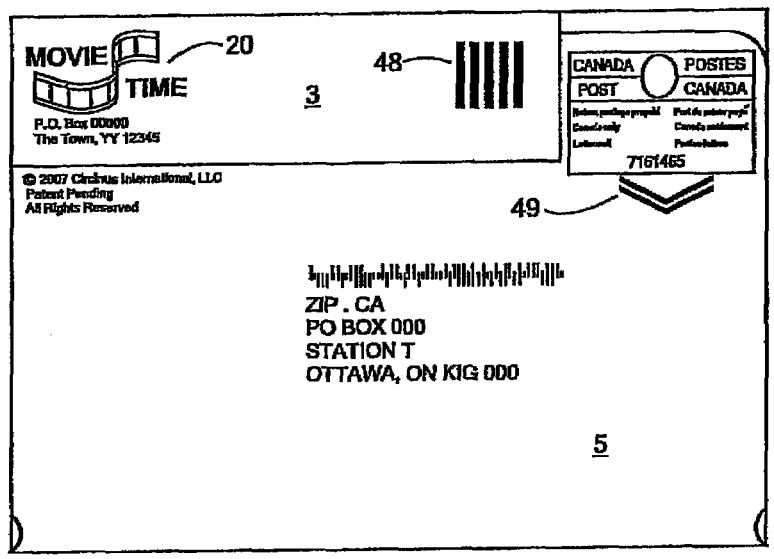
FIG. 11 is a block diagram depicting a face view of a reply envelope.

FIG. 11 of the MRE depicts the face view of the reply envelope. The reply seal flap (3) is folded down over the top score and fold line (32) of the reply envelope that was coincidentally the bottom score and fold line (32) of the outgoing envelope. The reply seal flap (3) can be affixed to the reply face panel (5) by one or more various adhesive techniques including remoistenable adhesive, pressure sensitive, fugitive, clasp, string & button, hook & loop, latex, etc (72). Again, one or more windows with or without window covering material could be present in either the face panel of the reply envelope (5) or in the back panel of the outgoing envelope (4). Notice how the FIM (48), which was in a harmless location on the face panel of the outgoing envelope (2), is now properly aligned to serve its intended purpose as the FIM for the reply envelope (5). Notice, too, that with the removal of the small rectangle of material from the outbound face panel (see 50 in FIG. 10) that the proper reply indicia (49) on the face of the reply envelope (5) is now visible and in the proper position on the reply envelope (5) for the return mailing. As long as the reply seal flap (3) extends beyond the midpoint of the reply envelope (5), no wafer seals are required but they could be added for additional security if desired by either the sender or the recipient.

Figure 12:
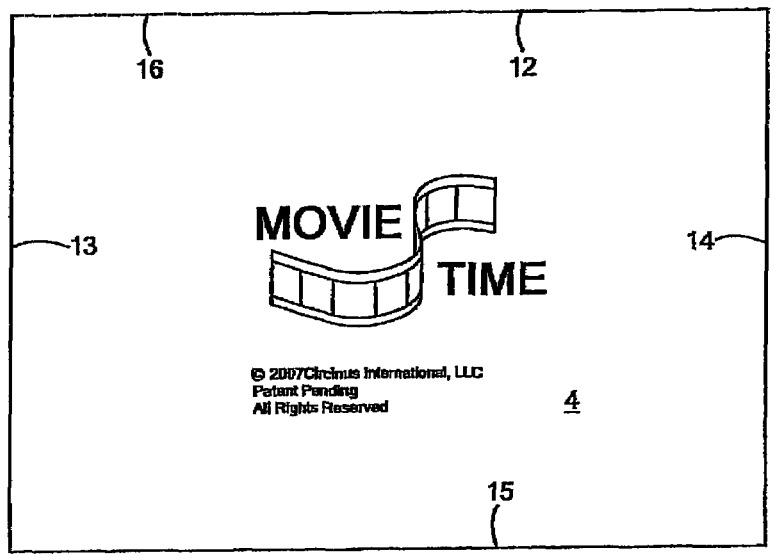
FIG. 12 is a block diagram depicting a back view of a reply envelope.
Figure 22:
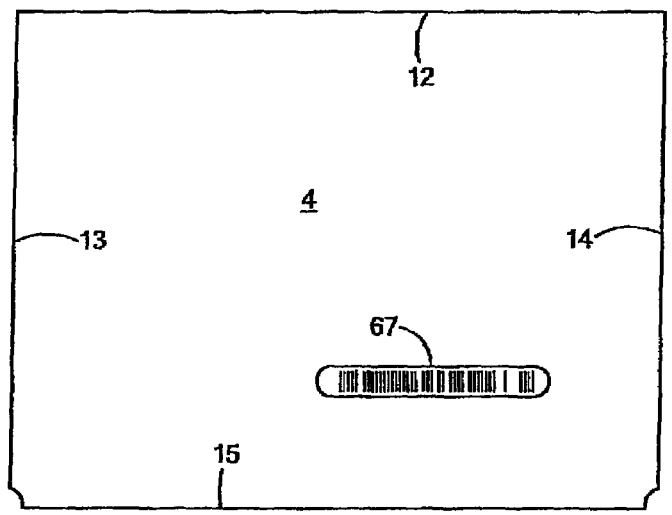

FIG. 12 of the MRE depicts the back view of the reply envelope (4). Again, one or more windows may be present either with or without patch covering material to allow for product tracking or alternative data communication between sender and recipient (e.g. bar code data for movie title tracking as seen in FIG. 22).

FIG. 13 of the MRE depicts a side seam construction for the reply envelope with side seams (51 and 52) parallel to the reply envelope's face panel (25). The side seams fold inwardly about the side score and fold lines (55 and 56) and could then have a glue lock mechanism (53 and 54) as similarly described for the side seams (26 and 27) of the outgoing face panel (22). Similarly, too, the adhesive strips (39 and 40) could be relocated from the outgoing envelope back panel (24) and be placed on top of the side seams (51 and 52) once the side seams were folded inward over their respective score lines (55 and 56). A side seam construction in the reply envelope is not required for the envelope to work, but side seams allow for faster extraction of the contents by the final recipient (generally the original sender) versus a welded construction as the high speed automatic extractors as made by OPEX and others work best with side seams as there is a risk of slitting the contents with a welded construction. Also, the side seam construction helps improve stiffness of the reply envelope configuration that helps improve postal automation speed and reliability without breakage. In some embodiments, the use of side seam construction results in an envelope having perforations on all four sides. In one of these embodiments, such an envelope may separate out into a plurality of components facilitating a process for opening the envelope. In another of these embodiments, if a recipient pulled the entire back panel away from the face panel of such an envelope the envelope would then allow the recipient to handle the individual pieces separately.

Figure 14:
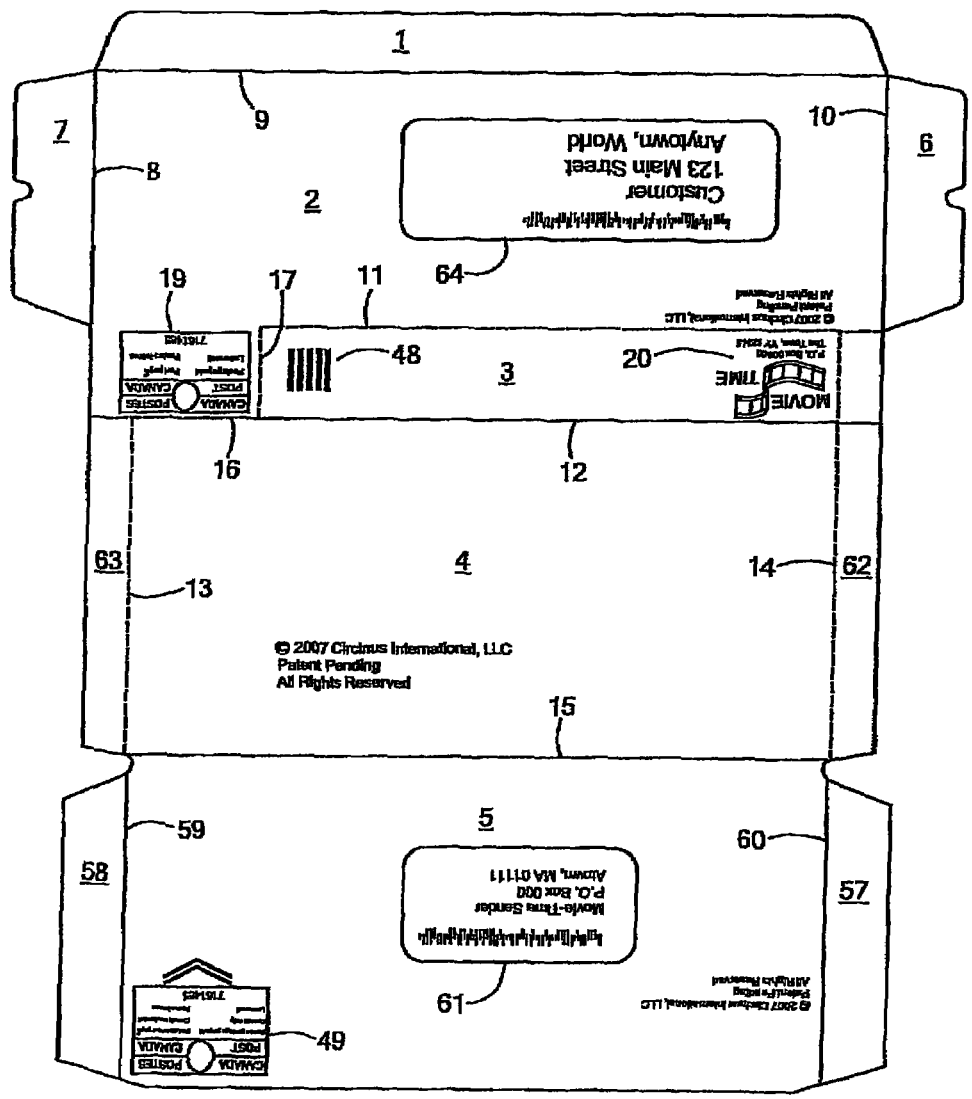
FIG. 14 is a block diagram depicting one embodiment of an outbound two-way envelope.

FIG. 14 of the MRE depicts a popular commercial size for the outbound 2-way envelope as a #10 envelope (4⅛"×9½") in the US or as a DL size in Europe (110 mm×220 mm) with a popular commercial size reply envelope as a #9 envelope (3⅞×8⅞) were the separable perforations (13 and 14) located inward on each side of the outbound envelope by 5/16" as defined by strips 62 and 63. Similar to other embodiments, the MRE could have multiple windows (61 and 64) with or without window covering material in all panels (2, 4, and 5). Also, for high volume applications, it may be advantageous to allow the outbound postage indicia (19) or other postal markings to be applied to the insert and then be revealed through a window on the MRE. In other words, the area occupied by the preprinted indicia (19) on the outgoing face panel (2) or the indicia (49) on the reply envelope face panel (5) could appear as a window (with or without window covering material) such that the pre-printed indicia on the insert would then show through the window. Note, too, that similar to FIG. 10 it might be advantageous in some applications to extend the horizontal separating perforation (11) across the face panel (2) such that a mini coupon could be formed as defined by separating perforations (11, 16, and 17) and the side of the envelope (8). In the event that the "open" space at the top of the reply envelope that is undefined by a seal flap (i.e. 16 as opposed to 12) were undesirable, then the MRE could still function either by extending the horizontal separating perforation (11) completely across the outgoing face panel (2) so that the reply seal flap (3) is the full width of the reply envelope panels (4 and 5) as shown in FIG. 15 or by encouraging the recipient to apply a wafer seal or other promotional item to cover the small "open" space as defined by the distance of the separating perforation (16) which precedes the reply seal flap (3).

Note that in some embodiments, for environmentally conscious mailers and consumers, the outbound envelope could be further reduced to a #9 size (3⅞×8⅞) in the US or similar metric size internationally with a correspondingly smaller reply envelope. The point of the MRE is that, in some embodiments, it allows for dramatic reduction in paper consumption by commonizing on panels between and within the outbound envelope and the return envelope in a manner that meets or exceeds postal automation requirements, end-user opening friendliness, and automatic machine insertion and extraction requirements while preserving the privacy and confidentiality associated with an envelope construction (or form construction). The MRE further encourages the conservation of resources by allowing the inside panel (22) to serve as an advertising or messaging vehicle thereby further displacing a separate insert. When the face panel (2) has been addressed to the recipient, and if the recipient responds by enclosing the panel (22 Inside View), then the sender will get back the all important "source code" and additional data about the recipient. Therefore, the MRE is extremely effective at minimizing the total amount of paper (or other material) needed for an out and back mailing.

Figure 15:
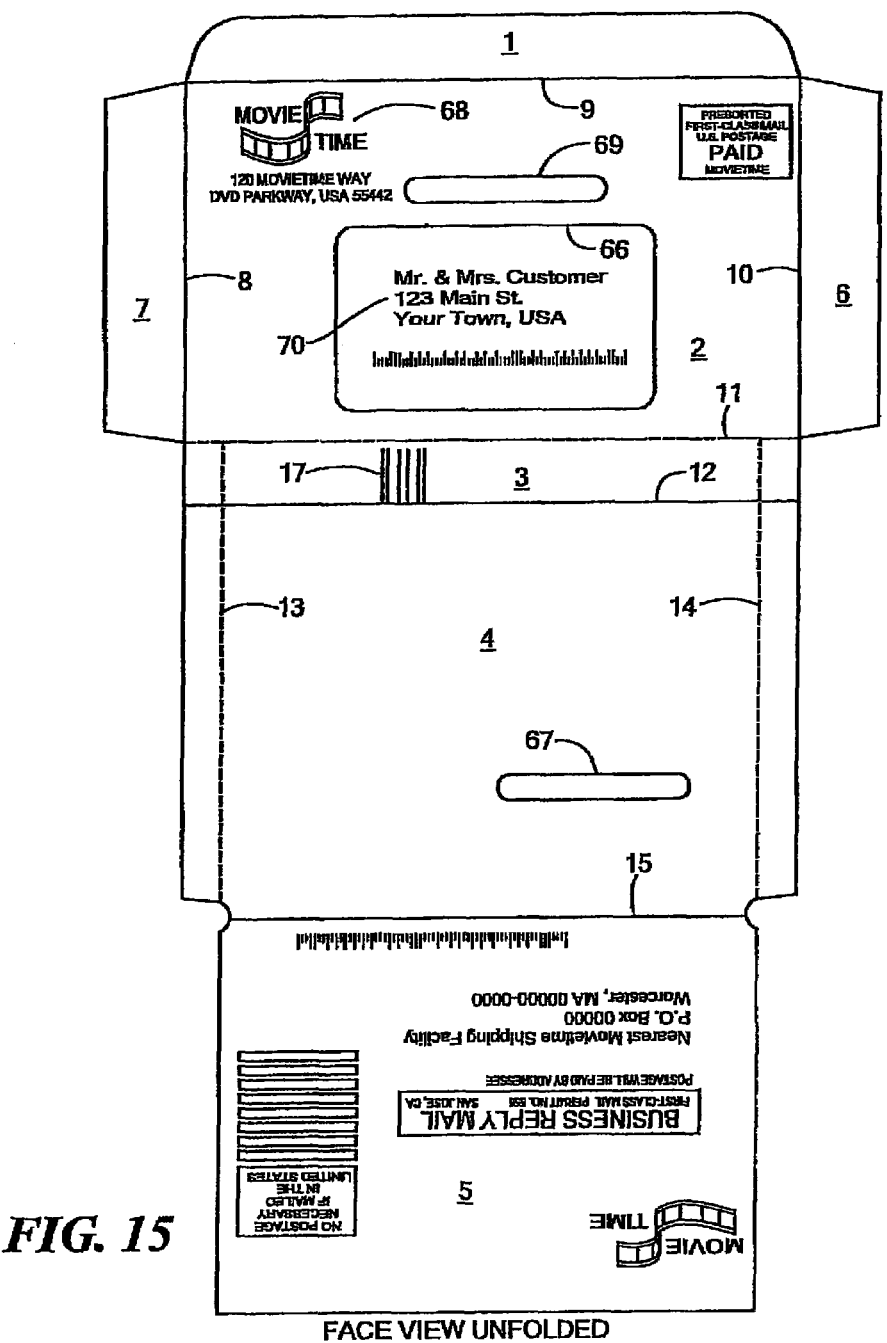
FIG. 15 is a block diagram depicting an embodiment of a face view of an unfolded envelope having a separating perforation between an outbound face panel and a reply seal flap running parallel to a bottom fold.
Figure 16:
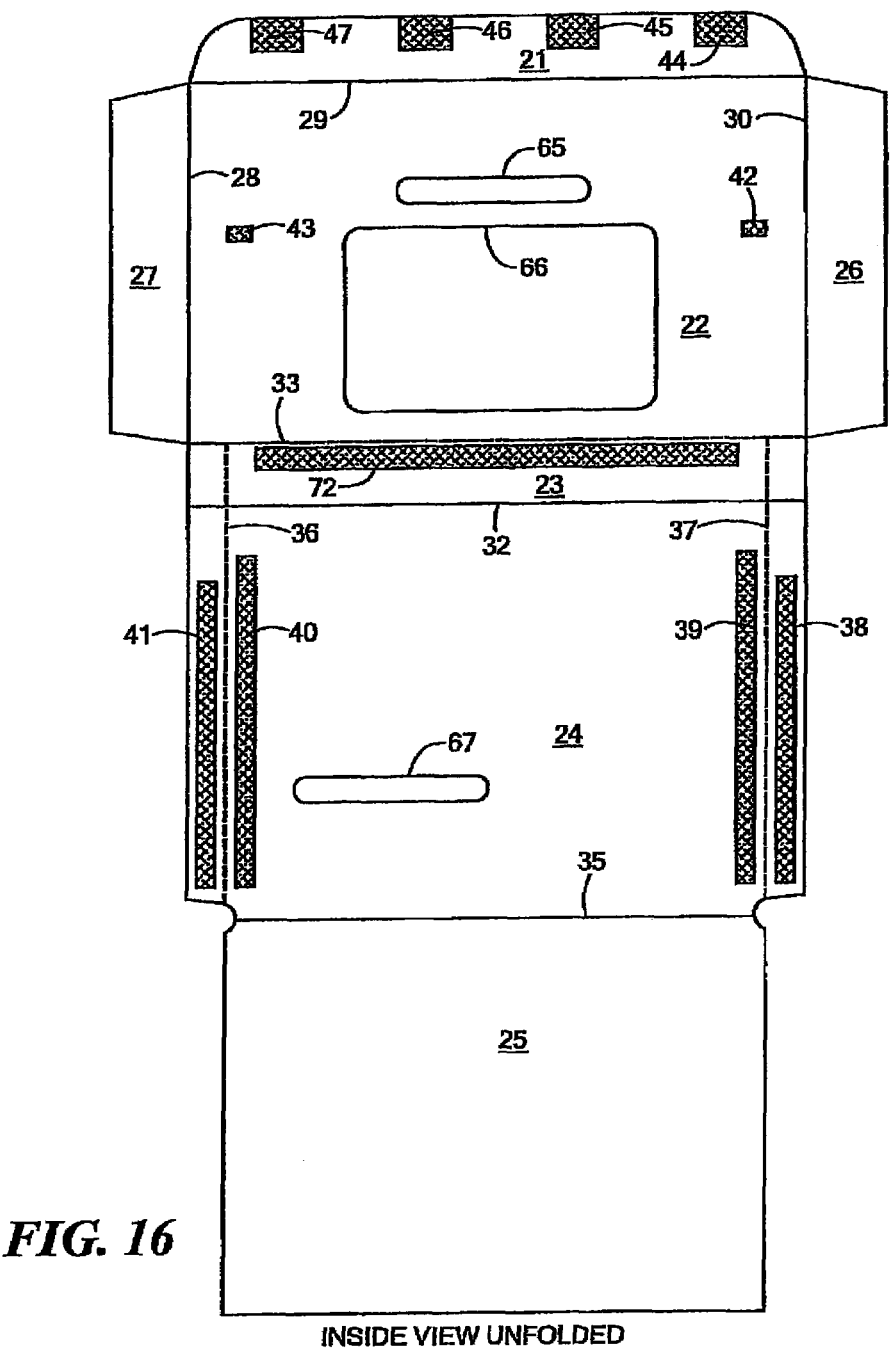
FIG. 16 is a block diagram depicting an embodiment of an inside view of an unfolded envelope having a separating perforation between an outbound face panel and a reply seal flap running parallel to a bottom fold.
Figure 17:
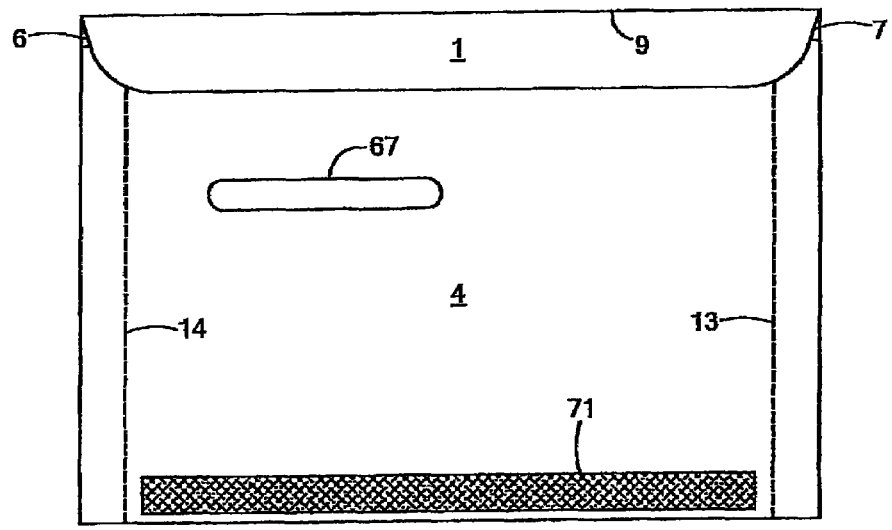
FIGS. 17-22 are block diagrams depicting embodiments of opening sequences for an envelope when the outbound address copy is parallel and right reading to the bottom score of the outbound envelope and top score.
Figure 18:
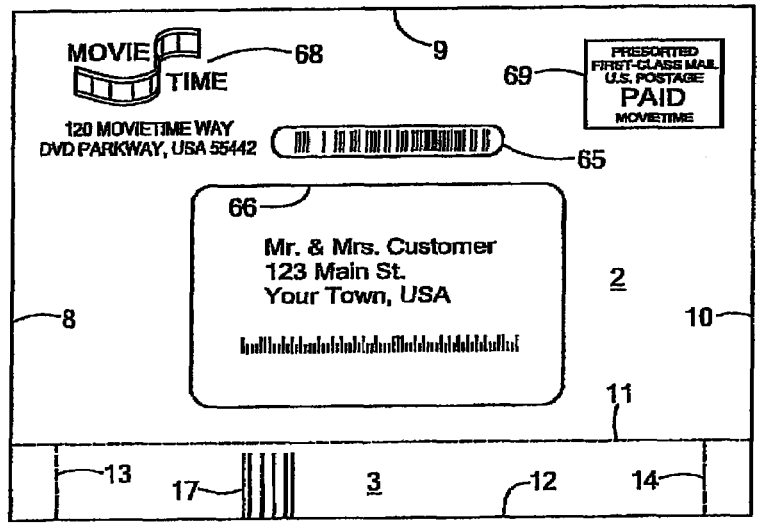
Figure 19:
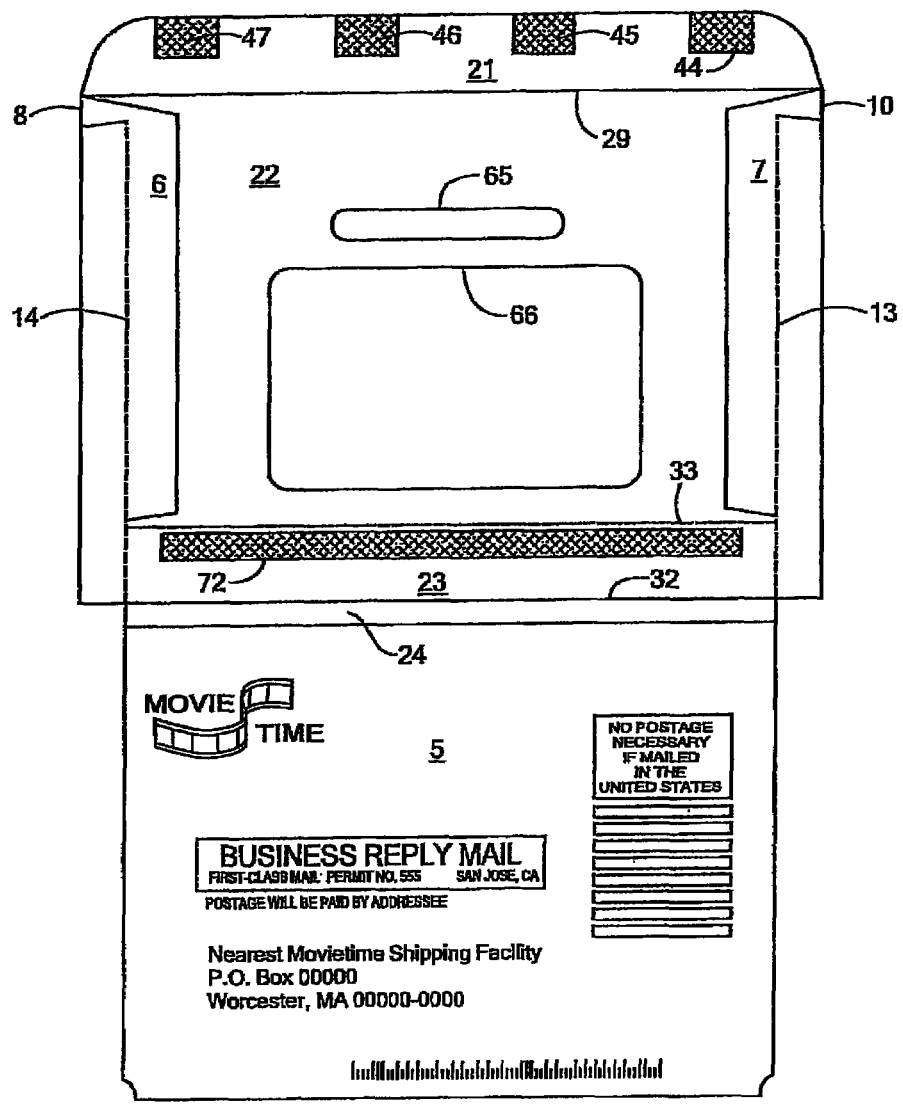
Figure 20:
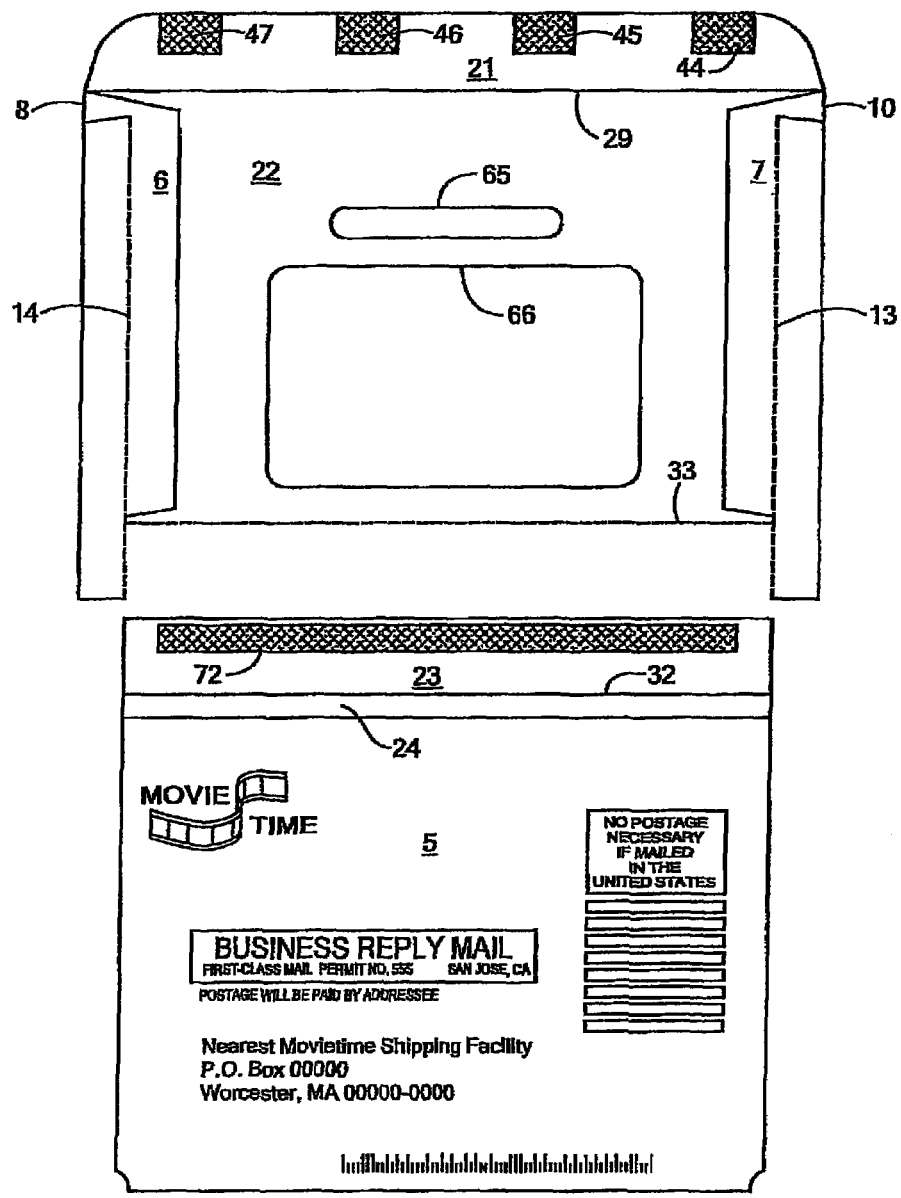
Figure 21:
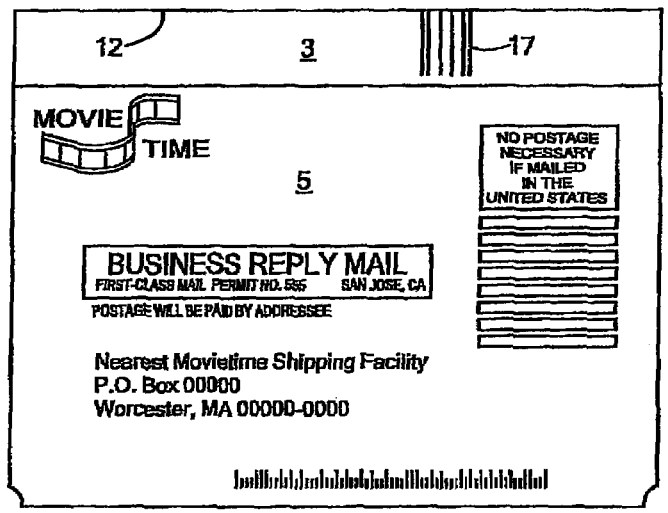

FIG. 15 (Face View Unfolded) and FIG. 16 (Inside View Unfolded) depict the MRE similar to FIG. 1 and FIG. 2 except that the separating perforation between the outbound face panel (2) and the reply seal flap (3) now runs across and parallel to the bottom fold (12) of the envelope thereby providing a completely secure seal flap (3) for use in the United States and Global Posts' mail streams. Again, the face panel of the outgoing envelope (2) may have no windows, one window (66), or multiple windows (65 and 66) and the window(s) may or may not be covered with window material or paper material or other material. Likewise, windows could be located in the back panel (4) as with open window or patched window (67) or on the reply face panel (5). FIG. 15 also shows the outbound copy (68, 69, and 70) to be right reading and parallel to the top score (9) and bottom score (12) of the outbound mailer as an alternative to the "postage meter" style (outbound seal flap (1) at bottom per FIG. 1). In this address configuration, it may be desirable to apply a removable pressure sensitive label (71) as shown in FIG. 17 so that the red, fluorescent ID marking sprayed during the outbound processing by the USPS or other global postal service is removed from the return piece. Upon receipt, the recipient would be encouraged to lift off this label or other device to reveal a potential promotion, lottery, web site, coupon, etc. In other words, one can readily add interactive features such as removable holograms or pressure sensitive labels to the MRE that could help remove or obscure postal markings, indicia, etc. from the outbound configuration and/or that would simply enhance the interactive nature of the MRE.

FIGS. 17-22 depict opening sequence for the MRE when the outbound address copy is parallel and right reading to the bottom score of the outbound envelope (12) and top score (9) and where the seal flap of the reply envelope (3) covers the entire width of the reply envelope (5) which also allows the reply seal flap gumming (72) be nearly the full width of the reply envelope (5).

Figure 23:
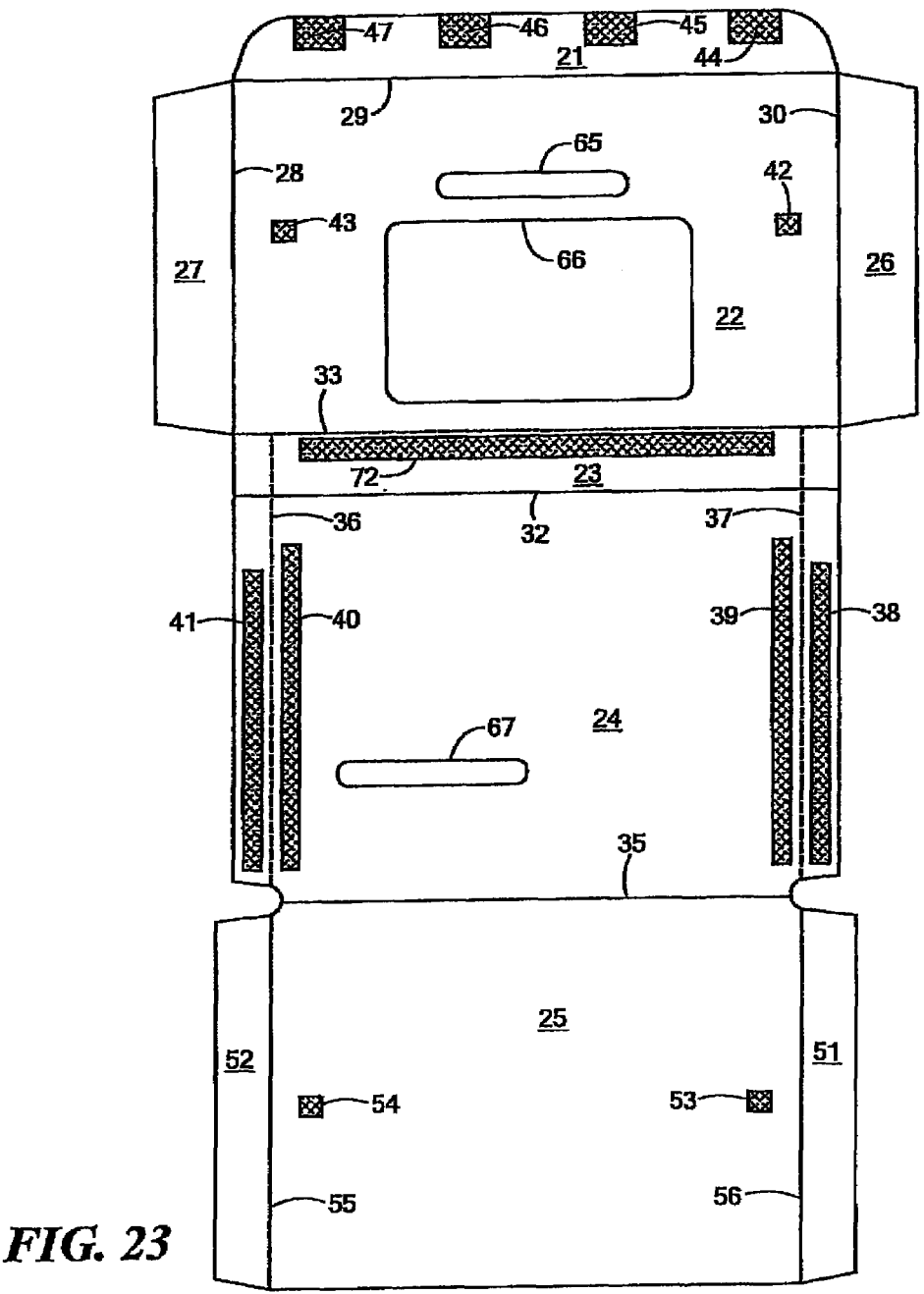
FIG. 23 is a block diagram depicting another embodiment of an inside view of a reply seal flap having a side seam construction for a reply envelope.
Figure 24:
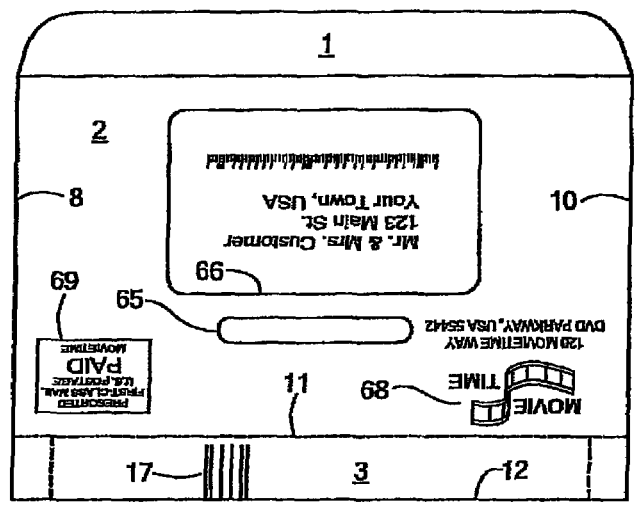
FIGS. 24-30 are block diagrams depicting embodiments of opening sequences of an envelope in a "postage meter" style copy orientation.
Figure 25:
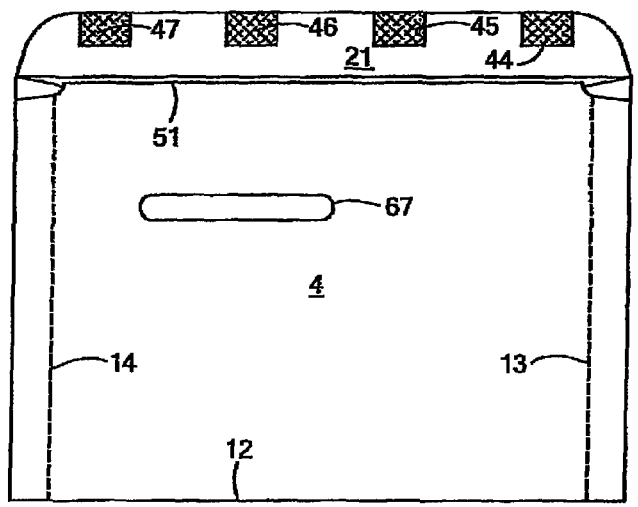
Figure 26:
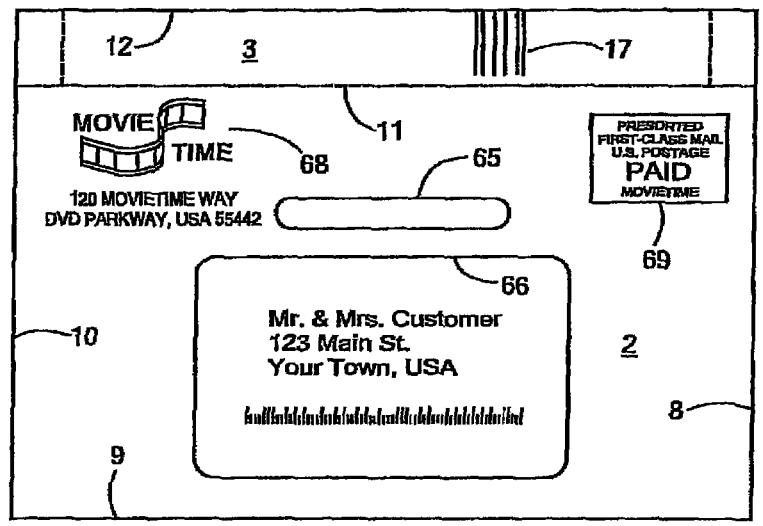
Figure 27:
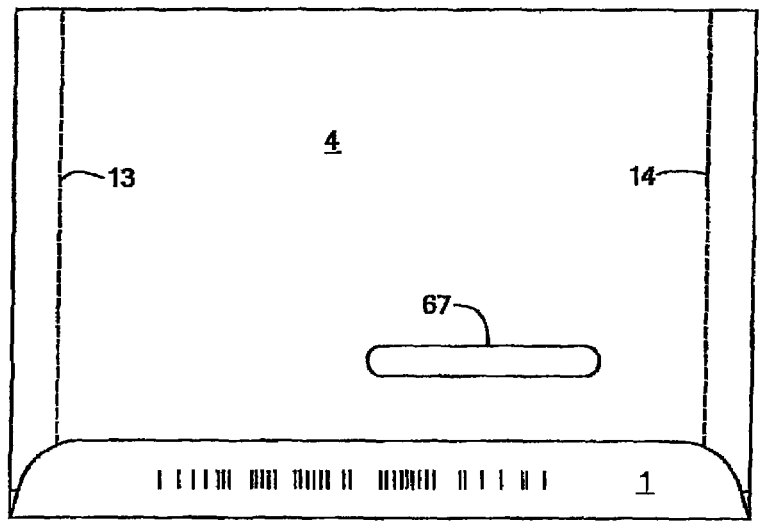
Figure 28:
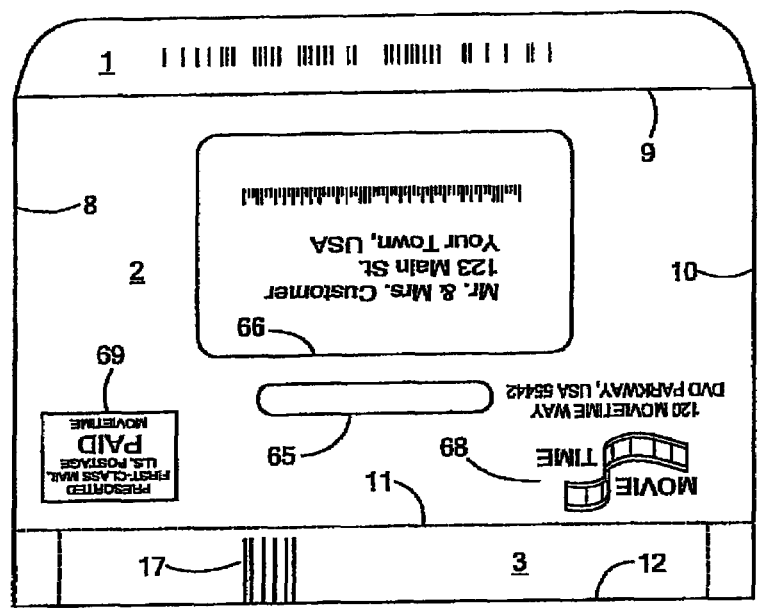
Figure 29:
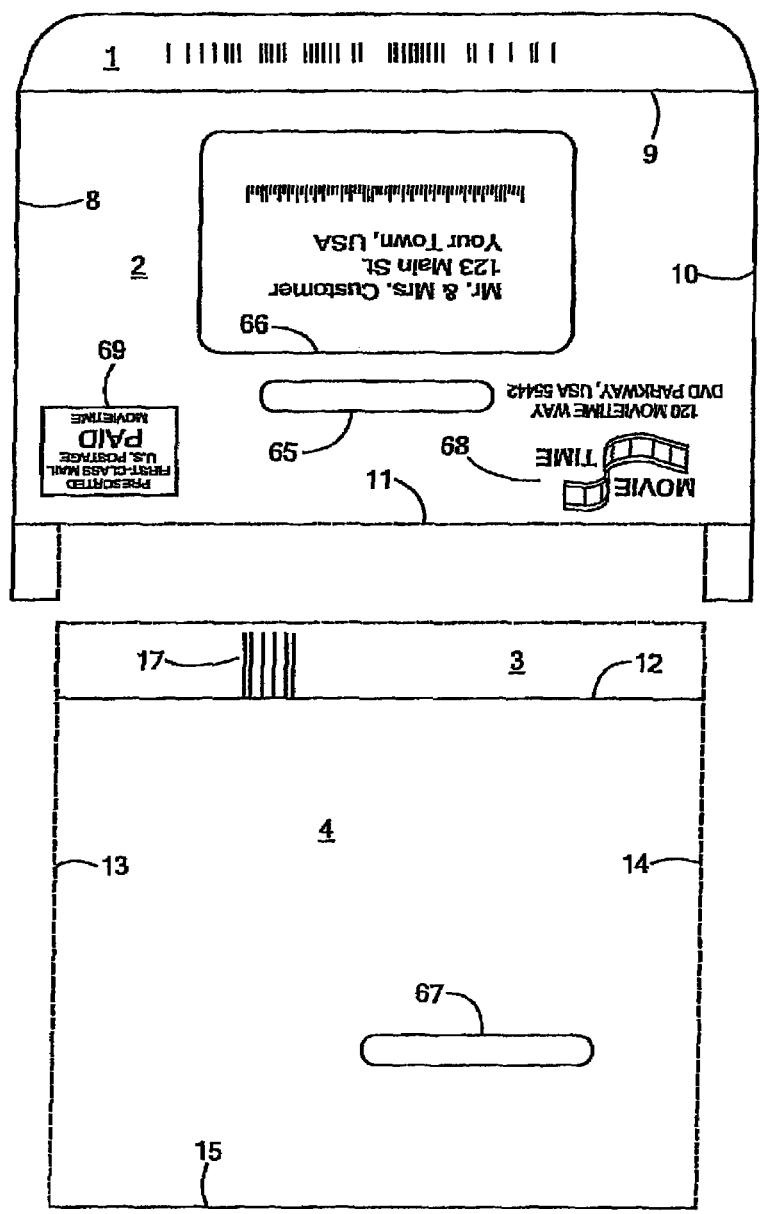
Figure 30:
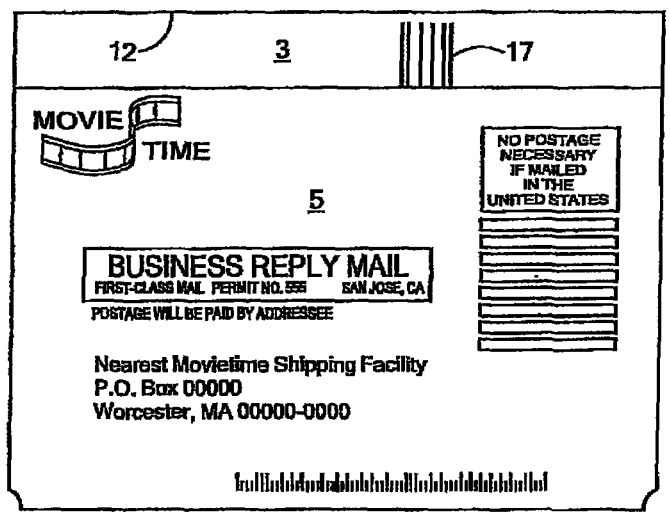

FIG. 23 again depicts the inside view of the reply seal flap (23) being of the same width as the reply envelope panels (24 and 25) as well as having a side seam construction for the reply envelope (51 and 52) similar to FIG. 13 with or without glue locks (53 and 54) to keep the multi-media or other contents from shifting in the reply envelope.

FIGS. 24-30 depict the opening sequence of the MRE in the preferred "postage meter" style copy orientation such that any markings (73 in FIG. 27) applied by the world posts, including the USPS, on the back of the outbound envelope can be removed during the opening sequence with the outbound seal flap (1) provided that the outbound flap (1) is tall enough to have received the markings. In other words, if the seal flap (1) is 1" tall, then any postal markings applied to the bottom of the mail piece (See FIG. 27) up to 1" will be removed with the opening of the MRE. If markings are 2" off the bottom, then the seal flap (1) would need to be 2" tall, etc. in order to "automatically" remove the markings applied by the world posts to the "bottom" of the outbound envelope when the recipient lifts the seal flap (1).

Figure 31:
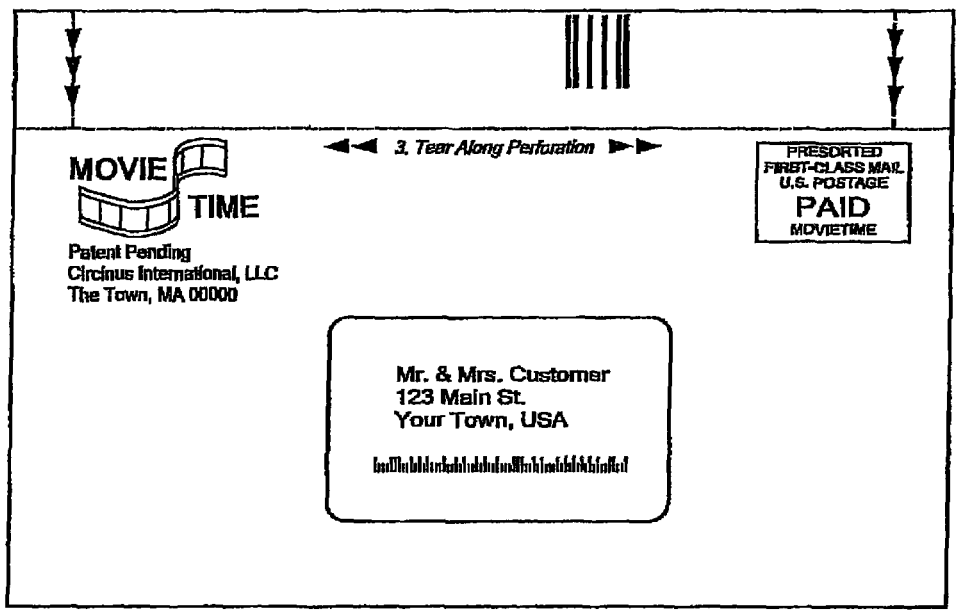
FIGS. 31-38 is a block diagram depicting an envelope with pre-printed opening instructions.
Figure 32:
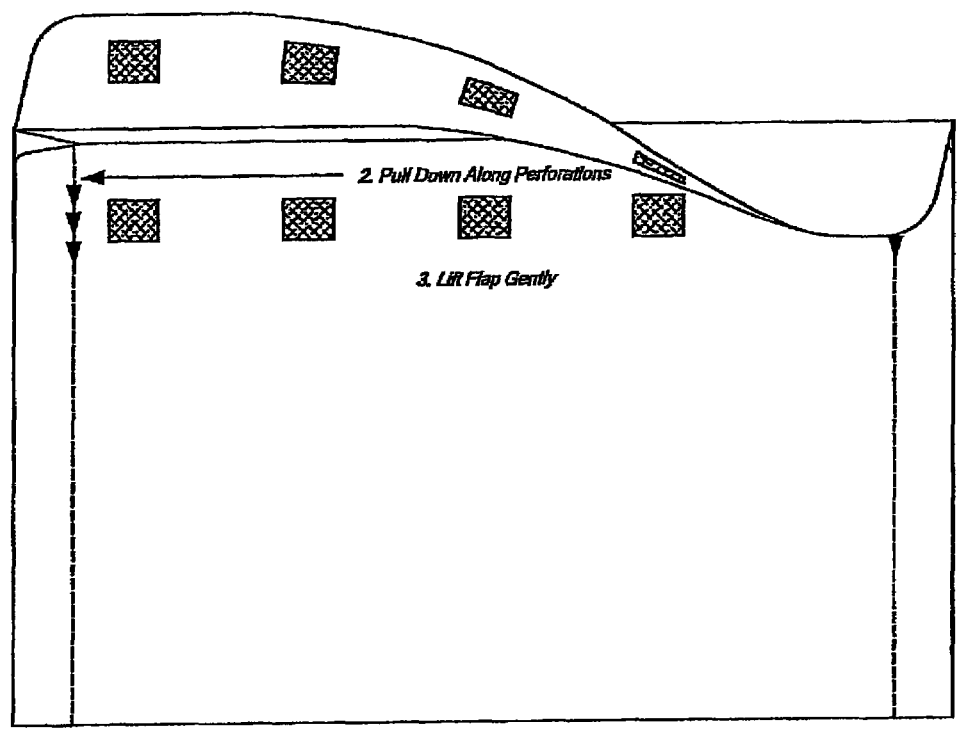
Figure 33:
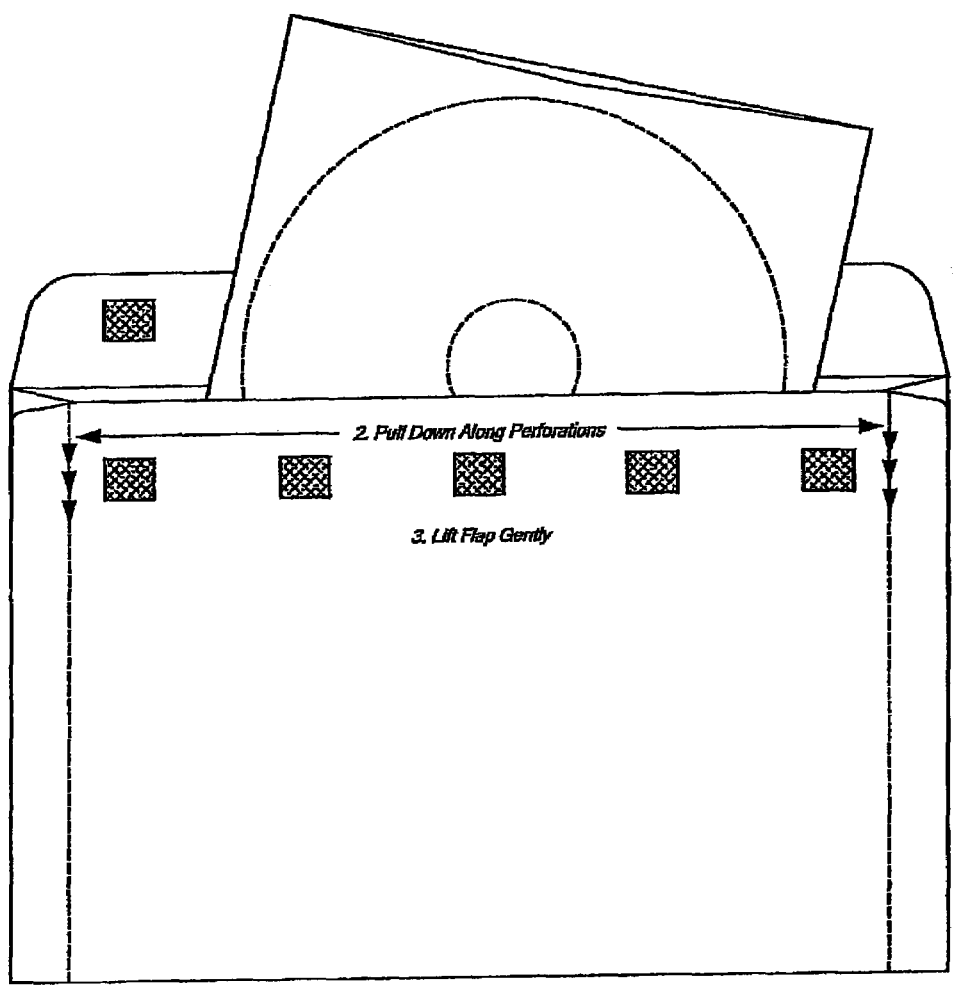
Figure 34:
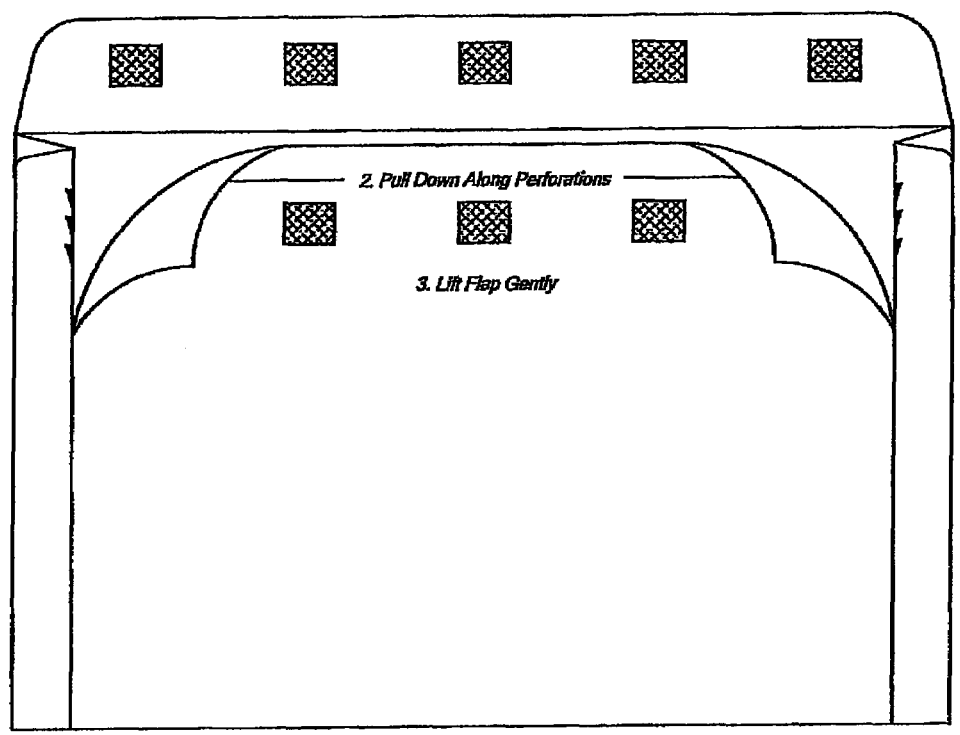
Figure 35:
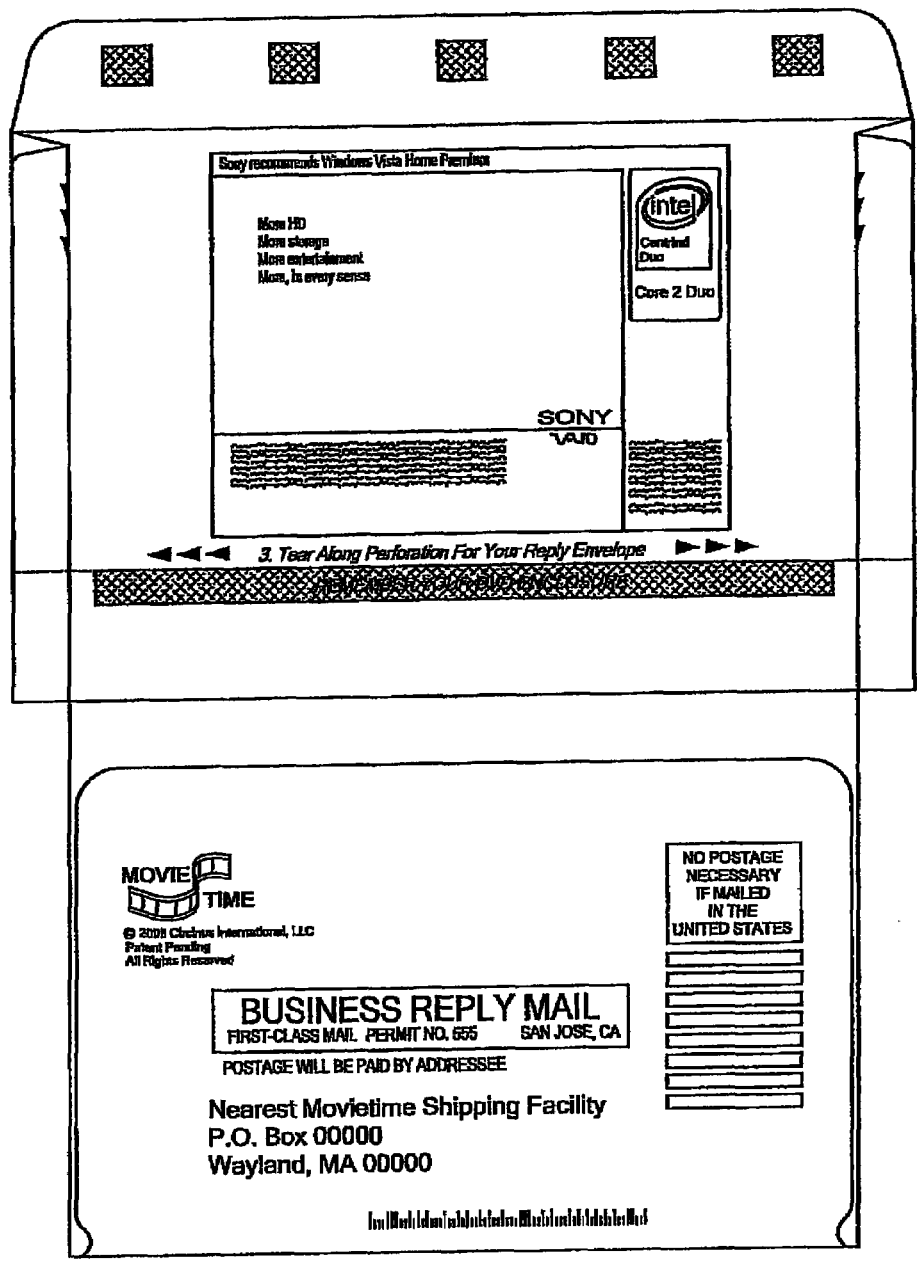
Figure 36:
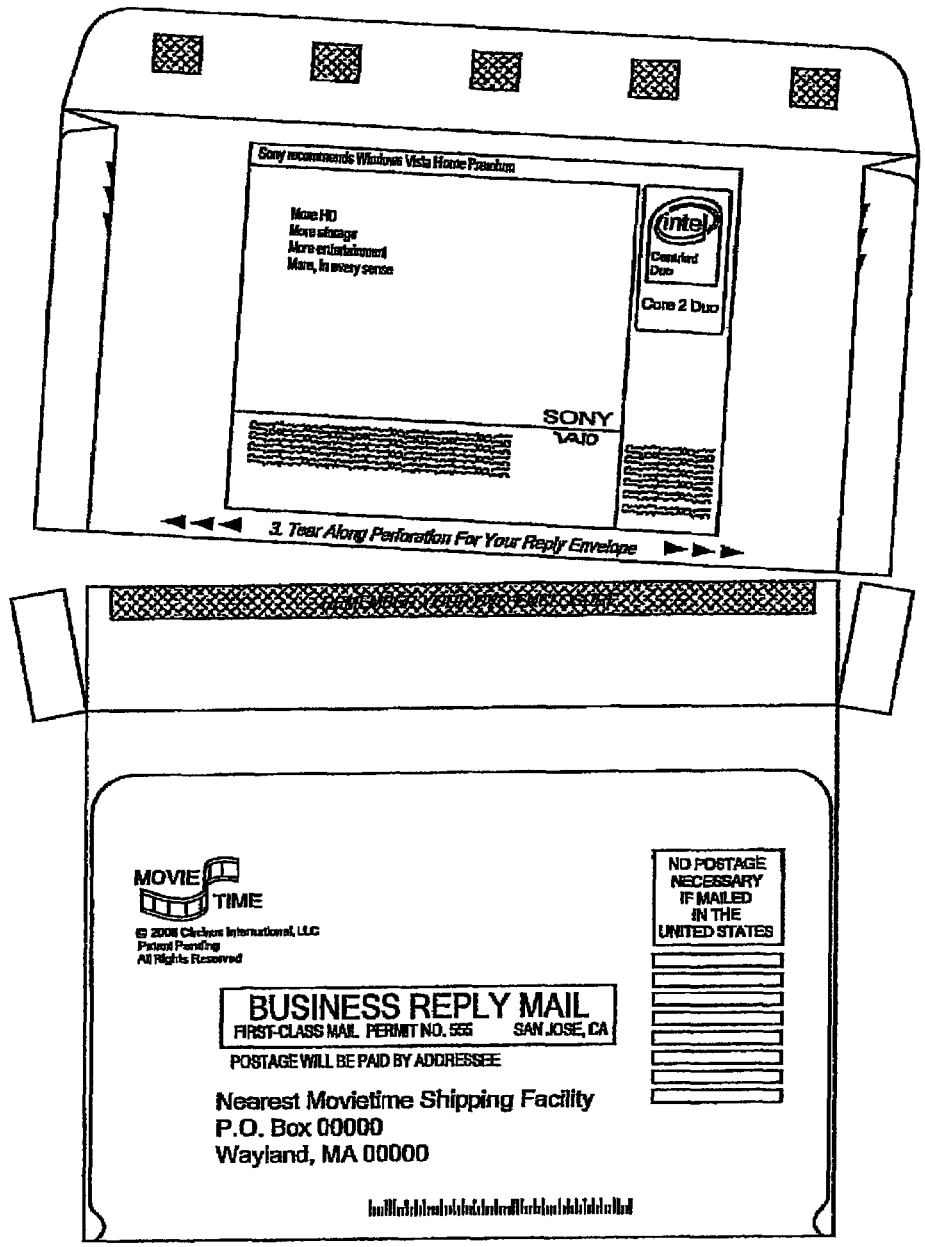
Figure 37:
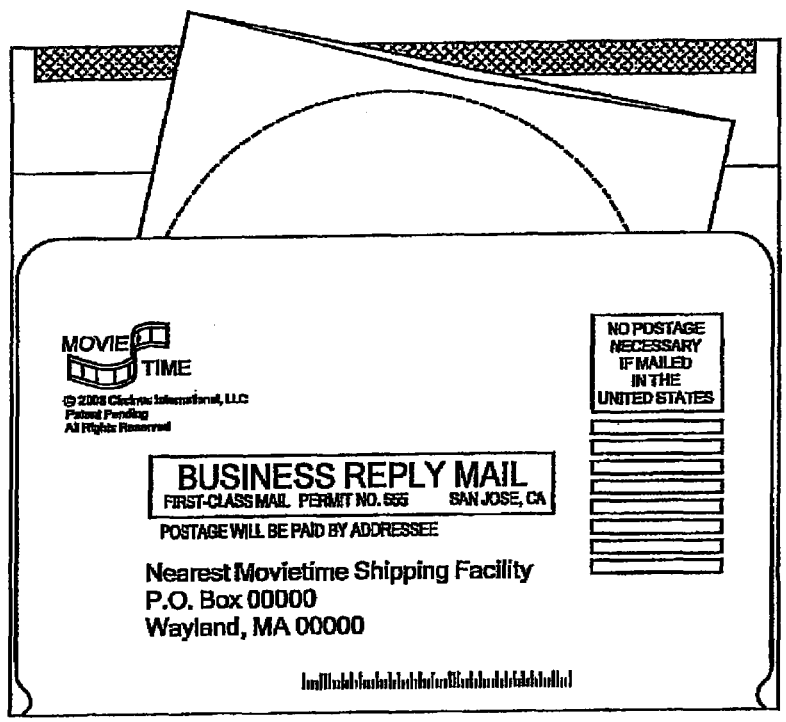
Figure 38:
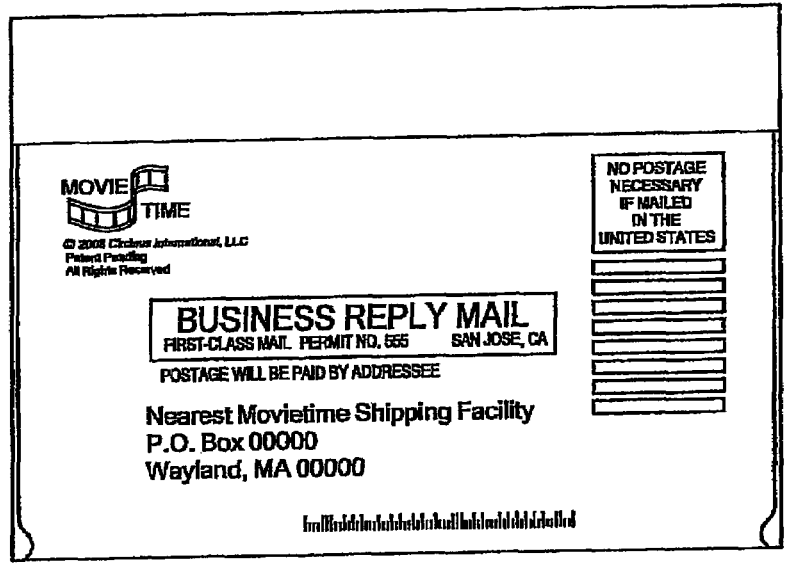

FIGS. 31-38 depict the MRE with pre-printed opening instructions added to the invention. However, since the MRE is so end-user friendly (a letter opener can be used on three out of four sides without destroying the reply envelope), the pre-printed opening instructions are optional and are for clarification purposes only. FIGS. 35 and 36 also illustrate the co-branded advertising opportunities available to the inside panel of the outbound envelope. The advertising copy could promote an event, provide a coupon, or be a survey or other marketing tool. Notice that if the panel were returned with the reply envelope that the sender would validate the source code of the recipient (i.e. the sender gets back the addressing information from the face panel as shown in FIG. 31 when the inside copy panel is returned with the reply envelope). The advertising panel could be further subdivided by perforations to facilitate its return with the reply envelope so that the recipient needn't fold the advertising panel in order to fit it back into the reply envelope. Also, FIG. 32 depicts the seal flap of the outbound envelope using "spot" gumming with latex or a co-adhesive so that one needn't remoisten the outbound seal flap for closure. Notice, too, that the "spot" gumming could also be remoistenable gum, pressure sensitive, or other sealing mechanism such that the spots are set away from the edge of the seal flap so that it may be easier for the recipient to lift up the outbound flap upon receipt without excessively tearing one of the reply envelope's panels.

As described above, in addition to providing less flimsiness between multimedia and the edge of the envelope, thereby reducing the risk of breakage or the risk of "fold over" which can block critical automatic delivery information (bar codes, facing identification marks, postal indicias, and the like), the described envelopes include one or more post card(s), business card(s), coupon(s), card sleeve(s), buck slip(s), bookmark(s), etc., integrated into an outbound envelope that, therefore, encourage the use of a reply post card versus a heavier envelope or form.

Figure 39:
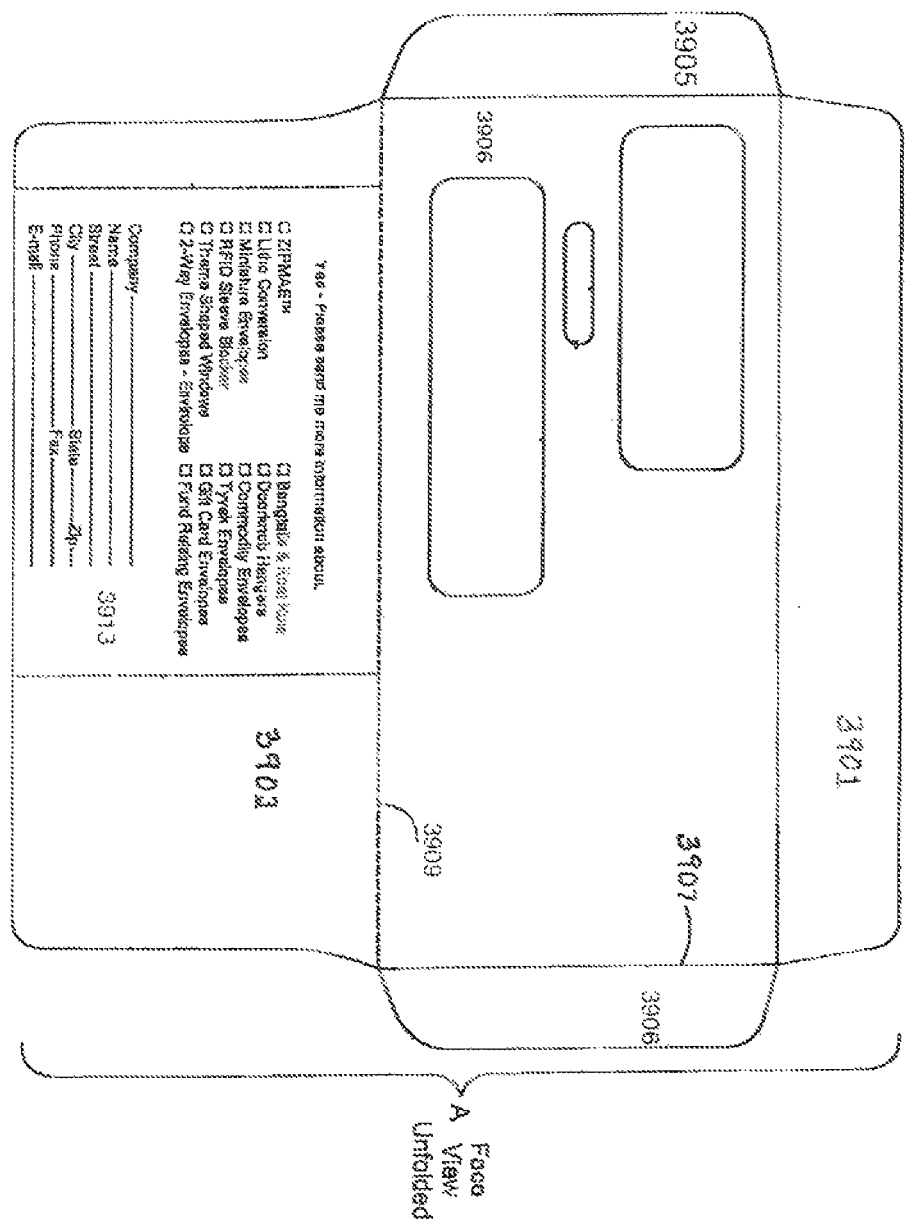
FIG. 39 is a block diagram depicting an embodiment of a face view of an unfolded envelope with an integrated post card embedded in a back panel of the envelope.
Figure 40:
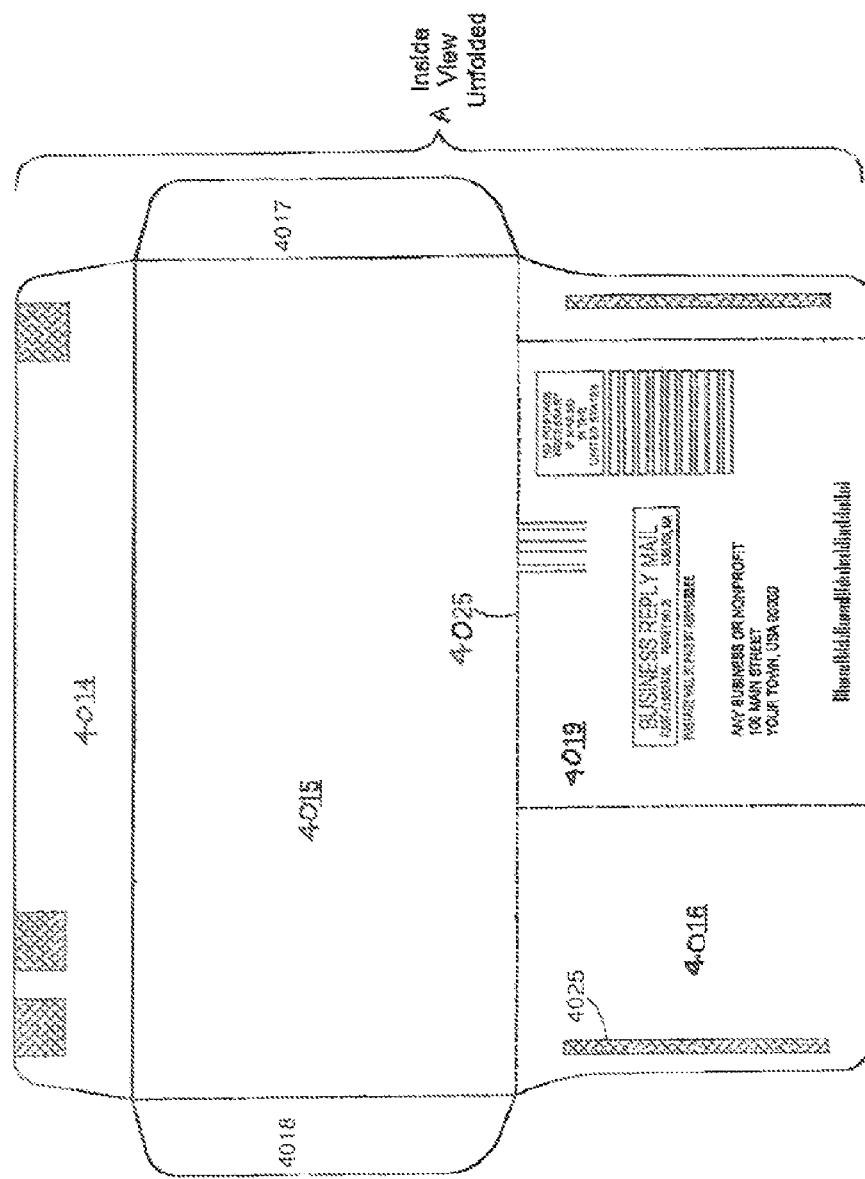
FIG. 40 is a block diagram depicting an embodiment of an inside view of an unfolded envelope with an integrated post card embedded in a back panel of the envelope.
Figure 41:
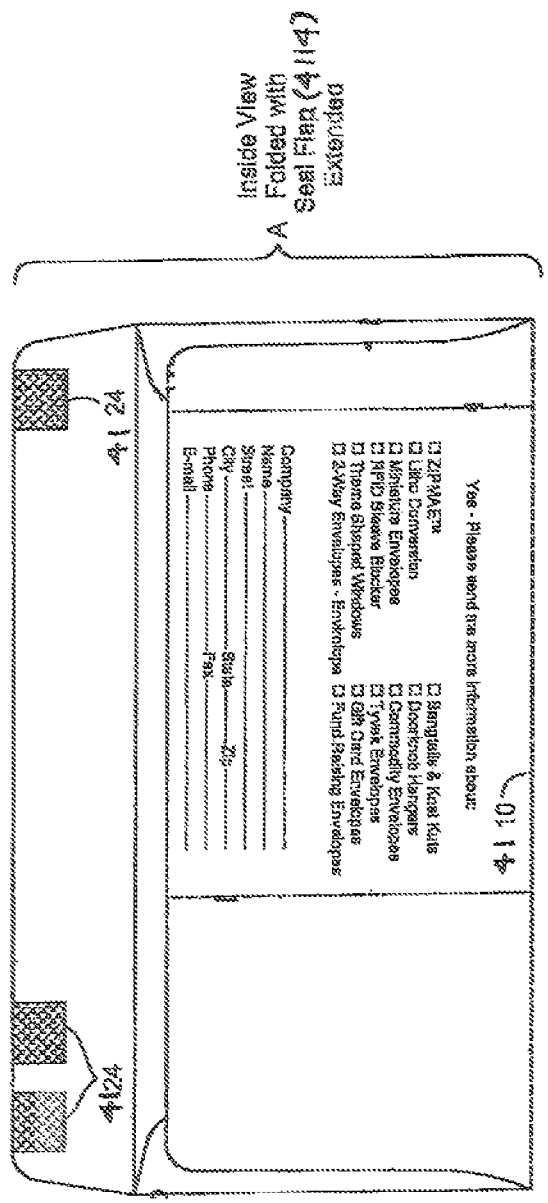
FIG. 41 is a block diagram depicting an embodiment of a face view of a seal flap of an envelope.
Figure 42:
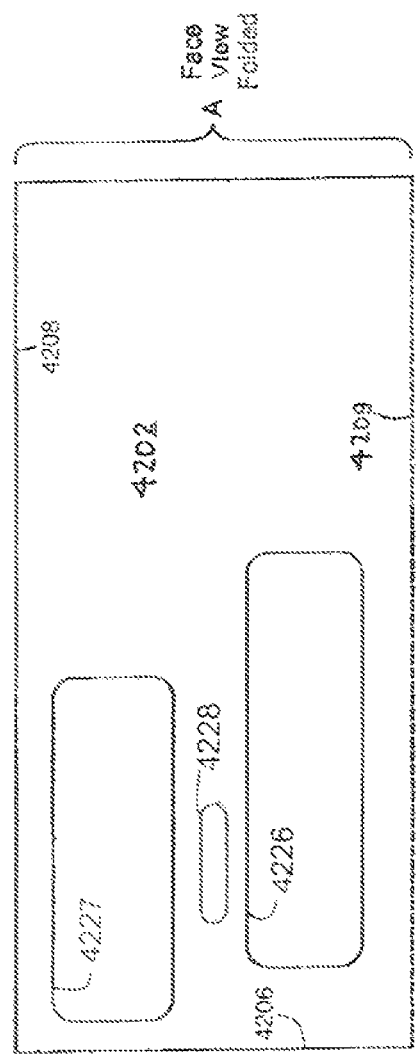
FIG. 42 is a block diagram depicting another embodiment of a face view of a seal flap of an envelope.

FIG. 39 (Face View Unfolded) and FIG. 40 (Inside View Unfolded) depict the simplest form of the described envelopes as an envelope (A), made of post card thickness stock (minimum of 7 point (0.007" thick) or 9 point (0.009" thick) depending upon the size of the intended return post card), with an integrated post card (3913 Face View and 4019 Inside View) embedded in the back panel (3903 Face View and 4016 Inside View) of the outgoing envelope (A). The invention folds with side seams (3904 and 3905 of the Face View and 4017 and 4018 of Inside View) folding in towards the inside panel (4015) and then the back panel (3903) folds up towards the inside panel (4015). The back panel (3903), which includes the separably detachable post card (3913), is securely affixed to the right side seam (3904) and left side seam (3905) by adhesive strips (4025) thereby forming an envelope as shown in FIG. 41. The seal flap (3901 Face View and 4014 Inside View) may be left with the flap extended (as seen in FIG. 41) or folded down around the top score and top fold line (4208) as seen in FIG. 42. The seal flap (3901) may then be secured to the back panel (3903) through remoistenable adhesive, peel & seal, string & button, Velcro, clasp, etc. (4124).

In other embodiments the basic envelope can still be formed by applying the side seam gum (4025) onto the side seams (3904 and 3905) instead of the inside back panel (4016). Also, the basic envelope can be formed by folding the back panel (3903) up first to the inside panel (4015) and then folding the left (3905) and right (3904) side seams on the outside of the back panel (3903)—this is called an outside side seam construction while the first description is an inside side seam construction. With the outside side seam construction, the adhesive used to adhere the side seam panels (3904 and 3905) to the back panel (3903) could be placed either on the inside left (4017) and inside right (4018) side seams or on the outside of back panel (3903).

As shown in FIG. 42, the face panel (4202) of the outgoing envelope may have no windows or may have multiple windows (4226 and 4227 and 4228), which may be either patched with a covering material or may be left open for additional pass-through bar coding or printing onto the embedded post card (4019). This feature (print a special bar code or copy through the open window onto the embedded post card or "freemium" like a membership card, buck slip, bookmark, etc.) unlocks the potential for increased personalization and match mailings. It also can enable new electronic bill payment systems for the USPS or other private concerns in that the bar code sprayed through open window (4228) can be read from the face of the return post card (4019) to activate or shut down certain actions electronically.

Also, per FIG. 42, the face panel (4202) of the outgoing envelope may be addressed either without windows or with the insert showing through the window such that the delivery address copy is either correct reading and parallel to the bottom fold (4209) or is "postage meter" style (spin copy 180 degrees) so that the delivery address is correct reading and parallel to the top fold (4208) which means the seal flap (3901) becomes located at the bottom of the envelope in the outbound mailing which can be useful for the removal of outbound USPS markings, that are often printed on the back of the envelope, so that there are no postal markings on the reply post card, business card, buck slip, coupon, etc. Although not as common, as a postage surcharge would apply for violating the USPS height aspect rules (1.3<mail piece <2.5), one might also address for special marketing or direct mail purposes the address or facing information to be correct reading and parallel to either side fold (3906) or side fold (3907).

Figure 43:
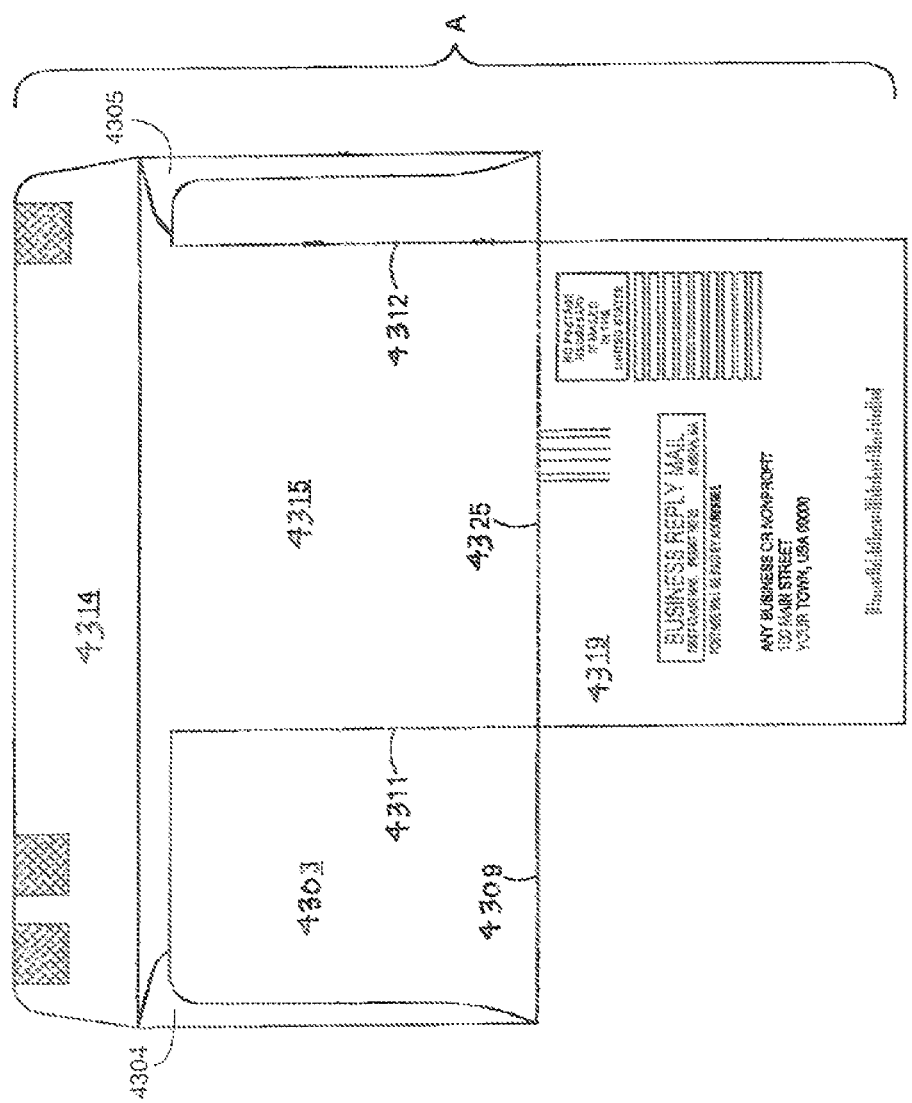
FIG. 43 is a block diagram depicting an embodiment of an envelope with copy oriented in parallel to a separation perforation.

Also, per FIG. 43, the orientation of the post card copy (or coupon or buck slip) (4319) could be parallel and correct reading as shown parallel to the separating perforation (4325) or it, too, could be rotated 180 degrees and be parallel but now "wrong" reading to the separating perforation (4325) and bottom fold (4309).

Finally, the return orientation of the post card copy (or coupon) (4319) could be moved to the outside of the envelope (A) and be either correct reading and parallel to the bottom fold (4309) and separating perforation (4110) or rotated 180 degrees and be correct reading and parallel to the bottom of the back panel (4228). In the event that the return copy of the post card were placed on the outside of the envelope (embedded in panel 4303), then the seal flap (3901) must be long enough to cover the return address of the post card as it is against USPS regulations to have two addresses showing simultaneously on the outgoing envelope as that can confuse the postal carrier and/or the USPS automation machines.

Upon receipt (see FIG. 43), the recipient detaches the integrated post card (3913 Face View or 4019 Inside View) from the body of the envelope (A) by: lifting the seal flap (3901) to expose the inside of the seal flap (4314); tearing down the separating post card perforations (4311 and 4312); and tearing across the bottom fold (4309) with the bottom separating perforation (4325). The recipient is then able to respond back to the mailer using the post card rate (26 cents) versus the letter rate (41 cents). Alternatively, the separated post card (4319) could be a coupon or other advertising vehicle like a buck slip or bookmark that the recipient would then make use of once separated from the envelope (A). Note, too, now that the inner panel (4315) is exposed to the recipient, that this in turn could also be separated from the side seams (4304 and 4305) and seal flap (4314) and back panel (4303) to be used as a coupon or other marketing vehicle such as a buck slip, book mark, or even another post card itself (if used as a post card and if greater than a 4¼×6 size, then the entire material of the described envelopes would need to be a minimum of 0.009" thick to meet USPS requirements (versus 0.007" thick)).

Figure 44:
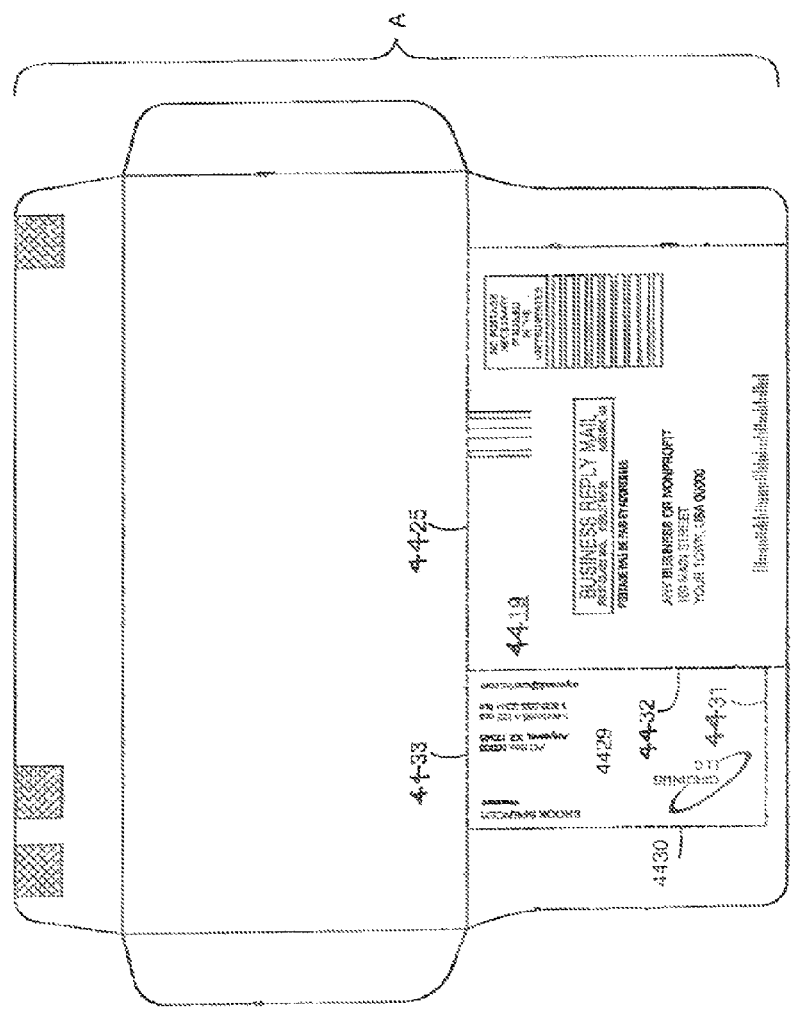
FIGS. 44 and 45 are block diagrams depicting embodiments of envelopes including an embedded post card and an additional embedded card such as a business card, affinity card, loyalty card, membership card, health card, security card, temporary ID card, or other card.
Figure 45:
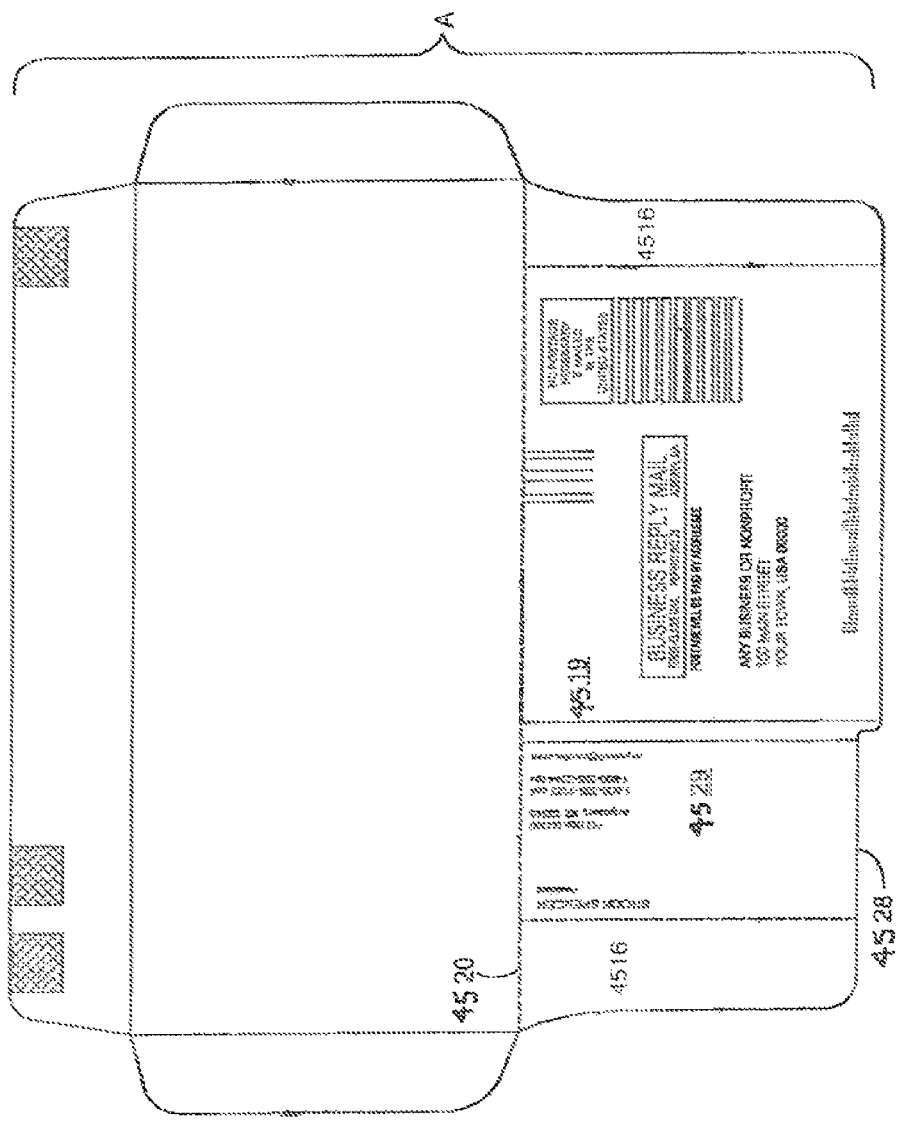

FIG. 44 and FIG. 45 show an embodiment of the described envelopes wherein a business card, affinity card, loyalty card, membership card, health card, security card, temporary ID card, etc. (hereinafter "card") is similarly embedded (4429) next to the post card (4419). The card has separating perforations 4430, 4431, 4432 and 4433). The separating perforation could be shared next to the post card (4419) or it could have its own separating perforation (4432) with a space between it and the post card (4319) per FIG. 45. Also, the die shape forming the overall envelope (A) could have the definition of the back panel (4516) be contoured to facilitate the separate removal of a shorter card (4529) versus the post card (4519) as shown by the definition of the bottom panel (4528) in FIG. 45. Note, too, that the bottom fold 4520 could be defined entirely by a separating perforation (as in 3909 in FIG. 39 or 4520 in FIG. 45) or it could be a solid score (4420) that begins after the separating perforations (4433 and 4425) for the card and post card as shown in FIG. 44.

Figure 46:
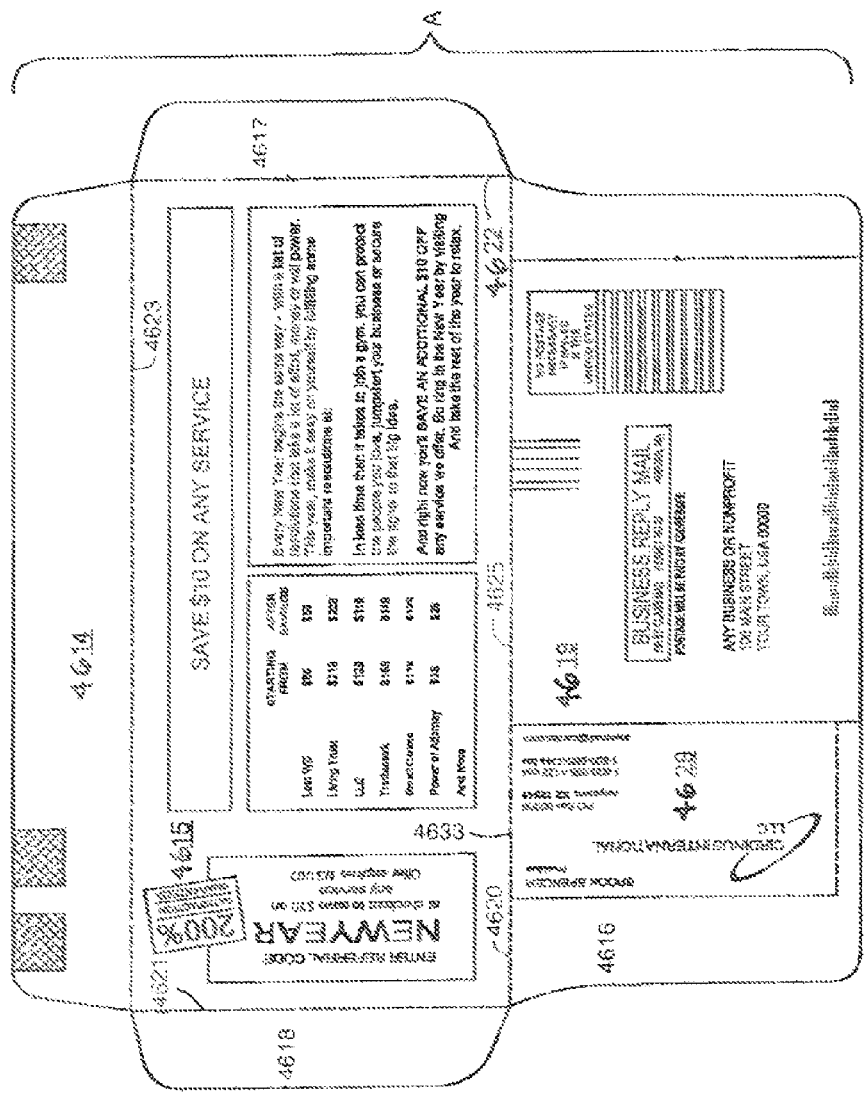
FIG. 46 is a block diagram depicting an embodiment of an envelope wherein an inside panel of an outgoing envelope becomes a coupon or advertising piece.

FIG. 46 shows an embodiment of the described envelopes wherein the inside panel (4615) of the outgoing envelope becomes its own coupon or advertising piece whereby the inside panel (4615) is separated upon receipt from the seal flap (4614), side seams (4617 and 4618) and the back panel (4616), card (4629) and post card (4619) by separating perforations defining the folds (4620, 4621, 4622, 4623, 4625 and 4633). If the inside panel (4615) is itself to be used as a post card, and if this size is bigger than 4¼"×6", then USPS regulations require that the thickness be at least 9 point (0.009") instead of 0.007" for a regular post card and, with this larger size, the post card would mail back at the letter rate (41 cents) instead of the post card rate (26 cents). Consequently, it is more likely for the inside panel (4615) to be used for coupons or other promotional copy that is intended to drive the recipient to a web site or to redeem the coupon/voucher in person rather than as a return post card.

Figure 47:
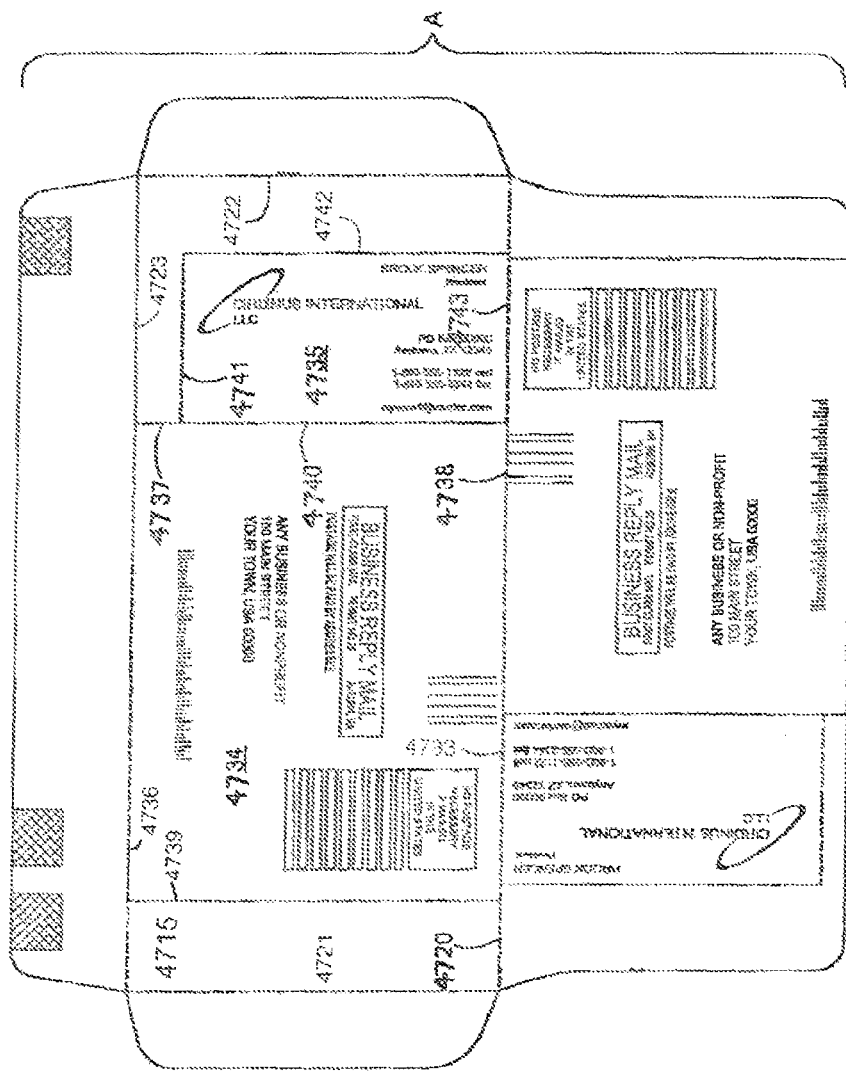
FIG. 47 is a block diagram depicting an embodiment of an envelope wherein an inside panel of an outgoing envelope becomes further separated upon receipt into additional post-card.

FIG. 47 shows an embodiment of the described envelopes wherein the inside panel (4715) of the outgoing envelope becomes further separated upon receipt into additional postcard(s) (4734) and card(s) (4735). Again, the card (4735) could abut or be separated by space from the post card (4734). Consequently, the post card with separating perforations (4736, 4737, 4738 and 4739) may or may not share the score and fold defining the envelope (A) along score and fold lines (4720, 4721, 4722, and 4723). Similarly, the card (4735) with separating perforations (4740, 4741, 4742, 4743) may or may not share the score and fold defining the envelope (A) along score and fold lines (4720, 4721, 4722, and 4723). In some embodiments, the entire back panel can be separated from the face panel to facilitate opening.

Figure 48:
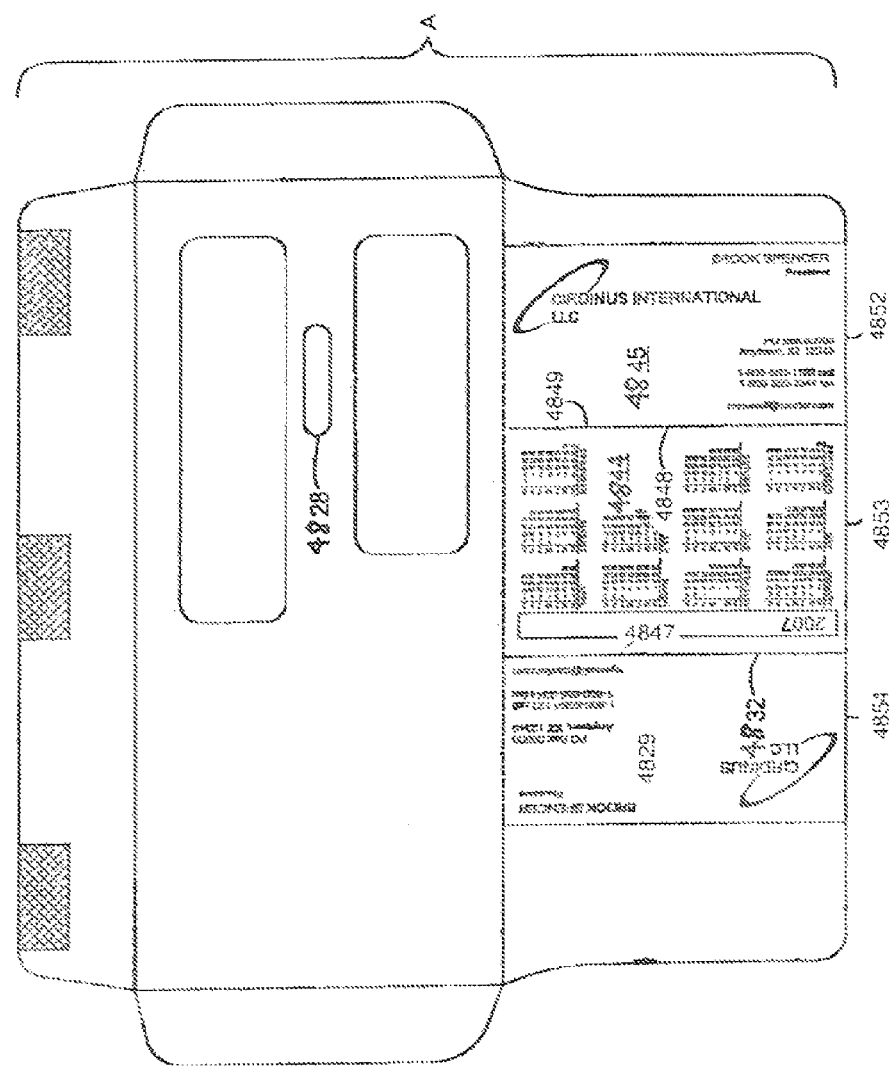
FIG. 48 is a block diagram depicting an embodiment of an envelope wherein a back panel of an outgoing envelope becomes further separated upon receipt into multiple cards.
Figure 49:
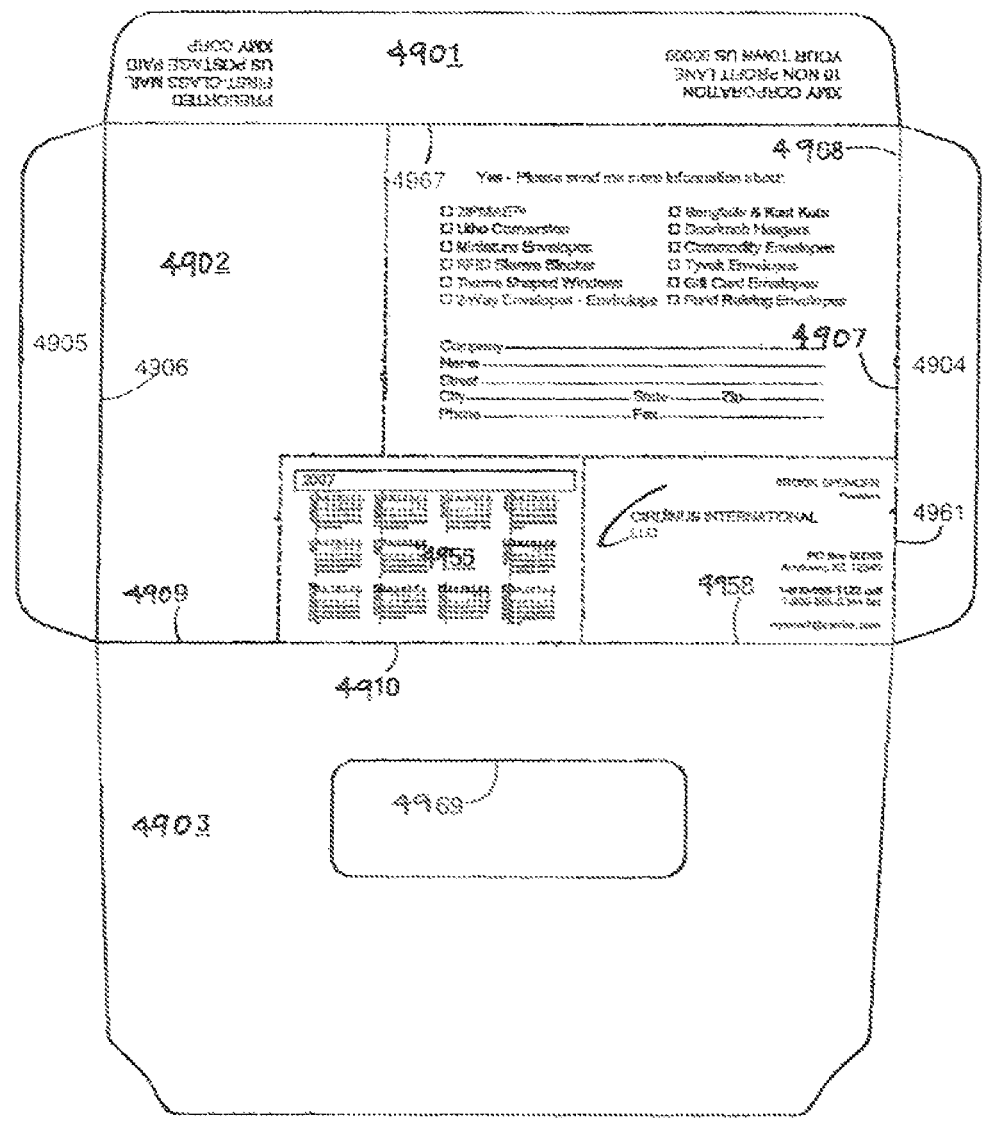
Figure 50:
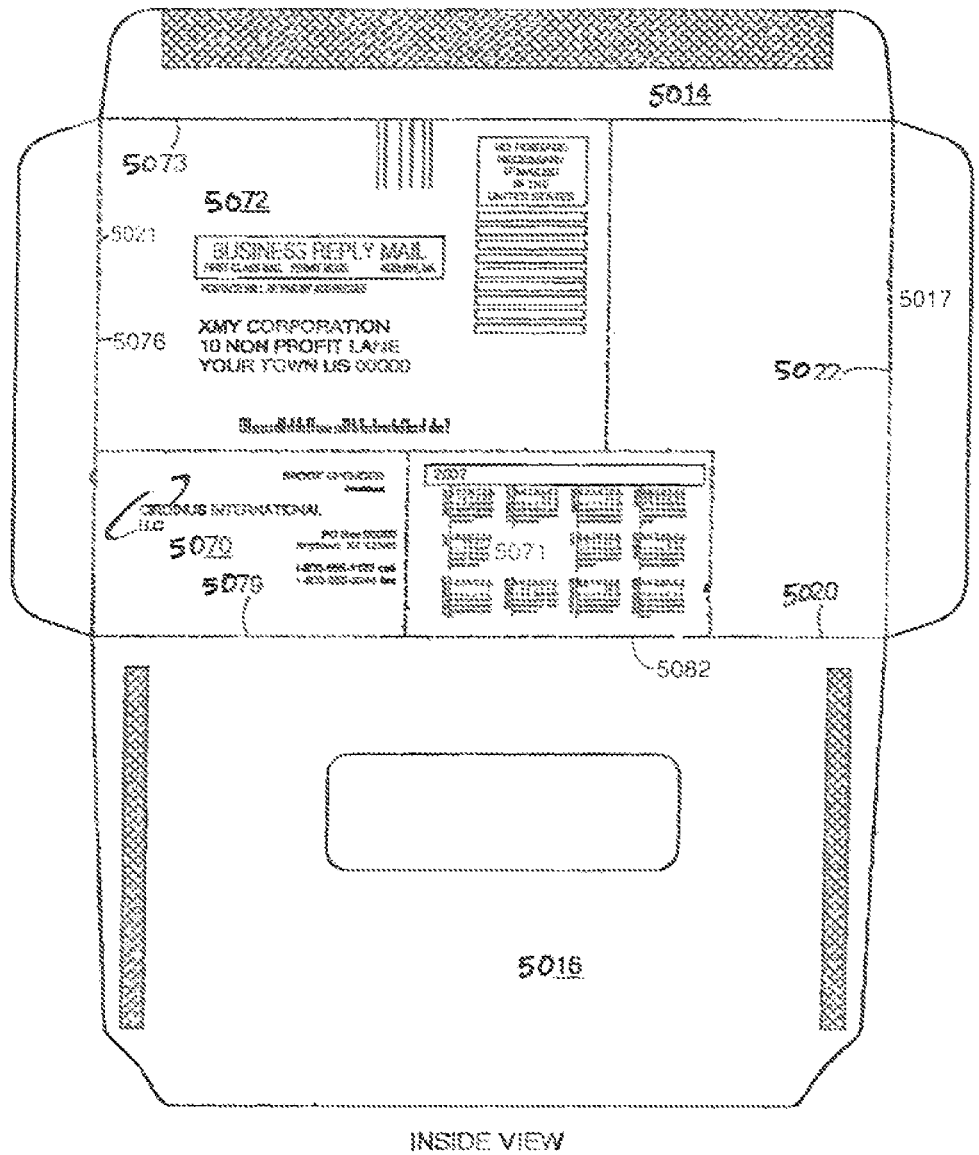
Figure 51:
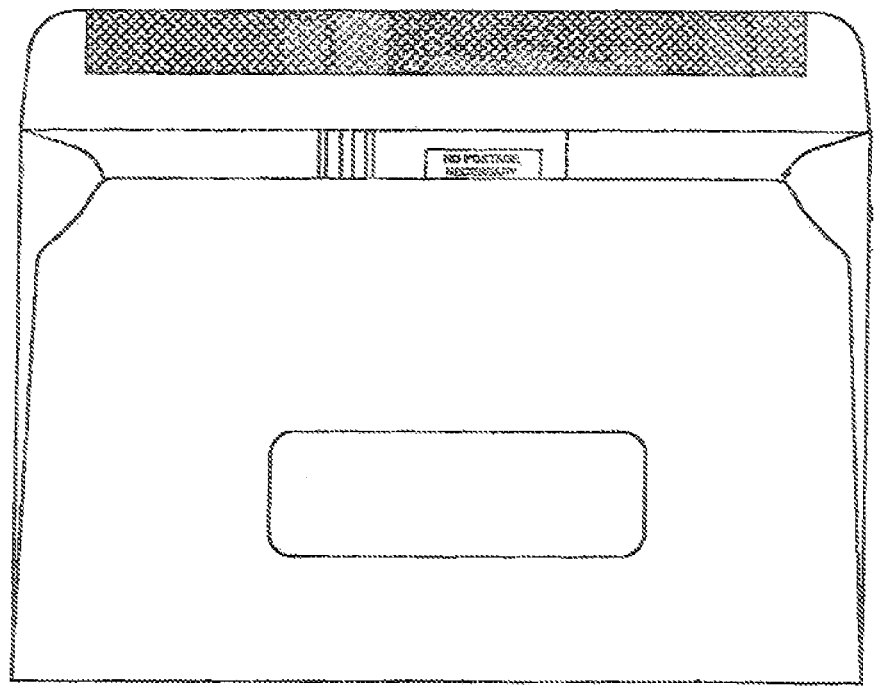
Figure 92:
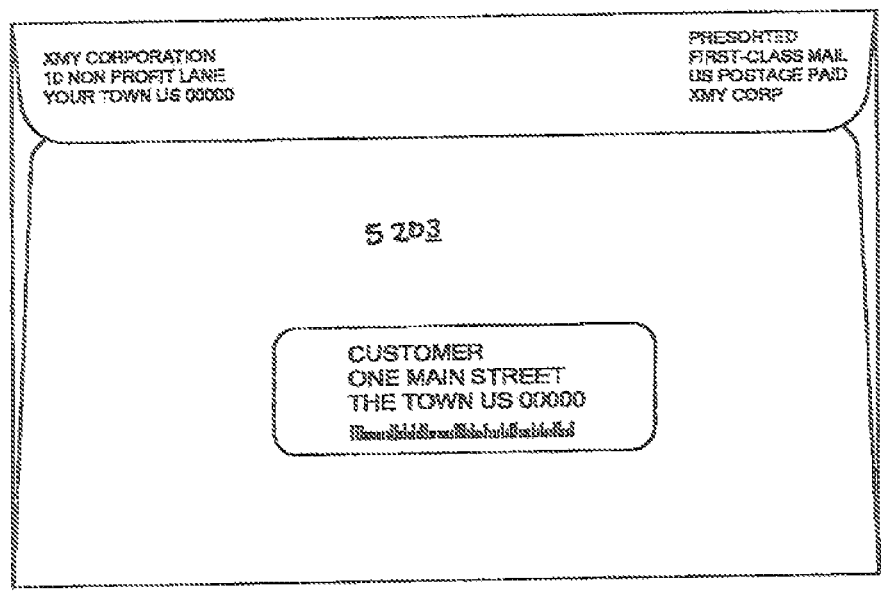

FIG. 48 shows an embodiment of the described envelopes wherein the back panel (3093 on Face View or 4016 on Inside View) of the outgoing envelope (A) becomes further separated upon receipt into multiple cards (4829, 4844 and 4845). The cards can be joined to facilitate separation with common separating perforations (4832 and 4847) (4848 and 4849) or they can be spaced apart so that there is a physical space between the separating perforations (32 and 47) (48 and 49). Notice too that the back panel (4816) can be shortened to exactly fit the card(s) edge (4852, 4853, and 4854) so that no further separation is required from the bottom edge of the back panel (4828). In some embodiments, the cards 4829, 4844, and 4845 are cards, such as business cards, membership cards, affinity cards, loyalty cards, etc. In other embodiments, the cards 4829, 4844, and 4845 are coupons (e.g., 25% off a purchase or $25 off a purchase). In one of these embodiments, the cards 4829, 4844, and 4845 are printed on a coated envelope. In another of these embodiments, the cards 4829, 4844, and 4845 are printed on 24 white wove stock. In still another of these embodiments, the cards 4829, 4844, and 4845 are printed on paper that calipers an amount substantially similar to 0.004" or 0.005". In still even another of these embodiments, a distributor of an envelope may charge a premium to an advertiser for use of the space on the cards 4829, 4844, and 4845. In yet another of these embodiments, by detaching one or more of the cards 4829, 4844, and 4845, a recipient of the envelope sees the inside of the envelope for additional ride-a-along advertising or call to action copy.

FIGS. 49, 50, 51, 52 and 53 show embodiments of the described envelopes wherein the delivery address side of the outgoing envelope is located on the back panel (4903) and the integrated post card(s), card(s) and coupon(s) are integrated into the face panel (4902). In terms of folding sequence, the back panel (4903 on Face View and 5016 from Inside View) fold up around the scores and/or perforations defining the bottom fold (4909, 4910, and 4958 on Face View and 5079, 5082 and 5020 on Inside View) after the side seams (4904 and 4905 on Face View and 5017 and 5018 on Inside View) are folded in around the side scores and/or perforations (4906, 4907, 4968 and 4961 on Face View and 5021, 5076, 5080 and 5022 on Inside View) thereby forming FIG. 51. Notice that the side seams (4904 and 4905) could alternatively be folded after the back panel (4903) is folded up around scores and/or perforations (4910, 4958, and 4909) to form an outside side seam construction. The seal flap (5014) is then folded down onto the back panel (4903) to form FIG. 52. In this embodiment, the addressing is performed on the back side of the described envelopes (composed of seal flap 4901 and back panel 4903) instead of the face side of the described envelopes (4902). Notice that the address for the recipient can show through a window (4969) and/or be ink jet addressed and/or have a label placed on the back panel 5203 as illustrated in FIG. 52.

Figure 53:
Figure 54:
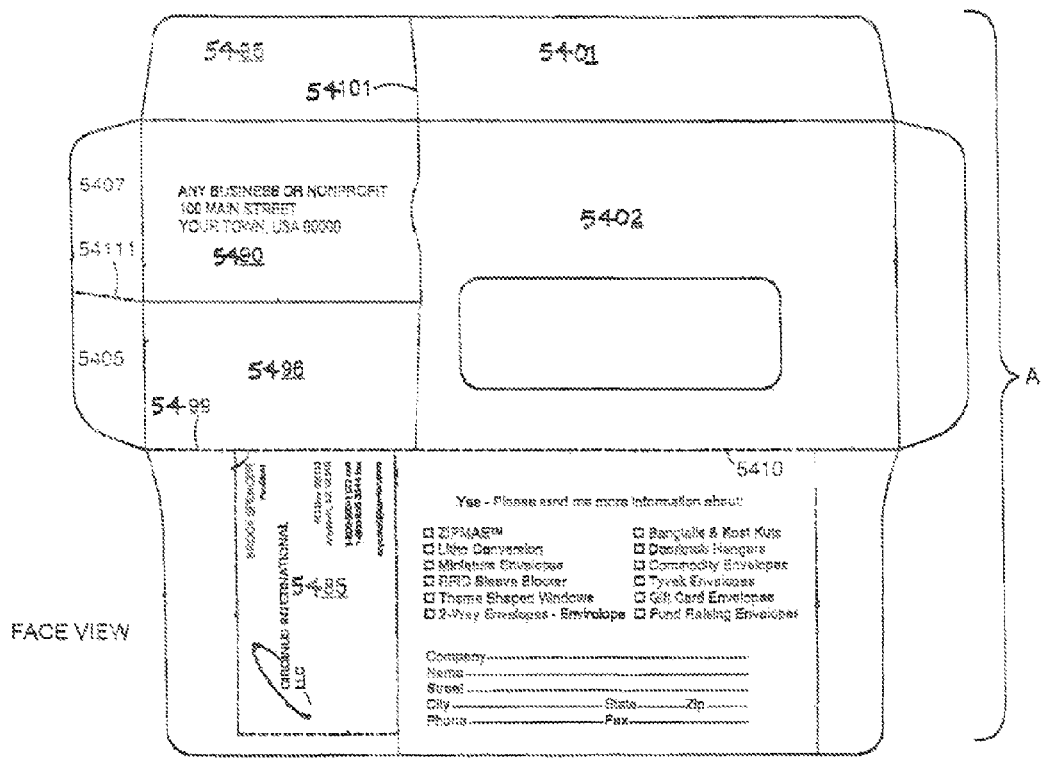
FIGS. 54-64 are block diagrams depicting embodiments of envelopes with or without embedded RFID blocking and printing technology including sections for forming a protective card sleeve from within an outbound envelope.
Figure 55:
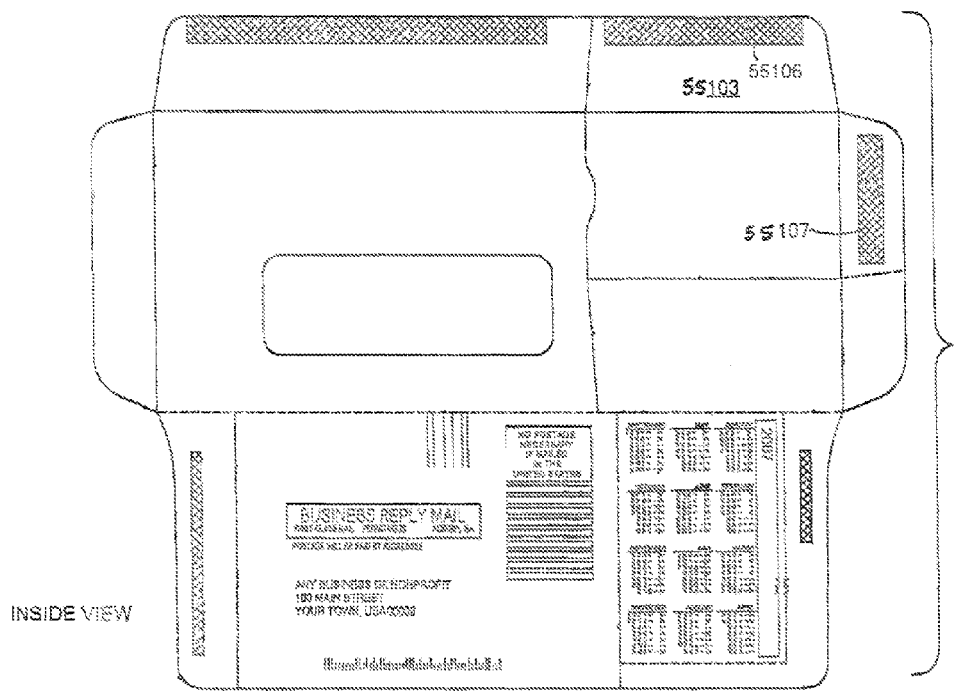
Figure 56A:
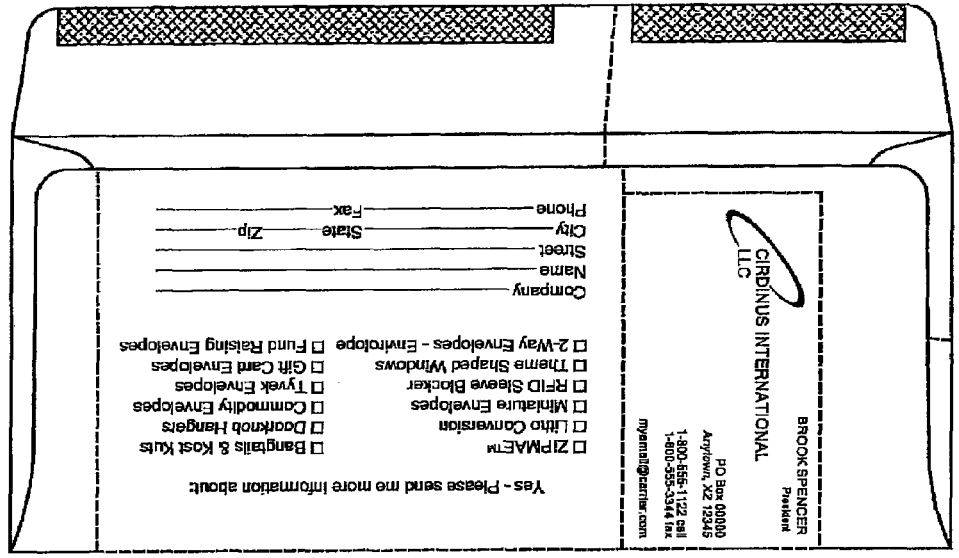
Figure 56B:
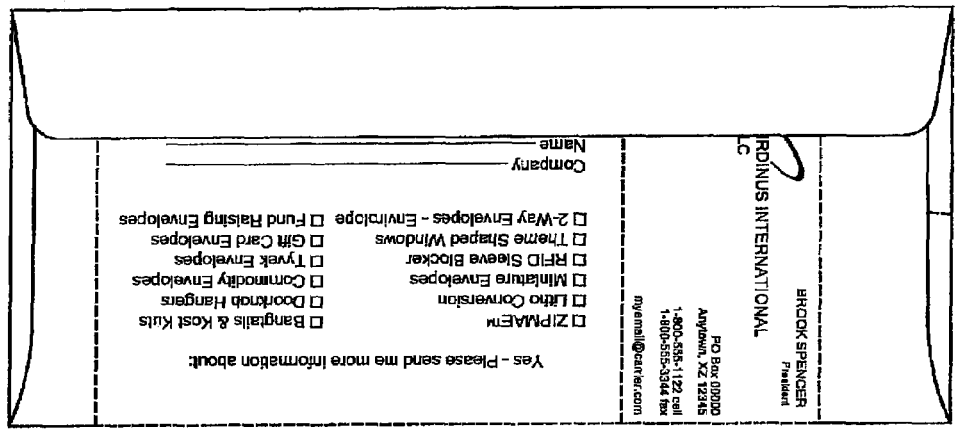
Figure 56C:
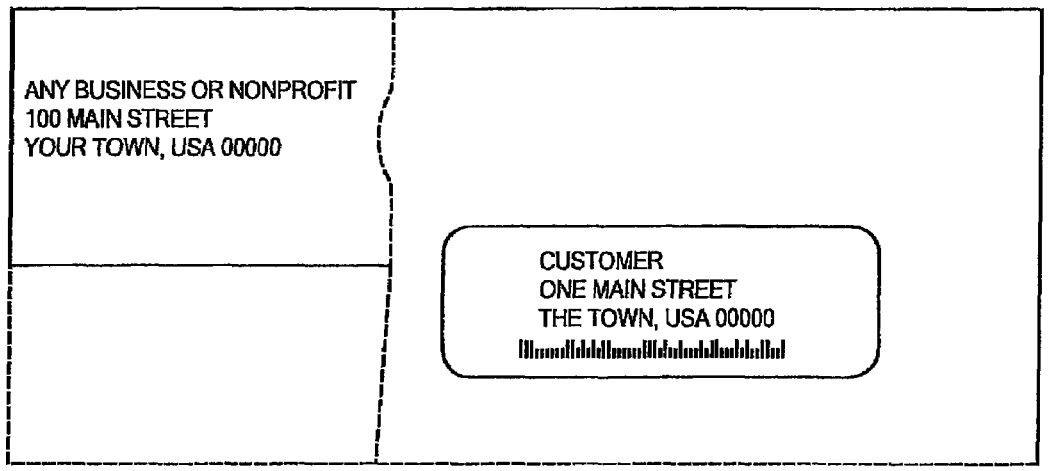
Figure 57:
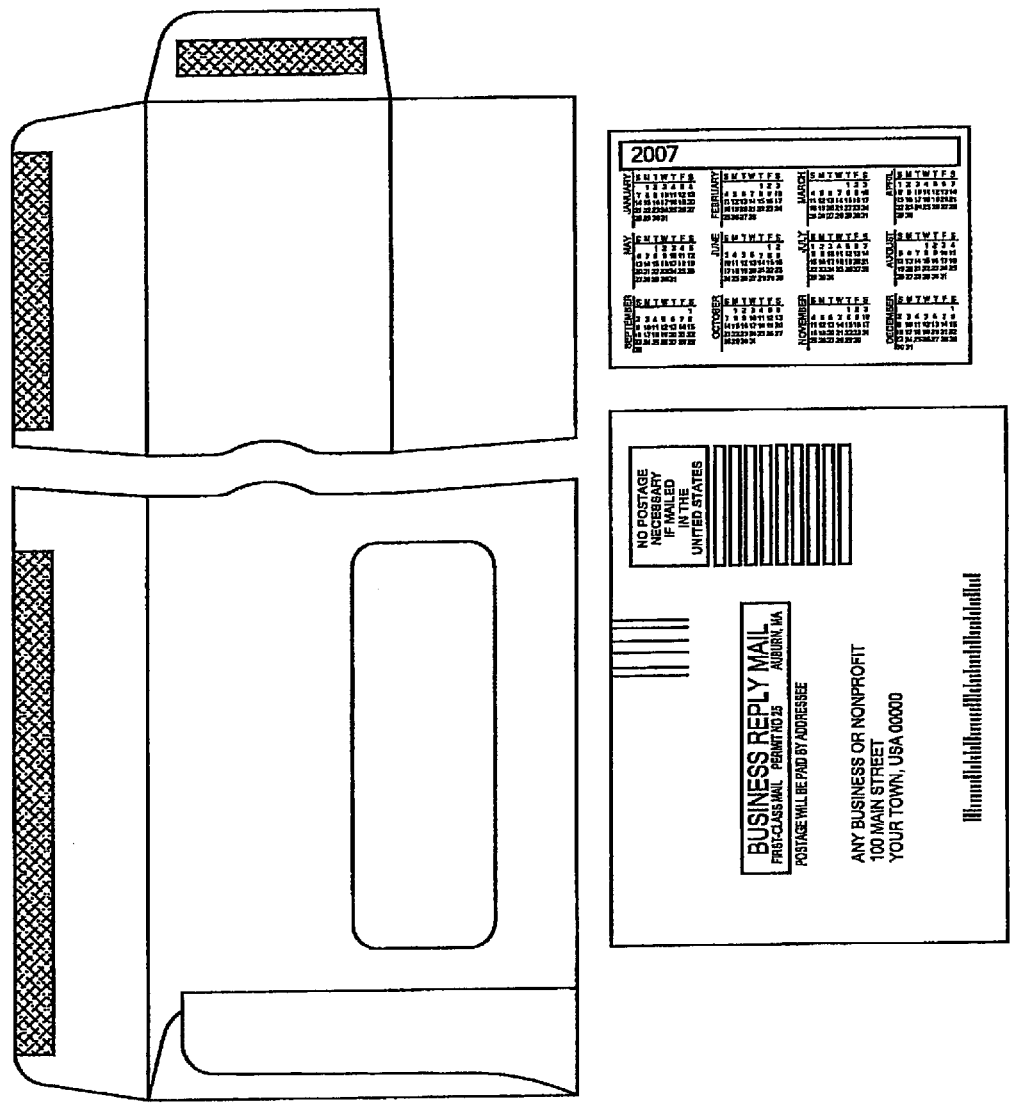
Figure 58:
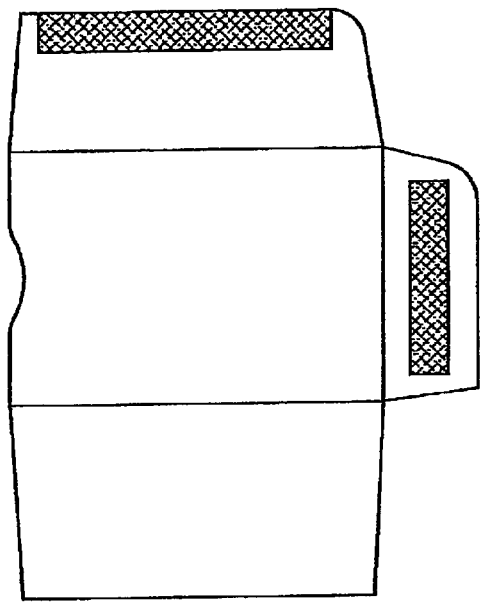
Figure 59:
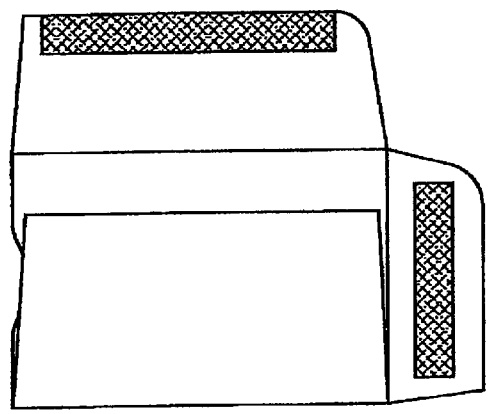
Figure 60:
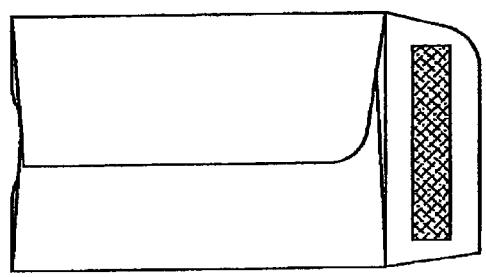
Figure 61:
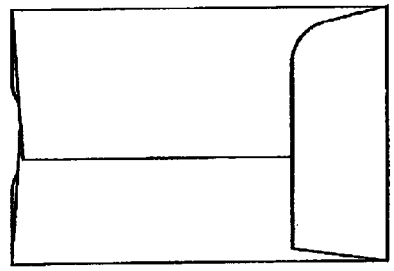
Figure 62:
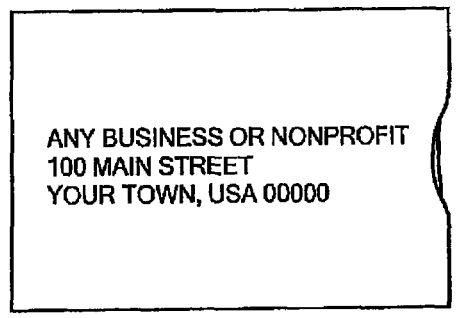
Figure 63:
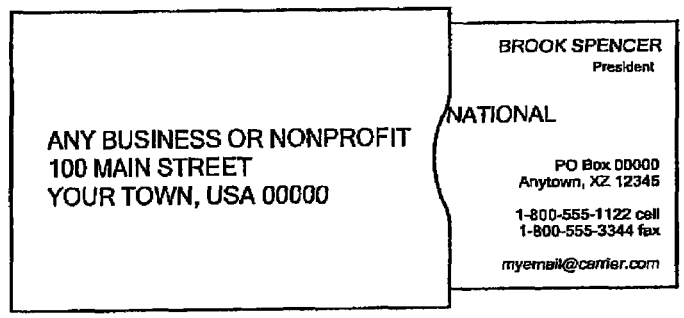

The embodiments of the described envelopes shown in FIGS. 49, 50, 51, 52 and 53 allow for more area of the envelope to be integrated into post cards, cards, coupons, buck slips, bookmarks, and other direct mail collateral than in earlier FIGURES as the face panel (4902) offers more physical area than the back panel (4903). This is helpful for many direct mail applications and may help boost response rates with a "clean" look on the address (flap) side (FIG. 52) while providing the interactive benefits of promotional collateral on the face side (FIG. 53).

Also, the embodiment of the described envelopes in FIGS. 49, 50, 51, 52 and 53, when coupled with RFID blocking material, allows for one or more of the cards to be safely printed with an RFID chip and antennae that could not be inappropriately scanned during the outbound mailing as the RFID blocking material used in the described envelopes would prevent such unauthorized scanning. In other words, the described envelopes would allow the advancement of proprietary digital, dry offset, silk screen, flexographic, laser, ink jet, or wet offset RFID printing transfer technologies to safely generate temporary or permanent ID cards, security cards, access cards, credit cards, gift cards, medical cards, affinity cards, etc. Consequently, the described envelopes will help protect against identity theft when it is made of an RFID blocking material (that calipers at least 0.007" if one of the embodiments is a post card) and could simultaneously help promote the safe use of RFID technology by allowing the inside card(s) (5070 and 5071) be themselves embedded with an RFID chip and antennae.

As seen previously, upon receipt, the recipient lifts the seal flap (4901) and then separates the individual components such as the RFID cards, business cards, affinity cards, post cards, buck slips, bookmarks, etc. by using the perforations which are either unique to the entity or are shared between entities.

FIGS. 54-64 show further embodiments of the described envelopes with or without embedded RFID blocking and printing technology wherein the recipient is provided the opportunity to build their own protective card sleeve from within the outbound envelope (A). Upon receipt, the receiver separates the card protective sleeve (5490) from the face panel (5402) by lifting and separating the upper sleeve panel (5495) along the separating perforation (54101) of the seal flap (5401). The bottom panel of the protective card sleeve is separated along perforation (5499) that also composes the bottom score (5410) (or top score if mailed "postage meter" style) of the invention. Then the residual remnant of the outbound side seam (5405) is separated from what will become the bottom seam of the protective card sleeve (5497) by using the separating perforation (54111). Once separated, the recipient completes the assembly of the protective sleeve by folding the bottom panel (55104) up towards the center panel of the sleeve (55102); folding the top panel of the sleeve (55103) over the upfolded bottom panel (55104) and securing this fold by remoistening the adhesive strip (55106) (or removing a peel & seal strip at this location); and then folding over the side panel (5497) and securing it in place with remoistening the adhesive strip (55107) (or removing a peel & seal strip at this location). FIGS. 57-64 illustrate the above folding sequence for forming the protective card sleeve. Notice, as previously stated, that all the copy could be spun 180 degrees in order to mail the envelope in a "postage meter" style configuration with the flap at the bottom. When the outbound seal flap is at the bottom of the envelope it automatically allows the fluorescent ID markings of the USPS to be removed from the back side of the envelope when opening such that the fluorescent markings do not interfere with the reply post card, business card, or other promotional constructs.

Should the entire envelope invention as described in FIGS. 54-64 also be made of RFID blocking material of at least 0.007" thick (7 point), then the reply post card will be functional for USPS processing (thinner calipers would allow for the described envelopes to replace the post card with other embodiments such as multiple cards and/or an integrated buck slip that could be removed to shield additional contactless cards in one's purse or wallet.

The combination of RFID Blocking material, such as that offered by PaperTyger's DEFENDER™ (a division of Chase Coating & Laminating) or other similarly available commercial or custom material, and RFID enabled inks allows the described envelopes to incorporate both the outbound RFID enabled card (5485) with a convenient RFID blocking sleeve (formed from panels 5490, 5495, 5496 and 5497) to create a powerful direct mail package that can still, of course, be stuffed with conventional inserts just like a regular envelope. Consequently, the described envelopes further reduces paper consumption, mismatched inventories, etc. while providing dual purpose protection for the advancement of contactless cards (gift, temporary ID, security, membership, credit, etc.) using RFID technology.

Figure 64:
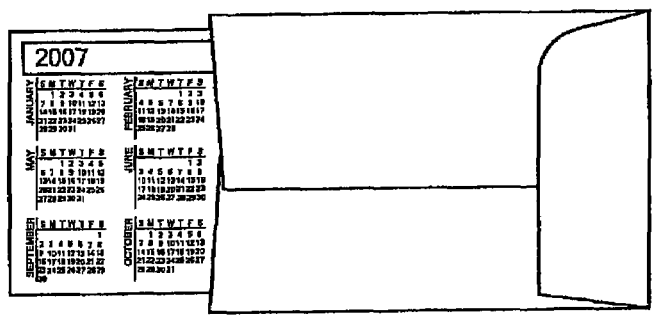
Figure 65:
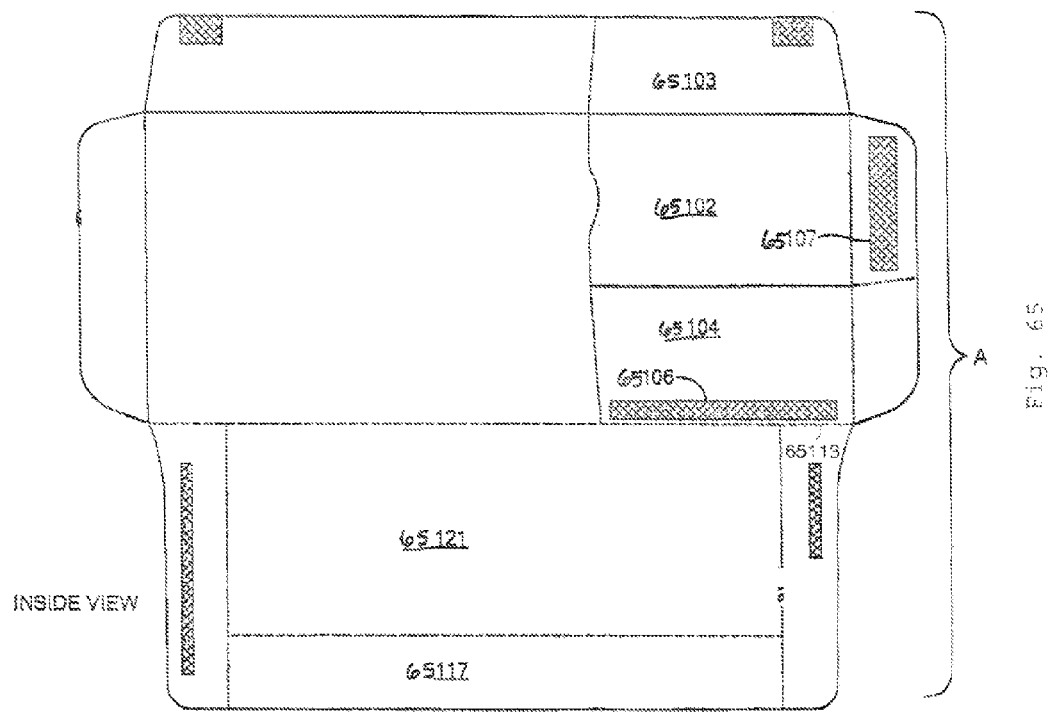
FIGS. 65-76 are block diagrams depicting embodiments wherein an integrated protective card sleeve combined with a buck slip and a bookmark.
Figure 66:
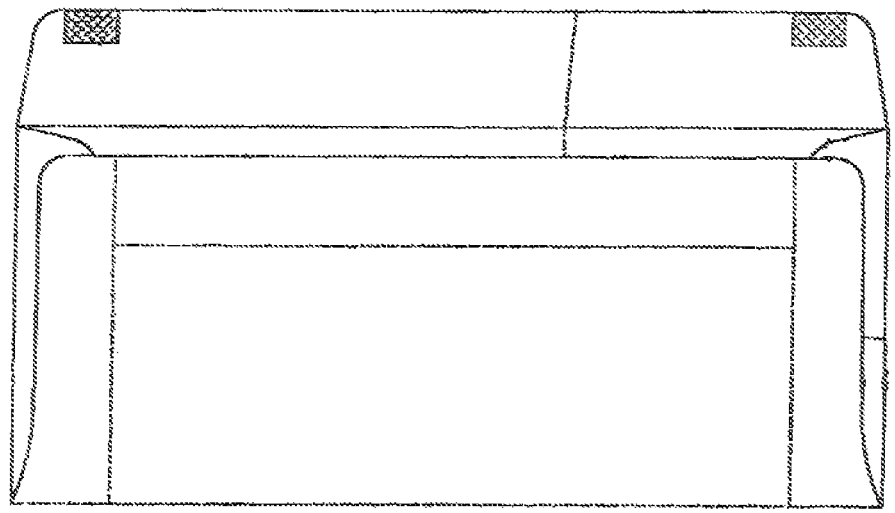
Figure 67:
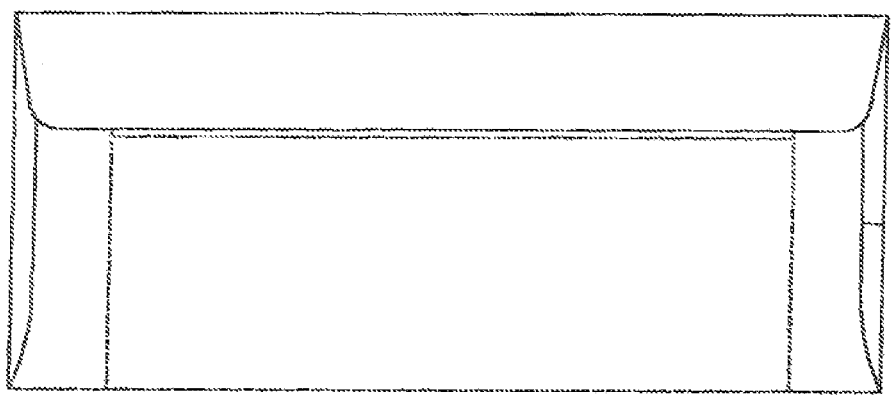
Figure 68:
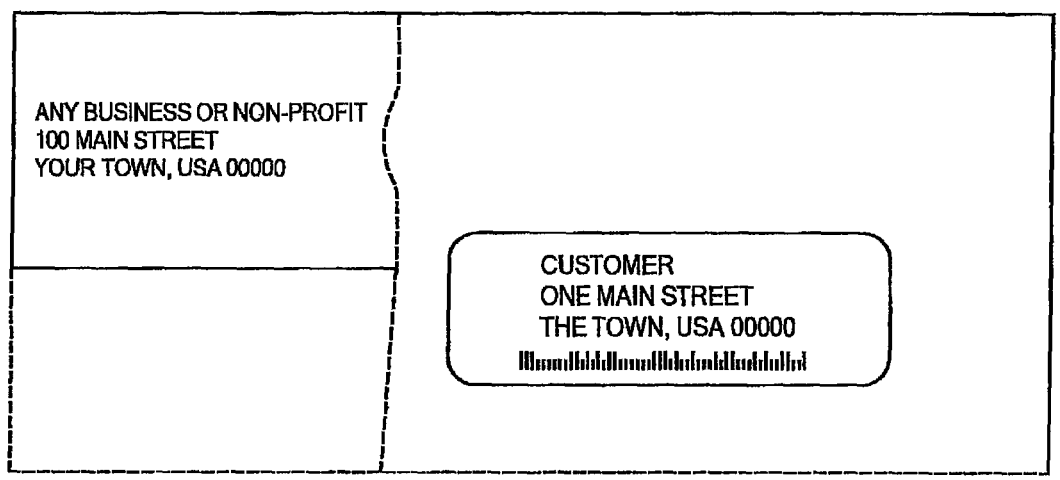
Figure 69:
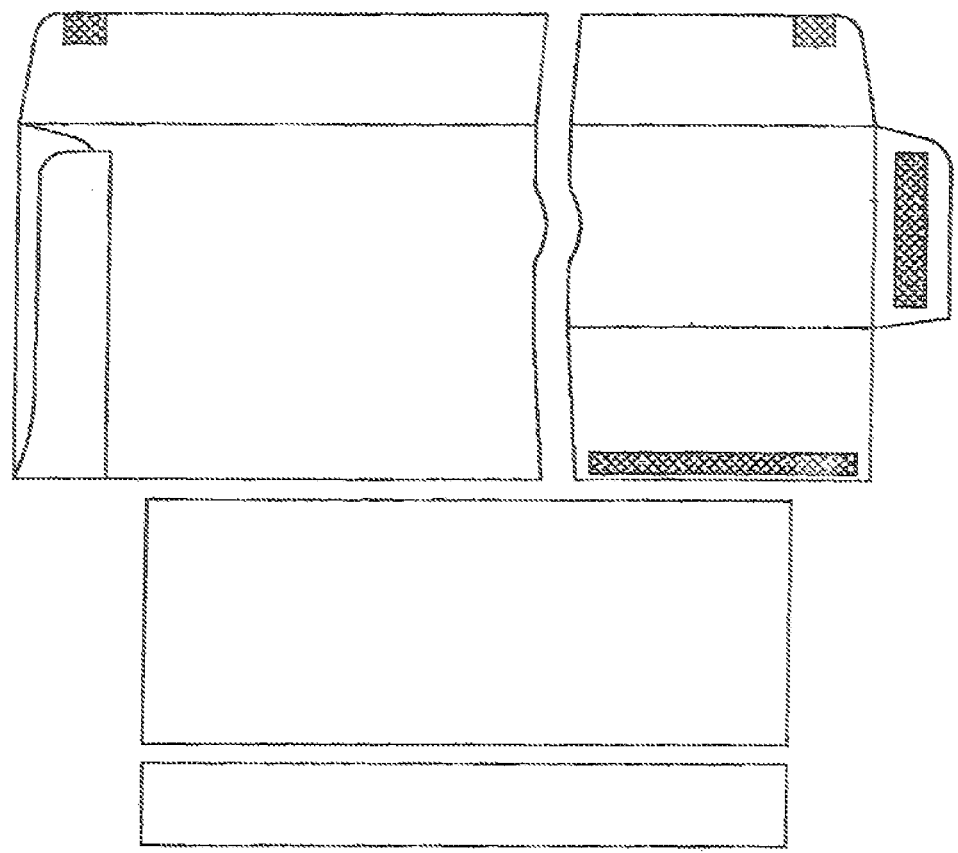
Figure 70:
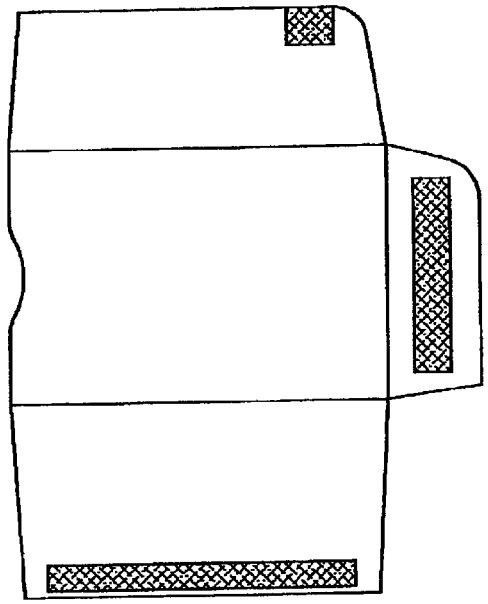
Figure 71:
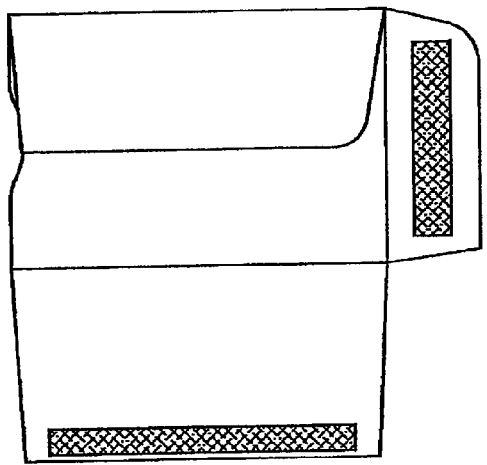
Figure 72:
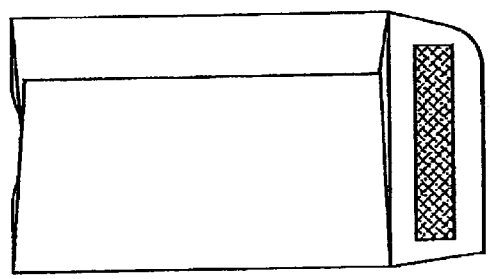
Figure 73:
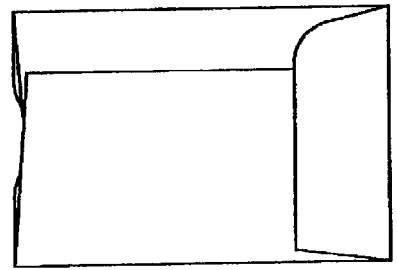
Figure 74:
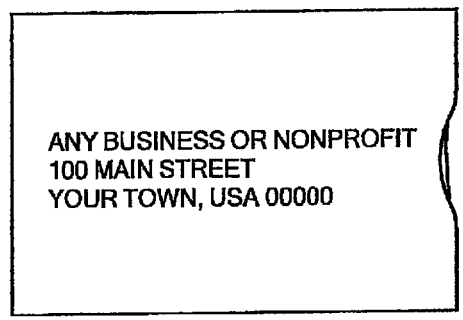
Figure 75:
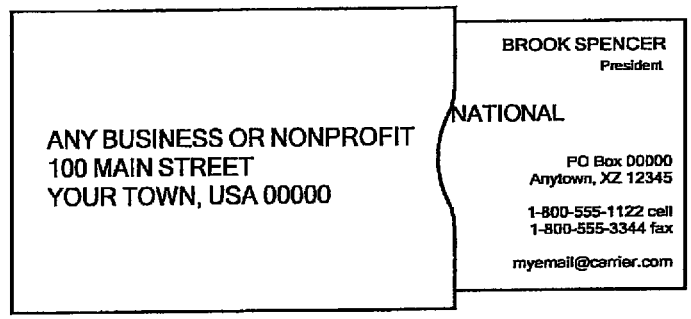
Figure 76:
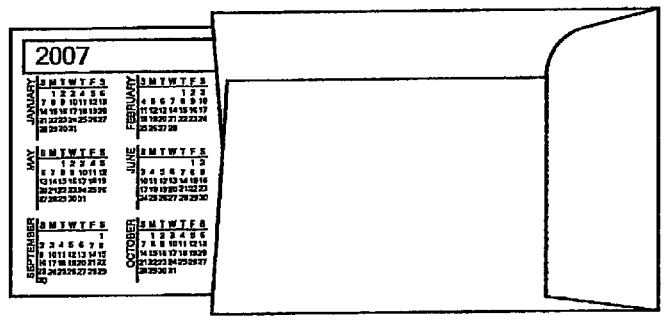

FIGS. 65-76 show alternative embodiments wherein the integrated protective card sleeve (65102) is now combined with a buck slip (65121) and a bookmark (65117) as opposed to a post card and/or card(s). This embodiment also shows the use of "drop" gum for the remoistenable strip (65106) located in the bottom panel of the card sleeve (65104) and parallel to the bottom separating perforation (65113) of the outbound envelope. In this configuration, the upper sleeve panel (65103) first folds down towards the center of the protective sleeve (65102) and then the lower sleeve panel (65104) folds up and adheres to the now folded down upper sleeve panel via the adhesive strip (65106). Again, the side sleeve panel (65105) is the last to fold inward and thereby, once secured via adhesive strip (65107), becomes the bottom panel of the protective card sleeve. The protective sleeve is still separated and folded in FIGS. 65-76 similar to FIGS. 54-64 but the finished appearance of the back side of the card sleeve looks like left seam folded over right seam (FIG. 76) versus right seam folded over left seam (FIG. 64).

Figure 77:
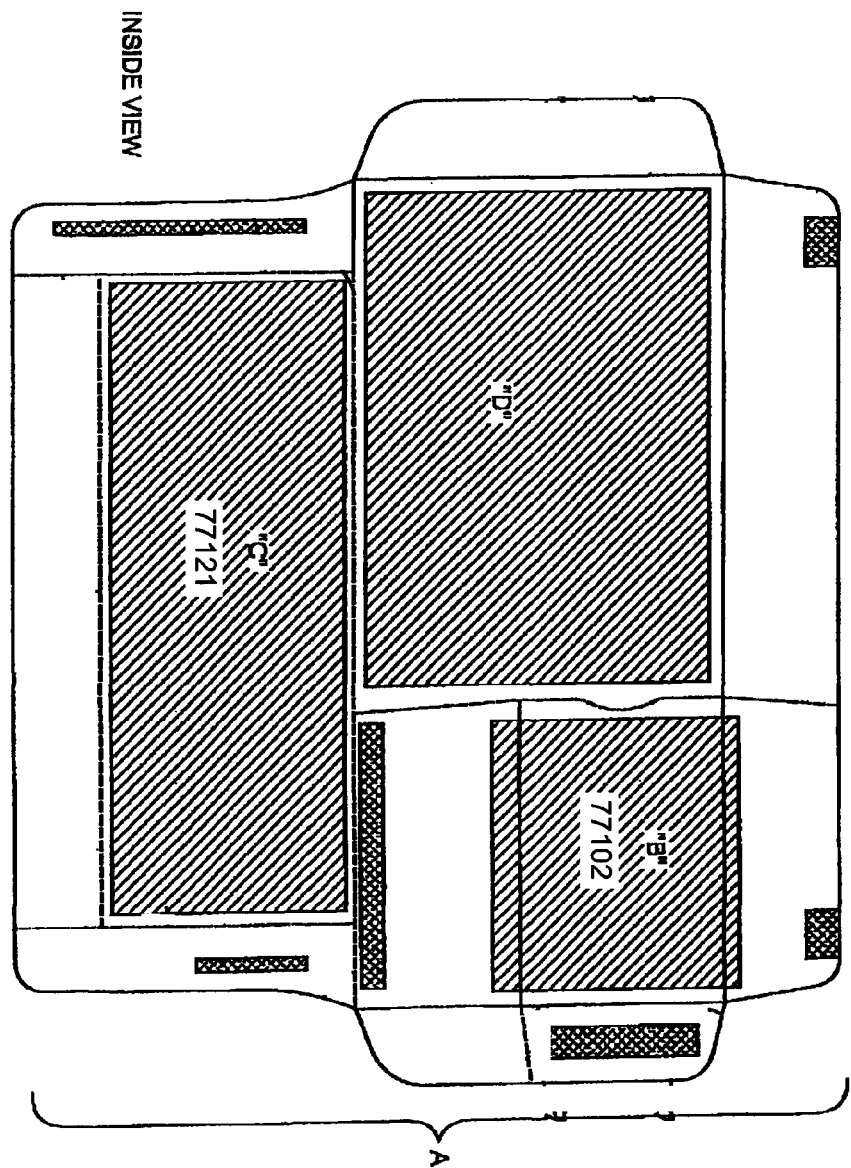
FIG. 77 is a block diagram depicting an embodiment of an envelope containing one or more areas covered with RFID blocking material.

FIG. 77 shows an embodiment where one or more areas within the envelope (A) could be covered with RFID blocking material as sourced from a company like Paper Tyger (a division of Chase Coating and Laminating) or other commercially or proprietary available blocking material so that, when folded, the envelope would provide protection to an enclosed contactless card. Zone "C" on the back panel when covered with the protective RFID blocking material would create RFID blocking protection for a detachable buck slip (77121) that could be reused in a recipient's purse or wallet. Zone "B" when placed on the inside panel over the main body of the protective card sleeve (77102) will likewise allow for continued protection of contactless cards once the recipient assembles the sleeve as described in FIGS. 54-64 or FIGS. 65-76. Alternatively, Zone "D" may be the strategic choice of some issuing contactless card companies or government agencies. In any case, whether singly or in combination, the described envelopes allow the advancement of RFID technologies by embedding zones of protective functionality that can extend beyond just the outbound mailing to secure individual privacy and reduce the risk of identity theft long after the initial mailing (thereby helping to speed the adoption of RFID technology for its time and money saving benefits).

Having described certain embodiments of envelopes having integrated return mailing articles, it will now become apparent to one of skill in the art that other embodiments incorporating the concepts of the invention may be used. Therefore, the disclosure should not be limited to certain embodiments, but rather should be limited only by the spirit and scope of the following claims.

What is claimed is:

1. An envelope having integrated seperable cards formed of a single sheet of material having first and second sections, and a main fold line defining said first and second sections comprising:
    said first section forming the front of the envelope and including a top edge, side edges, and a bottom edge formed by said main fold line, said first section further comprising a non-perforated first fold line, a non-perforated second fold line, and a non-perforated third fold line, said non-perforated first fold line spaced inwardly from and parallel with at least a substantial portion of the top edge of said first section, and said second and third non-perforated fold lines spaced inwardly from and parallel with at least a substantial portion of the side edges;
    said main fold line comprising a non-perforated, non-separating portion and a perforated separating portion;
    said main fold line comprising a perforated section and a non-perforated section; and
    said second section, having no fold lines, and comprising a plurality of separating perforations perpendicular to the main fold line perforated, separating portion of, said plurality of separating perforations perpendicular to said main fold line and said perforated section of the main fold line defining at least one seperable card, such that when said first and second sections are folded to form the envelope the at least one seperable card forms a portion of the back of the envelope.

2. The envelope of claim 1, wherein said second and third non-perforated fold lines define first and second side flaps extending outwardly from the side edges of said first section of the material.

3. The envelope of claim 2 wherein adhesive is disposed on said side flaps.

4. The envelope of claim 1, wherein said sheet of material is substantially about 0.007 inches thick.

5. The envelope of claim 1, wherein said sheet of material is substantially about 0.009 inches thick.

6. The envelope of claim 1, wherein said first section comprises a window.

7. The envelope of claim 1, wherein said seperable card comprises a postcard.

8. The envelope of claim 1, wherein said second section also defines an advertising element.

9. The envelope of claim 1, wherein said second section also defines a wallet card.

10. The envelope of claim 1, wherein said first section includes advertising.

11. The envelope of claim 1, wherein said second section contains three separating perforations perpendicular to the main fold line.

12. The envelope of claim 1, wherein said non-perforated first fold line defines a closure flap extending outwardly from the top edge of said first section of the material.

13. The envelope of claim 12, wherein at least one adhesive spot is applied to the closure flap.

\* \* \* \* \*

UNITED STATES PATENT AND TRADEMARK OFFICE
CERTIFICATE OF CORRECTION

Page 1 of 1

PATENT NO.        : 8,701,977 B2
APPLICATION NO.   : 12/552866
DATED             : April 22, 2014
INVENTOR(S)       : Lincoln Brooks Spaulding It is certified that error appears in the above-identified patent and that said Letters Patent is hereby corrected as shown below:

In the Claims

Column 20

In claim 1, lines 53-54 the language "said main fold line comprising a perforated section and a non-perforated section;" should be deleted.

In claim 1, line 57 the language "perforated, separating portion of" should be replaced with the language of --and at least one separating perforation parallel to the main fold line--.

In claim 1, line 59 the language "section" should be replaced with the language of --separating portion--.

Signed and Sealed this
Second Day of September, 2014

Michelle K. Lee
*Deputy Director of the United States Patent and Trademark Office*